US012738528B2

(12) United States Patent
Scordilis-Kelley et al.

(10) Patent No.: US 12,738,528 B2
(45) Date of Patent: Sep. 15, 2026

(54) LITHIUM-CONTAINING ELECTROCHEMICAL CELLS, ELECTROCHEMICAL SYSTEMS, AND RELATED METHODS

(71) Applicant: Sion Power Corporation, Tucson, AZ (US)

(72) Inventors: Chariclea Scordilis-Kelley, Tucson, AZ (US); Yuriy V. Mikhaylik, Tucson, AZ (US); Michael G. Laramie, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 635 days.

(21) Appl. No.: 18/321,079

(22) Filed: May 22, 2023

(65) Prior Publication Data

US 2024/0055647 A1 Feb. 15, 2024

Related U.S. Application Data

(60) Provisional application No. 63/351,202, filed on Jun. 10, 2022.

(51) Int. Cl.

| | |
|---|---|
| ***H01M 10/052*** | (2010.01) |
| ***H01M 4/40*** | (2006.01) |
| ***H01M 4/505*** | (2010.01) |
| ***H01M 4/525*** | (2010.01) |
| ***H01M 10/0569*** | (2010.01) |
| ***H01M 10/42*** | (2006.01) |
| *H01M 4/02* | (2006.01) |

(52) U.S. Cl.

CPC ......... *H01M 10/052* (2013.01); *H01M 4/405* (2013.01); *H01M 4/505* (2013.01); *H01M 4/525* (2013.01); *H01M 10/0569* (2013.01); *H01M 10/4235* (2013.01); *H01M 2004/027* (2013.01); *H01M 2004/028* (2013.01)

(58) Field of Classification Search

CPC .... H01M 10/052; H01M 4/405; H01M 4/505; H01M 4/525; H01M 10/0569

See application file for complete search history.

(56) References Cited

U.S. PATENT DOCUMENTS

| | | | |
|---|---|---|---|
| 5,538,812 | A | 7/1996 | Lee et al. |
| 5,648,187 | A | 7/1997 | Skotheim |
| 5,919,587 | A | 7/1999 | Mukherjee et al. |
| 5,961,672 | A | 10/1999 | Skotheim et al. |
| 6,238,821 | B1 | 5/2001 | Mukherjee et al. |
| 6,733,924 | B1 | 5/2004 | Skotheim et al. |
| 6,797,428 | B1 | 9/2004 | Skotheim et al. |
| 6,936,381 | B2 | 8/2005 | Skotheim et al. |
| 7,247,408 | B2 | 7/2007 | Skotheim et al. |
| 7,688,075 | B2 | 3/2010 | Kelley et al. |
| 7,771,870 | B2 | 8/2010 | Affinito et al. |
| 7,785,730 | B2 | 8/2010 | Affinito et al. |
| 7,939,198 | B2 | 5/2011 | Mukherjee et al. |
| 8,076,024 | B2 | 12/2011 | Affinito et al. |
| 8,084,102 | B2 | 12/2011 | Affinito |
| 8,087,309 | B2 | 1/2012 | Kelley et al. |
| 8,105,717 | B2 | 1/2012 | Skotheim et al. |

(Continued)

*Primary Examiner* — Olatunji A Godo

(74) *Attorney, Agent, or Firm* — Wolf, Greenfield & Sacks, P.C.

(57) ABSTRACT

Electrochemical cells and electrochemical systems containing lithium (e.g., lithium metal) are generally described.

20 Claims, 4 Drawing Sheets

(56) References Cited

U.S. PATENT DOCUMENTS 8,197,971 B2 6/2012 Skotheim et al.
8,264,205 B2 9/2012 Kopera
8,338,034 B2 12/2012 Affinito et al.
8,415,054 B2 4/2013 Skotheim et al.
8,603,680 B2 12/2013 Affinito et al.
8,617,748 B2 12/2013 Mikhaylik et al.
8,623,557 B2 1/2014 Skotheim et al.
8,728,661 B2 5/2014 Skotheim et al.
8,753,771 B2 6/2014 Skotheim et al.
8,871,387 B2 10/2014 Wang et al.
8,936,870 B2 1/2015 Affinito et al.
8,968,928 B2 3/2015 Wang et al.
9,005,311 B2 4/2015 Safont-Sempere et al.
9,005,809 B2 4/2015 Wilkening et al.
9,034,421 B2 5/2015 Mikhaylik et al.
9,040,197 B2 5/2015 Affinito et al.
9,040,201 B2 5/2015 Affinito et al.
9,065,149 B2 6/2015 Skotheim et al.
9,077,041 B2 7/2015 Burnside et al.
9,105,938 B2 8/2015 Scordilis-Kelley et al.
9,214,678 B2 12/2015 Mikhaylik
9,397,342 B2 7/2016 Skotheim et al.
9,419,274 B2 8/2016 Wilkening et al.
9,490,478 B2 11/2016 Mikhaylik et al.
9,531,009 B2 12/2016 Kumaresan et al.
9,548,492 B2 1/2017 Affinito et al.
9,559,348 B2 1/2017 Kumaresan et al.
9,577,243 B2 2/2017 Schmidt et al.
9,577,267 B2 2/2017 Scordilis-Kelley et al.
9,653,735 B2 5/2017 Skotheim et al.
9,653,750 B2 5/2017 Laramie et al.
9,711,784 B2 7/2017 Kelley et al.
9,728,768 B2 8/2017 Mikhaylik et al.
9,735,411 B2 8/2017 Viner et al.
9,755,268 B2 9/2017 Fleischmann et al.
9,780,404 B2 10/2017 Scordilis-Kelley et al.
9,825,328 B2 11/2017 Du et al.
9,853,287 B2 12/2017 Mikhaylik et al.
9,947,963 B2 4/2018 Du et al.
9,994,959 B2 6/2018 Laramie et al.
9,994,960 B2 6/2018 Laramie et al.
10,020,479 B2 7/2018 Mikhaylik et al.
10,020,512 B2 7/2018 Gronwald et al.
10,050,308 B2 8/2018 Liao et al.
10,069,135 B2 9/2018 Fleischmann et al.
10,069,146 B2 9/2018 Skotheim et al.
10,122,043 B2 11/2018 Du et al.
10,243,202 B2 3/2019 Fleischmann et al.
10,312,545 B2 6/2019 Scordilis-Kelley et al.
10,319,988 B2 6/2019 Kelley et al.
10,320,027 B2 6/2019 Scordilis-Kelley et al.
10,320,031 B2 6/2019 Mikhaylik et al.
10,333,134 B2 6/2019 Mikhaylik et al.
10,333,149 B2 6/2019 Affinito et al.
10,388,987 B2 8/2019 Du et al.
10,461,333 B2 10/2019 Mikhaylik et al.
10,461,372 B2 10/2019 Laramie et al.
10,490,796 B2 11/2019 Laramie et al.
10,535,902 B2 1/2020 Laramie et al.
10,541,448 B2 1/2020 Mikhaylik et al.
10,553,893 B2 2/2020 Laramie et al.
10,573,869 B2 2/2020 Mikhaylik et al.
10,608,278 B2 3/2020 Liao et al.
10,629,947 B2 4/2020 Affinito et al.
10,629,954 B2 4/2020 Mikhaylik et al.
10,720,648 B2 7/2020 Quero-Mieres et al.
10,847,833 B2 11/2020 Bunte et al.
10,862,105 B2 12/2020 Gronwald et al.
10,868,306 B2 12/2020 Mudalige et al.
10,879,527 B2 12/2020 Laramie et al.
10,944,094 B2 3/2021 Liao et al.
10,965,130 B2 3/2021 Mikhaylik et al.
10,991,925 B2 4/2021 Wang et al.
11,024,923 B2 6/2021 Liao et al.
11,038,178 B2 6/2021 Liao et al.
11,041,248 B2 6/2021 Laramie et al.
11,056,728 B2 7/2021 Mikhaylik et al.
11,088,395 B2 8/2021 Mikhaylik et al.
11,108,076 B2 8/2021 Scordilis-Kelley et al.
11,108,077 B2 8/2021 Scordilis-Kelley et al.
11,121,397 B2 9/2021 Scordilis-Kelley et al.
11,165,122 B2 11/2021 Laramie et al.
11,183,690 B2 11/2021 Wang et al.
11,228,055 B2 1/2022 Liao et al.
11,233,243 B2 1/2022 Affinito et al.
11,239,504 B2 2/2022 Laramie et al.
11,245,103 B2 2/2022 Mikhaylik et al.
11,251,501 B2 2/2022 Schneider et al.
11,316,204 B2 4/2022 Mikhaylik et al.
11,322,804 B2 5/2022 Laramie et al.
11,367,892 B2 6/2022 Laramie et al.
11,424,492 B2 8/2022 Mikhaylik et al.
11,456,459 B2 9/2022 Affinito et al.
11,489,348 B2 11/2022 Mikhaylik et al.
11,502,334 B2 11/2022 Liao et al.
11,557,753 B2 1/2023 Kovalev et al.
11,569,531 B2 1/2023 Mikhaylik et al.
11,575,124 B2 2/2023 Affinito et al.
11,581,530 B2 2/2023 Laramie et al.
11,637,353 B2 4/2023 Laramie
11,658,352 B2 5/2023 Mikhaylik et al.
11,664,527 B2 5/2023 Liao et al.
11,699,780 B2 7/2023 Milobar et al.
11,705,554 B2 7/2023 Kovalev et al.
11,705,555 B2 7/2023 Mikhaylik et al.
11,710,828 B2 7/2023 Wang et al.
11,710,847 B2 7/2023 Laramie et al.
11,728,528 B2 8/2023 Laramie et al.
11,735,761 B2 8/2023 Scordilis-Kelley et al.
11,742,477 B2 8/2023 Laramie et al.
11,784,297 B2 10/2023 Liao et al.
11,791,511 B2 10/2023 Shayan et al.
2005/0196672 A1 9/2005 Mukherjee et al.
2006/0115579 A1 6/2006 Mukherjee et al.
2007/0221265 A1 9/2007 Affinito et al.
2008/0318128 A1 12/2008 Simoneau et al.
2009/0035646 A1 2/2009 Mikhaylik et al.
2009/0055110 A1 2/2009 Kelley et al.
2010/0239914 A1 9/2010 Mikhaylik et al.
2011/0006738 A1 1/2011 Mikhaylik et al.
2011/0014524 A1 1/2011 Skotheim et al.
2011/0068001 A1 3/2011 Affinito et al.
2011/0070491 A1 3/2011 Campbell et al.
2011/0070494 A1 3/2011 Campbell et al.
2011/0076560 A1 3/2011 Scordilis-Kelley et al.
2011/0159376 A1 6/2011 Skotheim et al.
2011/0165471 A9 7/2011 Skotheim et al.
2011/0206992 A1 8/2011 Campbell et al.
2011/0256450 A1 10/2011 Campbell et al.
2012/0048729 A1 3/2012 Mikhaylik et al.
2012/0052339 A1 3/2012 Mikhaylik et al.
2012/0070746 A1 3/2012 Mikhaylik et al.
2012/0082872 A1 4/2012 Schmidt et al.
2012/0082901 A1 4/2012 Schmidt et al.
2013/0316072 A1 11/2013 Scordilis-Kelley et al.
2014/0272594 A1 9/2014 Safont Sempere et al.
2014/0272595 A1 9/2014 Cristadoro et al.
2015/0162586 A1 6/2015 Fleischmann et al.
2015/0188194 A1 7/2015 Mikhaylik et al.
2015/0287986 A1 10/2015 Affinito et al.
2016/0118638 A1 4/2016 Gronwald et al.
2017/0141385 A1 5/2017 Scordilis-Kelley et al.
2018/0254516 A1 9/2018 Han et al.
2018/0261820 A1 9/2018 Liao et al.
2019/0006699 A1 1/2019 Jones et al.
2019/0081359 A1* 3/2019 Yushin .................. H01M 4/134
2019/0088958 A1 3/2019 Viner et al.
2019/0229323 A1 7/2019 Mikhaylik et al.
2020/0220197 A1 7/2020 Laramie et al.
2020/0220205 A1 7/2020 Affinito et al.
2020/0395585 A1 12/2020 Laramie et al.
2021/0057753 A1* 2/2021 Viner .................... H01M 4/366
2021/0135192 A1 5/2021 Gronwald et al.
2021/0138673 A1 5/2021 Shannon et al.

(56) References Cited

U.S. PATENT DOCUMENTS

2021/0151815 A1 5/2021 Milobar et al.
2021/0151817 A1 5/2021 Jennings et al.
2021/0151830 A1 5/2021 Shayan et al.
2021/0151839 A1 5/2021 Niedzwiecki et al.
2021/0151840 A1 5/2021 Shayan et al.
2021/0151841 A1 5/2021 Johnson et al.
2021/0193984 A1 6/2021 Laramie et al.
2021/0193985 A1 6/2021 Laramie et al.
2021/0193996 A1 6/2021 Laramie et al.
2021/0194069 A1 6/2021 Hamblin et al.
2021/0218243 A1 7/2021 Hamblin et al.
2021/0408550 A1 12/2021 Liao et al.
2022/0048121 A1 2/2022 Child et al.
2022/0069593 A1 3/2022 Hamblin et al.
2022/0115704 A1 4/2022 Mikhaylik et al.
2022/0115705 A1 4/2022 Kovalev et al.
2022/0115715 A1 4/2022 Kovalev et al.
2022/0199968 A1 6/2022 Child et al.
2022/0209327 A1 6/2022 Hamblin et al.
2022/0255188 A1 8/2022 Schneider et al.
2022/0271537 A1 8/2022 Mikhaylik et al.
2022/0278354 A1 9/2022 Laramie et al.
2022/0311081 A1 9/2022 Niedzwiecki et al.
2022/0320586 A1 10/2022 Liao et al.
2022/0328880 A1 10/2022 Mikhaylik et al.
2022/0336872 A1 10/2022 Mikhaylik et al.
2022/0352521 A1 11/2022 Mikhaylik et al.
2022/0359882 A1 11/2022 Affinito et al.
2022/0359902 A1 11/2022 Milobar
2022/0407127 A1 12/2022 Mikhaylik et al.
2023/0006185 A1 1/2023 Laramie et al.
2023/0069989 A1 3/2023 Laramie et al.
2023/0106718 A1 4/2023 Mikhaylik et al.
2023/0111336 A1 4/2023 Scordilis-Kelley et al.
2023/0112241 A1 4/2023 Laramie et al.
2023/0118071 A1 4/2023 Laramie et al.
2023/0120877 A1 4/2023 Mikhaylik et al.
2023/0207908 A1 6/2023 Laramie et al.
2023/0261182 A1 8/2023 Kovalev et al.
2023/0275256 A1 8/2023 Harrel et al.
2023/0317959 A1 10/2023 Kovalev et al.

* cited by examiner

LITHIUM-CONTAINING ELECTROCHEMICAL CELLS, ELECTROCHEMICAL SYSTEMS, AND RELATED METHODS

RELATED APPLICATIONS

This application claims priority to U.S. Provisional Application No. 63/351,202, filed Jun. 10, 2022, which is incorporated herein by reference in its entirety.

TECHNICAL FIELD

Lithium-containing electrochemical cells, electrochemical systems, and related methods are generally described.

SUMMARY

Electrochemical cells and electrochemical systems containing lithium (e.g., lithium metal) are generally described. Related methods are also generally described. The subject matter of the present disclosure involves, in some cases, interrelated products, alternative solutions to a particular problem, and/or a plurality of different uses of one or more systems and/or articles.

In one aspect, an electrochemical system is described. The system comprises an electrochemical cell comprising a first electrode comprising a base electrode material layer comprising a first active electrode species, wherein the first active electrode species comprises lithium; a second electrode comprising a second active electrode species, wherein the second active electrode species comprises nickel, cobalt, and manganese, and wherein the second electrode comprises a binder comprising a fluorinated compound and conductive carbon; a separator; and an electrolyte, wherein the electrolyte comprises: a first solvent comprising a fluorinated carbonate; a second solvent comprising a carbonate, wherein a ratio of the fluorinated carbonate to the carbonate is greater than or equal to 5:95 and less than or equal to 95:1; and a lithium salt, wherein an anisotropic force is applied to the electrochemical cell, the anisotropic force comprising a component normal to a surface of the first electrode, and wherein the component normal defines a pressure of at least about 4.9 $N/cm^2$.

In another aspect, an electrochemical system cell is described. The system comprises an electrochemical cell comprising a first electrode comprising a base electrode material layer comprising a first active electrode species, wherein the first active electrode species comprises lithium; a second electrode comprising a second active electrode species, wherein the second active electrode species comprises nickel, cobalt, and manganese, and wherein the second electrode comprises a binder comprising a fluorinated compound and conductive carbon; a separator; and an electrolyte, wherein the electrolyte comprises: a first solvent comprising a fluorinated carbonate; a second solvent comprising a carbonate, wherein a ratio of the fluorinated carbonate to the carbonate is greater than or equal to 5:95 and less than or equal to 95:5; and a lithium salt; and an electrochemical cell management system operatively associated with the electrochemical cell, wherein the electrochemical cell management system comprises at least one controller configured to control the electrochemical cell such that: the electrochemical cell is charged at a charging rate over a first state of charge range having breadth of at least 2%, and the electrochemical cell is discharged at a discharging rate over a second state of charge range having a breadth of at least 2%, wherein the discharging rate is at least 2 times the charging rate.

In another aspect, a method of operating an electrochemical system is described. The method comprises: in an electrochemical cell comprising a first electrode comprising a base electrode material layer comprising a first active electrode species, wherein the first active electrode species comprises lithium; a second electrode comprising a second active electrode species, wherein the second active electrode species comprises lithium, nickel, cobalt, and manganese; wherein the second electrode comprises a binder comprising a fluorinated compound and conductive carbon; and an electrolyte, wherein the electrolyte comprises: a first solvent comprising a fluorinated carbonate, a second solvent comprising a carbonate, wherein a ratio of the fluorinated carbonate to the carbonate is greater than 1:1 and less than or equal to 10:1; and a lithium salt, performing the steps of: charging the electrochemical cell at a charging rate over a first state of charge range having a breadth of at least 2%; and discharging the electrochemical cell at a discharging rate over a second state of charge range having a breadth of at least 2%, wherein the discharging rate is at least 2 times the charging rate.

In another aspect, an electrochemical system is described. The system comprises an electrochemical cell comprising a first electrode comprising a base electrode material layer comprising a first active electrode species, wherein the first active electrode species comprises lithium, and where the first electrode comprises a protective layer adjacent to the base electrode material layer, wherein the protective layer comprises pores and has a thickness of less than 5 microns; a second electrode comprising a second active electrode species, wherein the second active electrode species comprises lithium, nickel, cobalt, and manganese; a separator; and an electrolyte, wherein the electrolyte comprises: first solvent comprising a fluorinated carbonate; a second solvent comprising a carbonate, and a lithium salt, wherein an anisotropic force is applied to the electrochemical cell, the anisotropic force comprising a component normal to a surface of the first electrode, and wherein the component defines a pressure of at least about 4.9 $N/cm^2$.

In another aspect, an electrochemical system is described. The system comprises an electrochemical cell comprising a first electrode comprising a base electrode material layer comprising a first active electrode species, wherein the first active electrode species comprises lithium, and wherein the first electrode comprises a protective adjacent to the base electrode material layer, wherein the protective layer comprises pores and has a thickness of less than 5 microns; a second electrode comprising a second active electrode species, wherein the second active electrode species comprises lithium, nickel, cobalt, and manganese; a separator; an electrolyte, wherein the electrolyte comprises: a first solvent comprising a fluorinated carbonate; a second solvent comprising a carbonate, and a lithium salt; and an electrochemical cell management system operatively associated with the electrochemical cell, wherein the electrochemical cell management system comprises at least one controller configured to control the electrochemical cell such that the electrochemical cell is charged at a charging rate over a first state of charge range having a breadth of at least 2%, and the electrochemical cell is discharged at a discharging rate over a second state of charge range having a breadth of at least 2%, wherein the discharging rate is at least 2 times the charging rate.

In another aspect, a method of operating an electrochemical cell is described. The method comprises: in an electrochemical cell comprising a first electrode comprising a base electrode material layer comprising a first active electrode species, wherein the first active electrode species comprises lithium, and wherein the first electrode comprises a protective layer adjacent to the base electrode material layer, wherein the protective layer comprises pores and has a thickness of less than 5 microns; a second electrode comprising a second active electrode species, wherein the second active electrode species comprises nickel, cobalt, and manganese; a separator; and an electrolyte, wherein the electrolyte comprises: a first solvent comprising a fluorinated carbonate, a second solvent comprising a carbonate, and a lithium salt; performing the steps of: charging the electrochemical cell at a charging rate over a first state of charge range having breadth of at least 2%, discharging the electrochemical cell at a discharging rate over a second state of charge range having a breadth of at least 2%, wherein the discharging rate is at least 2 times the charging rate.

Other advantages and novel features of the present disclosure will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
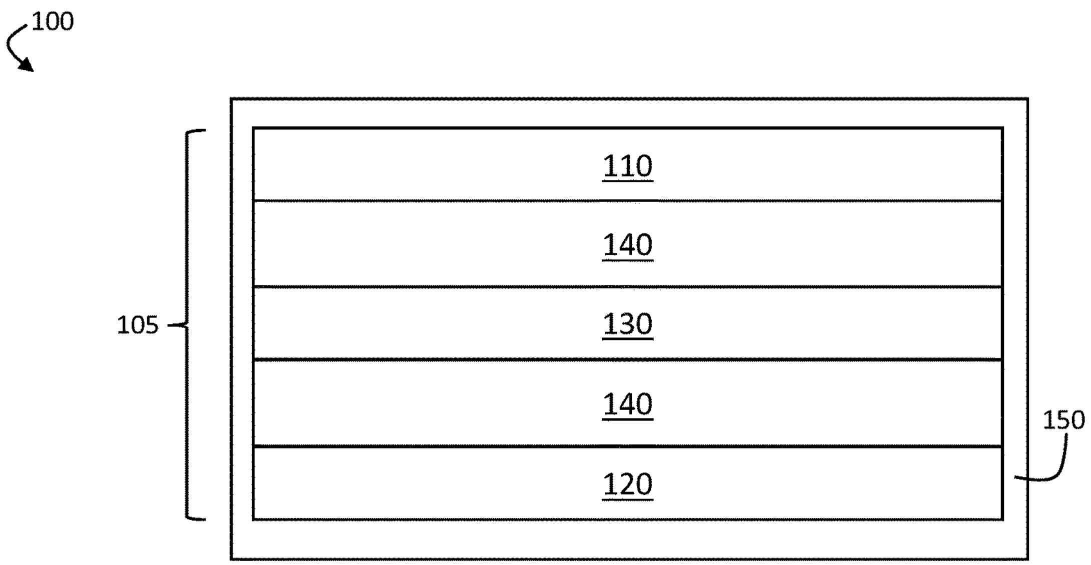
FIG. 1A is a schematic cross-sectional diagram of an electrochemical system comprising an electrochemical cell, according to some embodiments.

Lithium-containing electrochemical cells and electrochemical systems are described herein. The electrochemical systems may include one or more lithium-containing electrochemical cells. Methods for operating electrochemical cells and electrochemical systems are also disclosed. The electrochemical cells and electrochemical systems described herein may be used as battery components or other power-providing systems and devices.

In some embodiments, an electrochemical cell comprises a first electrode (e.g., an anode) comprising lithium (e.g., a lithium metal anode) and a second electrode (e.g., a cathode) comprising a lithium intercalation material, such as a nickel manganese cobalt (NMC) compound. In some embodiments, the electrochemical cell may also comprise an electrolyte (e.g., a liquid electrolyte) and the electrolyte may comprise one solvent or a mixture of solvents (e.g., a first solvent, a second solvent, a third solvent, and so forth). The electrochemical cell may also include various other electrochemical cell components (e.g., separators, release layers, adhesion layers, solid electrolytes, protective layers, etc.). These components are described in more detail below.

In some embodiments, an electrochemical cell comprises a first electrode (e.g., an anode) comprising vapor-deposited lithium (vdLi), which may be deposited on a current collector. The electrochemical cell may also comprise a second electrode (e.g., a cathode) comprising a lithium intercalation material, such as an NMC compound. In some embodiments, the electrochemical cell also comprises an electrolyte (e.g., a liquid electrolyte) and the electrolyte may comprise a fluorinated solvent and/or a mixture of solvents. The electrochemical cell may also optionally include one or more other electrochemical cell components (e.g., separators, release layers, adhesion layers, solid electrolytes, protective layers, etc.). For instance, in some embodiments, the electrochemical cell comprises a protective layer and/or a release layer. In some embodiments, the electrochemical cell has a force applied to it (e.g., an anisotropic force) where a normal component of the force is applied to an electrode within the electrochemical cell. Additional details are described below and elsewhere herein.

The electrochemical cells described above and herein may be part of an electrochemical system that also includes an electrochemical cell management system. The electrochemical cell management system may comprise at least one controller configured to control the electrochemical cell such that the electrochemical cell is charged at a charging rate over a first state of charge range having a breadth of at least 2%, and the electrochemical cell is discharged at a discharging rate over a second state of charge range having a breadth of at least 2%, wherein the discharging rate is at least 2 times the charging rate.

Turning to the figures, specific non-limiting embodiments are described in further detail. It should be understood that the various systems, components, features, and methods described relative to these embodiments may be used either individually and/or in any desired combination as the disclosure is not limited to only the specific embodiments shown in the figures.

In some embodiments, an electrochemical cell comprises a first electrode (e.g., an anode) comprising a base electrode material layer that comprises a first active electrode species. For example, FIG. 1A shows an electrochemical system 100 comprising an electrochemical cell 105 that includes a first electrode 110 (e.g., a negative electrode, an anode) comprising a base electrode material layer. The electrochemical cell may also include a second electrode 120 (e.g., a positive electrode, a cathode) comprising a second active electrode species. In some embodiments, the second electrode comprises a second active electrode species comprising nickel, cobalt, and manganese, such as $LiNiMnCoO_2$, as a non-limiting example.

It should be noted that while various figures depict a first electrode and a second electrode, any suitable number of electrodes may be present within an electrochemical cell and/or electrochemical system, as this disclosure is not so limited. For example, an electrochemical cell or system may comprise three electrodes, four electrodes, five electrodes, six electrodes, n-electrodes (where n is an integer which may be, for example, ≤200), or more. The type of electrode (e.g., a cathode, an anode) can be determined by the type of active electrode species, and those skilled in the art, in view of this disclosure, will be capable of selecting the appropriate number and type of electrode, as well as any intervening components between the electrodes (e.g., electrolytes, separators, protective layers, release layers, etc.). The electrodes may be positioned on or adjacent to any suitable component.

It should also be understood that when a portion (e.g., an electrode, a component, a layer) is "adjacent" to another portion, it can be directly adjacent the portion, or an intervening portion (e.g., another electrode, component, and/or layer) may also be present. A portion that is "directly adjacent" to another portion means that no intervening portion is present. It should also be understood that when a portion is referred to as being "adjacent" to another portion, it may cover the entire portion or a part of the portion.

The electrochemical cells described herein may also comprise a separator. The separator may be positioned between the first electrode and the second electrode or between any two electrodes within the electrochemical cell. By way of illustration, FIG. 1A schematically depicts a separator 130 between the first electrode 110 and the second electrode 120. As understood by those skilled in the art, a separator prevents two adjacent electrodes from making direct electronic contact between the two electrodes while providing a suitable amount of ionic conductivity between the two electrodes so that the electrochemical cell can function without short circuiting (e.g., forming lithium metal dendrites from one electrode to another electrode). Additional details about separators (e.g., separator materials, conductivity, porosity) are described elsewhere herein.

In some embodiments, the electrochemical cell comprises an electrolyte (e.g., a liquid electrolyte). For example, as shown in FIG. 1A, the electrochemical cell 105 comprises an electrolyte 140 adjacent to the separator 130. In some embodiments, the electrolyte may comprise one or more solvents (i.e., an electrolyte solvent, such as a fluorinated solvent) and one or more species (e.g., electrolyte salts, lithium salts) capable of transporting ions within electrochemical cell. In the case of a liquid electrolyte, the liquid electrolyte may diffuse through the pores of the separator to access the first electrode and the second electrode, in some embodiments. However, it should be understood that solid electrolytes (e.g., in place of liquid electrolytes) are also possible. Details regarding electrolytes (e.g., solvents, salts, liquid electrolytes, solid electrolytes) are described in more detail below.

Figure 1B:
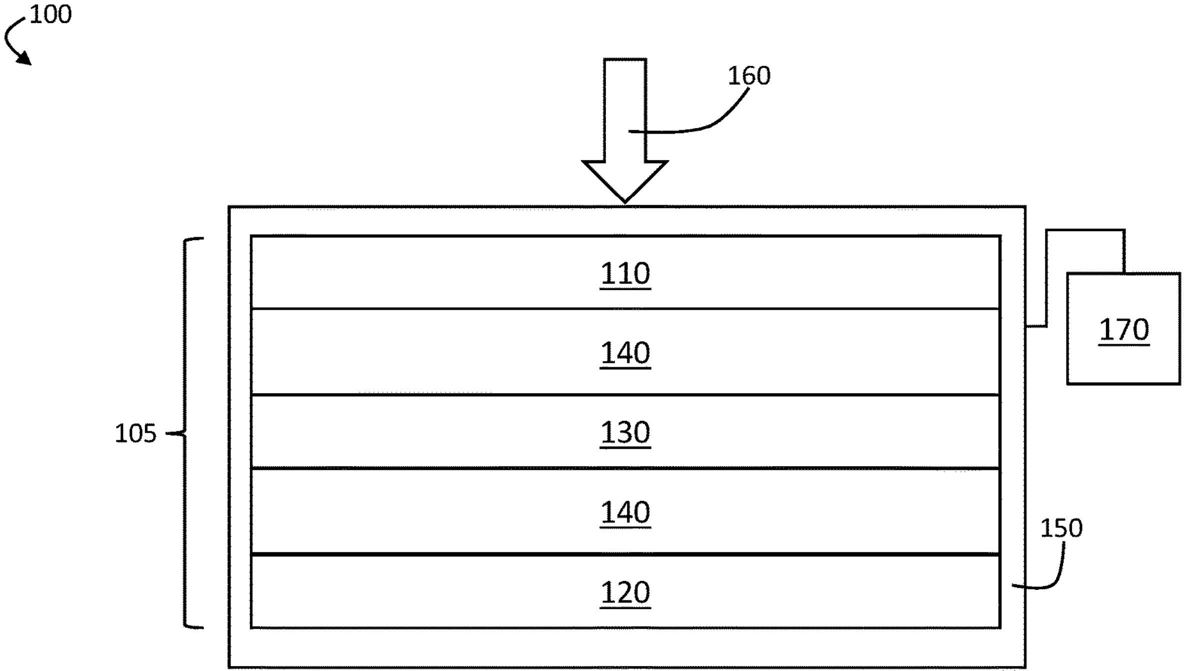
FIG. 1B is a schematic cross-sectional diagram of an electrochemical system comprising an electrochemical cell, to which an anisotropic force is applied, according to some embodiments.

In some embodiments, an anisotropic force is applied to the electrochemical cell. For example, in FIG. 1B, an anisotropic force 160 is applied to the electrochemical system 100 so as to apply an anisotropic force to the electrochemical cell 105. Details regarding the anisotropic force are described in more details further below.

In some embodiments, the system includes a management system for managing one or more electrochemical cells of the system. For example, in FIG. 1B, an electrochemical management system 170 is associated with the electrochemical cell 105. Details regarding the electrochemical management system are described elsewhere herein.

Figure 2A:
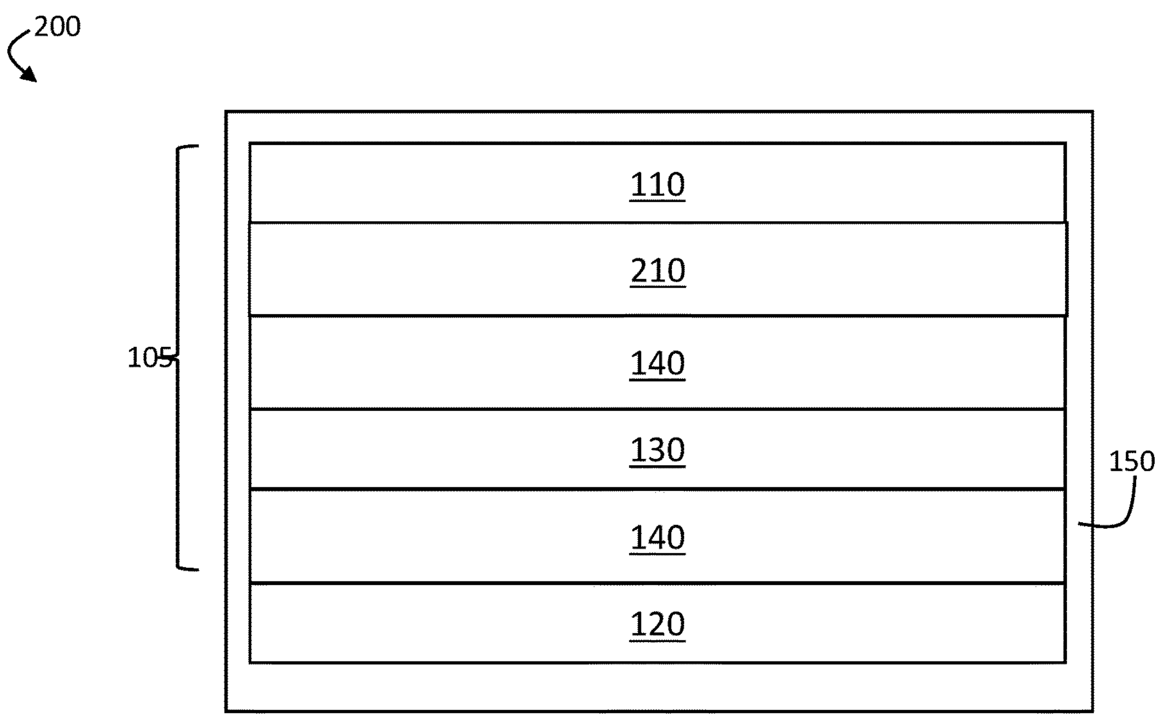
FIG. 2A is a schematic cross-sectional diagram of an electrochemical system comprising an electrochemical cell including a protective layer positioned on a base electrode material layer of a first electrode, a separator, and an electrolyte, according to some embodiments.
Figure 2B:
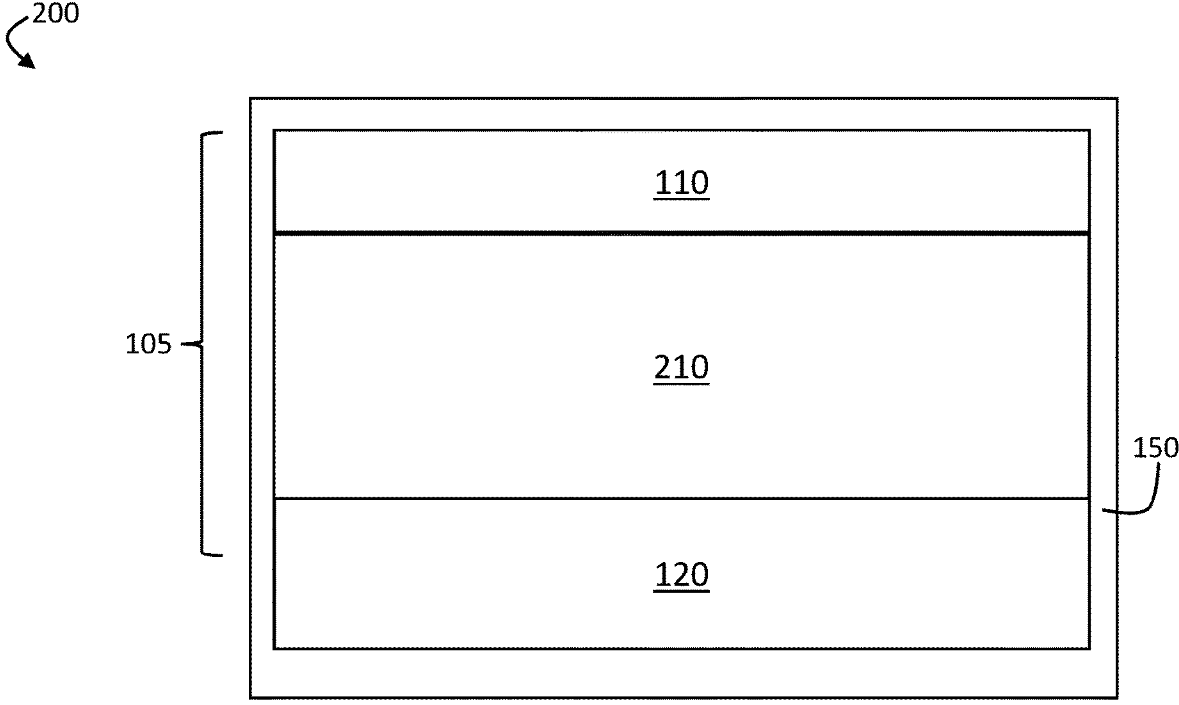
FIG. 2B is a schematic cross-sectional diagram of an electrochemical system comprising an electrochemical cell including a protective layer positioned on a base electrode material layer of a first electrode, in which the protective layer separates the first electrode and the second electrode, according to some embodiments.
Figure 3A:
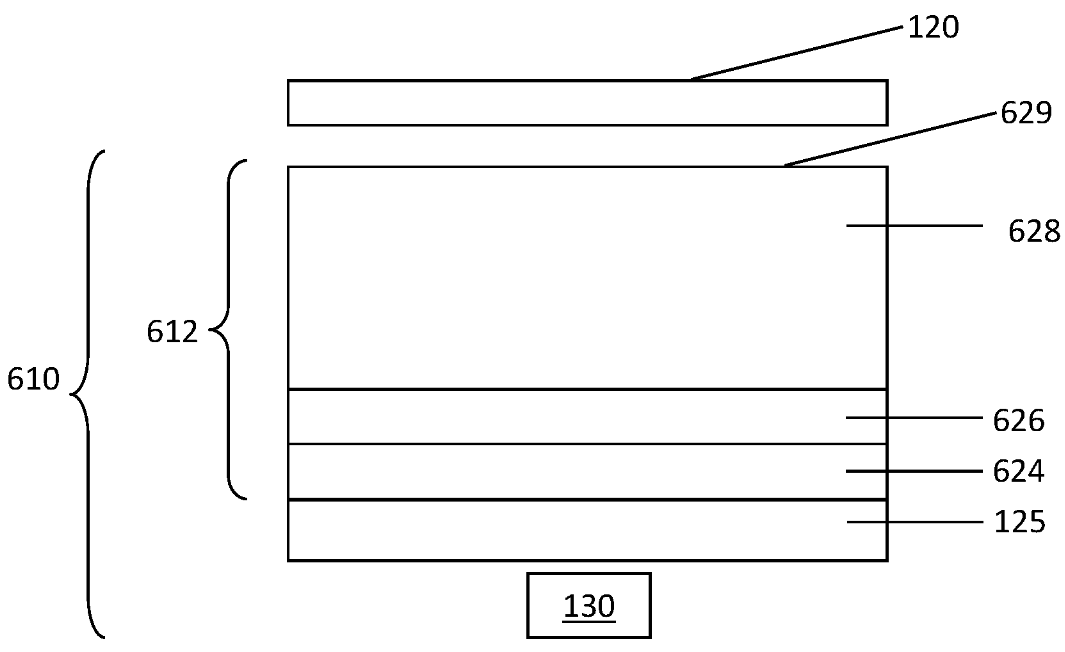
FIGS. 3A-3C schematically illustrate electrode assemblies comprising a release layer, according to some embodiments.
Figure 3B:
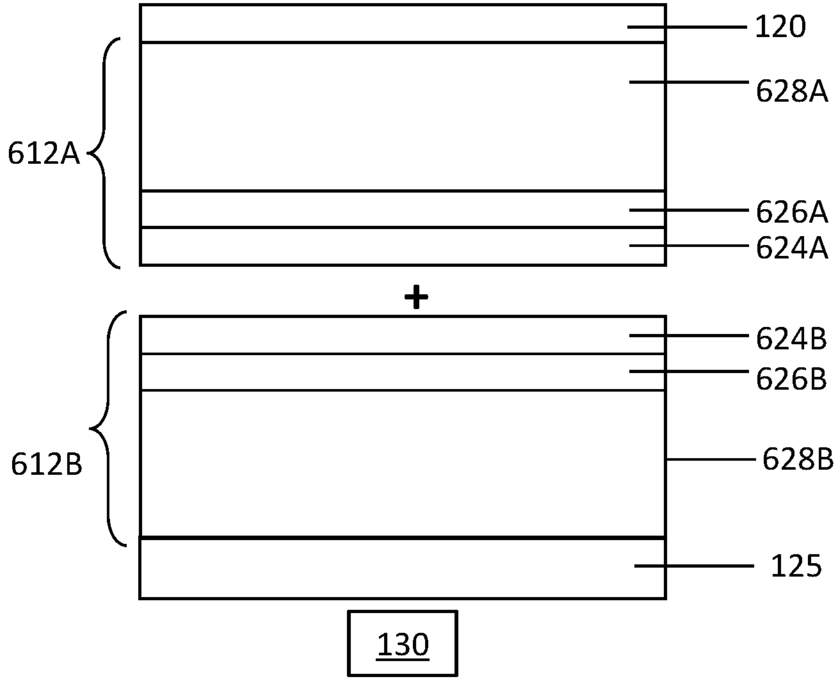
Figure 3C:
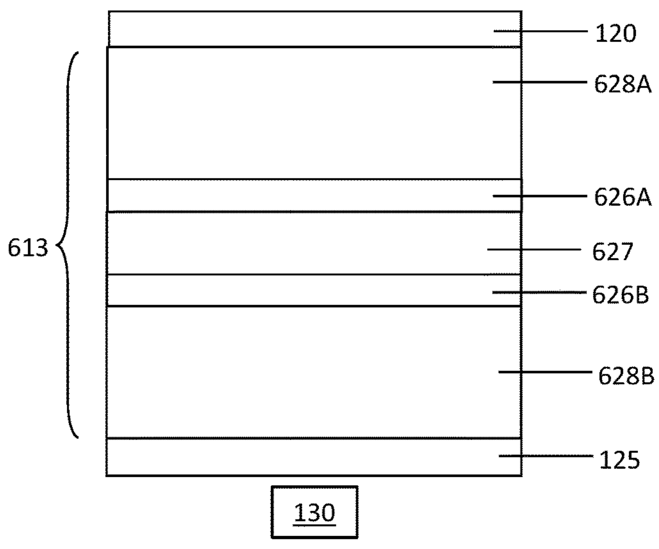

For some embodiments, the electrochemical cell may also comprise a protective layer. For example, FIG. 2A schematically illustrates an electrochemical system 200 with a protective layer 210 positioned adjacent to the first electrode 110. It should be noted that for embodiments comprising a protective layer, the protective later may serve as a separator and/or an electrolyte (e.g., a solid electrolyte, an electrolyte layer). For example, as illustrated schematically in FIG. 2B, the electrochemical system 200 includes a protective layer 210, but the separator 130 and electrolyte 140 are absent from the electrochemical cell 105 relative to FIG. 2A. Of course, in some embodiments, the electrochemical cell may comprise a protective layer in addition to a separator and/or an electrolyte (e.g., a liquid electrolyte) as this disclosure is not limited. In some embodiments one or more protective layers is included within the electrochemical cell. The nature of the protective layer may depend, at least in part, on the material(s) of the protective layer, and those skilled in the art, in view of this disclosure, will be capable of selecting appropriate materials for the protective layer. Additional details regarding the protective layer and other components are described further below.

As described in above, some electrochemical cells and/or systems may include a first electrode (e.g., an anode). The first electrode may include a base electrode material layer comprising a first active electrode species.

A variety of chemical species are suitable for the first active electrode species. In some embodiments, the first active electrode species includes an anode active material. In some embodiments, the first active electrode species comprises lithium. In some embodiments, the lithium is lithium metal, such as a layer of lithium metal. In some embodiments, the lithium metal is a lithium foil. In some embodiments, the lithium is deposited onto a conductive material (e.g., a current collector) or onto a non-conductive material (e.g., a non-conductive release layer). In some embodiments, the lithium metal is vacuum-deposited lithium metal (vdLi). In some embodiments, the lithium metal is a part of a lithium alloy (e.g., a lithium-aluminum alloy and lithium-tin alloy). The lithium may be present as one film or as several films, in some instances separated films. Suitable lithium alloys for use as the first active electrode material as described herein may include alloys of lithium with aluminum, magnesium, silicon, indium, calcium, silver, gallium, and/or tin.

In some embodiments comprising lithium, the lithium metal/lithium metal alloy may be present during only a portion of charge/discharge cycles. For example, the electrochemical cell may be constructed without any lithium metal/lithium metal alloy on a current collector (e.g., a current collector of the first electrode, an anode current collector), and the lithium metal/lithium metal alloy may subsequently be deposited on the current collector during a charging step. In some embodiments, lithium may be completely depleted after discharging such that lithium is present during only a portion of the charge/discharge cycle.

In some embodiments, an electrode (e.g., the first electrode) has greater than or equal to 50 wt % lithium, greater than or equal to 75 wt % lithium, greater than or equal to 80 wt % lithium, greater than or equal to 90 wt % lithium, greater than or equal to 95 wt % lithium, greater than or equal to 99 wt % lithium, or more. In some embodiments, an electrode has less than or equal to 99 wt % lithium, less than or equal to 95 wt % lithium, less than or equal to 90 wt % lithium, less than or equal to 80 wt % lithium, less than or equal to 75 wt % lithium, less than or equal to 50 wt % lithium, or less. Combinations of the above-reference ranges are also possible (e.g., greater than or equal to 90 wt % lithium and less than or equal to 99 wt % lithium). In some embodiments, the lithium is in the form of lithium metal and the above-mentioned ranges are with respect to amounts of lithium metal. Other ranges are possible.

In some embodiments, an electrode (e.g., the first electrode) is an anode from which lithium ions are liberated during discharge and into which the lithium ions are integrated (e.g., intercalated) during charge. In some embodiments, the first electrode comprises a lithium intercalation compound (e.g., a compound that is capable of reversibly inserting lithium ions at lattice sites and/or interstitial sites). In some embodiments, the first electrode comprises carbon or a carbon material. In some cases, the first electrode is or comprises a graphitic material (e.g., graphite). A graphitic material generally refers to a material that comprises a plurality of layers of graphene (i.e., layers comprising carbon atoms covalently bonded in a hexagonal lattice). Adjacent graphene layers are typically attracted to each other via van der Waals forces, although covalent bonds may also be present between one or more sheets, in some instances. In some embodiments, a carbon-comprising first electrode is or comprises coke (e.g., petroleum coke). In some embodiments, first active electrode species of the first electrode comprises silicon, lithium, and/or any alloys of combinations thereof. In some embodiments, the first active electrode species of the first electrode comprises lithium titanate ($Li_4Ti_5O_{12}$, also referred to as "LTO"), tin-cobalt oxide, or any combinations thereof.

The first electrode (or a base material layer of the first electrode) may be of any suitable thickness. In some embodiments, the first electrode has a thickness of greater than or equal to 10 μm, greater than or equal to 20 μm, greater than or equal to 30 μm, greater than or equal to 40 μm, greater than or equal to 50 μm, greater than or equal to 75 μm, greater than or equal to 100 μm, or more. In some embodiments, the first electrode has a thickness of less than or equal to 100 μm, less than or equal to 75 μm, less than or equal to 50 μm, less than or equal to 40 μm, less than or equal to 30 μm, less than or equal to 20 μm, less than or equal to 10 μm, or less. Combinations of the above-referenced ranges are also possible (e.g., greater than or equal to 10 μm and less than or equal to 100 μm). Other ranges are possible.

In some embodiments, an electrode (e.g., a first electrode, a negative electrode, an anode) may have a passivating layer disposed on at least a portion of a surface. In some embodiments, a passivating layer is disposed on a layer comprising lithium metal (e.g., a base electrode layer comprising lithium as the first electrode active species). In some embodiments, an article for inclusion in an electrochemical cell comprises lithium metal and further comprises one or more passivating species. The passivating species may passivate the lithium metal, thereby reducing its reactivity. There are several points in time during which it is desirable for the lithium metal to be passivated. By way of example, it may be desirable for the lithium metal to be passivated when undergoing one or more further fabrication processes that expose lithium metal deposited during a prior fabrication process to species reactive with lithium metal. As another example, in some embodiments it may be desirable for lithium metal to be passivated when present in an electrochemical cell undergoing cycling. Passivated lithium metal may desirably be less reactive and more stable than unpassivated lithium metal during these processes. For this reason, smaller amounts of lithium metal may be lost to chemical reactions, allowing a smaller amount of lithium metal to be used compared to an electrochemical cell without passivated lithium, all other factors being equal. Additionally or alternatively, the use of passivated lithium may result in the formation of electrochemical cells including lower levels of non-functional species.

Some embodiments relate to methods of forming articles for inclusion in electrochemical cells. Such methods may advantageously result in the formation of layers comprising lithium metal having a desirable type and/or quantity of passivation, arrangement of a passivating species, morphology, and/or other chemical and/or physical features of interest.

Figure 4:
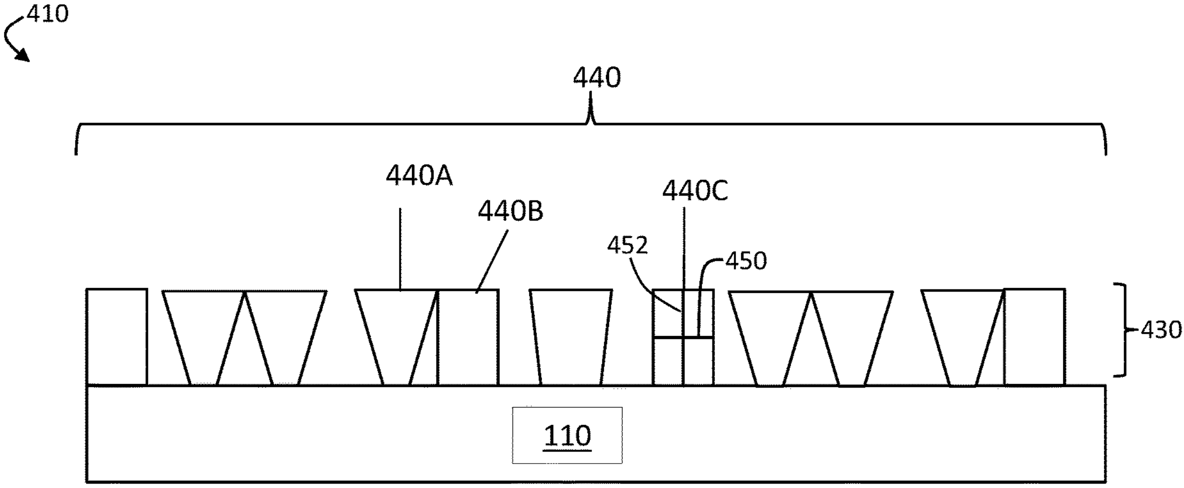
FIG. 4 is a schematic depiction of an electrode comprising layers, wherein at least one layer of the electrode comprises a plurality of columnar structures, according to some embodiments.

In some embodiments, a passivating layer comprises a plurality of columnar structures. For example, FIG. 4 shows an example of a portion of an electrochemical cell 410 including an electrode 110 comprising a layer 430 that comprises a plurality of columnar structures 440. When present, the plurality of columnar structures may make up the entirety of the layer (e.g., as schematically shown in FIG. 4), or the layer may further comprise one or more components that are non-columnar. Such embodiments may further comprise columnar structures that are not in topological contact with any other columnar structures through the layer disposed on the layer comprising lithium metal (e.g., the columnar structure 440C in FIG. 4), or may lack such columnar structures. When present, such columnar structures may have a variety of suitable aspect ratios. As used herein, the aspect ratio refers to the ratio of a "first" line segment to that of a "second" line segment, both of which are oriented parallel to principal axes of the columnar structure and have lengths equivalent to the lengths of the columnar structure projected thereon. The "first" line segment is the line segment having the longest such projected length and oriented in a direction other than parallel to the substrate or layer on which the columnar structure is directly disposed. The "second" line segment is the line segment having the second longest such projected length. In some embodiments, the first line may correspond to the length of the columnar structure and the second line may correspond to a width of the columnar structure. An example of this is illustrated schematically in FIG. 4, where columnar structure 440C has a first line segment 450 corresponding to the length of the columnar structure 440C and a second line segment 452 corresponding to the width of the columnar structure 440C.

When a passivating layer is present, columnar structures of the passivating layer may have a particular aspect ratio. In some embodiments, a columnar structure has an aspect ratio of greater than or equal to 0.5, greater than or equal to 0.75, greater than or equal to 1, greater than or equal to 1.25, greater than or equal to 1.5, greater than or equal to 1.75, greater than or equal to 2, greater than or equal to 2.25, greater than or equal to 2.5, greater than or equal to 2.75, greater than or equal to 3, greater than or equal to 3.5, greater than or equal to 4, or greater than or equal to 4.5. In some embodiments, a columnar structure has an aspect ratio of less than or equal to 5, less than or equal to 4.5, less than or equal to 4, less than or equal to 3.5, less than or equal to 3, less than or equal to 2.75, less than or equal to 2.5, less than or equal to 2.25, less than or equal to 2, less than or equal to 1.75, less than or equal to 1.5, less than or equal to 1.25, less than or equal to 1, or less than or equal to 0.75. Combinations of the above-referenced ranges are also possible (e.g., greater than or equal to 0.5 and less than or equal to 5). Other ranges are possible. The aspect ratio of a columnar structure may be determined by cross-sectional scanning electron microscopy.

In some embodiments, a passivating layer may comprise one or more columnar structures having a particular aspect ratio in one or more of the above-referenced ranges. It is also possible for a passivating layer to comprise a plurality of columnar structures, each of which (or at last 50% of which, at least 75% of which, at least 90% of which, or at least 95% of which) has an aspect ratio in one or more of the above-referenced ranges. In some embodiments, a plurality of columnar structures has an average aspect ratio in one or more of the above-referenced ranges. When an article for inclusion in an electrochemical cell comprises two or more passivating layers, one or more of the above features may be true for each layer independently.

In some embodiments, a passivating layer is porous. For instance, a passivating layer may have a porosity of greater than or equal to 5%, greater than or equal to 7.5%, greater than or equal to 10%, greater than or equal to 12.5%, greater than or equal to 15%, or greater than or equal to 17.5%. In some embodiments, a passivating layer has a porosity of less than or equal to 20%, less than or equal to 17.5%, less than or equal to 15%, less than or equal to 12.5%, less than or equal to 10%, or less than or equal to 7.5%. Combinations of the above-referenced ranges are also possible (e.g., greater than or equal to 5% and less than or equal to 20%). Other ranges are possible.

The porosity of a passivating layer may be determined by measuring the volume enclosed by the outer boundary of the composite passivating layer (e.g., by use of an electron microscope), measuring the pore volume of the passivating layer by employing ASTM standard D4284-07 as described below, dividing the measured pore volume by the volume enclosed by the passivating layer, and multiplying by 100%. ASTM standard D4284-07, incorporated herein by reference in its entirety, can be used to produce a distribution of pore sizes plotted as the cumulative intruded pore volume as a function of pore diameter. To calculate the porosity, one would calculate the area under the curve that spans the given range over the x-axis. Optionally, in cases where the article includes pore sizes that lie outside the range of pore sizes that can be accurately measured using ASTM standard D4284-07, porosimetry measurements may be supplemented using BET surface analysis, as described, for example, in S. Brunauer, P. H. Emmett, and E. Teller, J. Am. Chem. Soc., 1938, 60, 309, which is incorporated herein by reference in its entirety.

When an article for inclusion in an electrochemical cell (e.g., a first electrode, a second electrode) comprises two or more passivating layers, each passivating layer may independently have a porosity in one or more of the above-referenced ranges, and/or an aspect ratio in one or more of the above-referenced ranges.

The passivating layers described herein may have a wide variety of color spaces, and a wide variety of one or more parameters that make up a color space. The passivating layers described herein may also appear visually to have a variety of colors, such as red, yellow, green, and/or blue.

In some embodiments, a passivating layer has a lightness of greater than or equal to 10, greater than or equal to 12.5, greater than or equal to 15, greater than or equal to 17.5, greater than or equal to 20, greater than or equal to 22.5, greater than or equal to 25, greater than or equal to 27.5, greater than or equal to 30, greater than or equal to 35, greater than or equal to 40, greater than or equal to 45, greater than or equal to 50, greater than or equal to 55, greater than or equal to 60, greater than or equal to 65, greater than or equal to 70, greater than or equal to 75, or greater than or equal to 80. In some embodiments, a passivating layer has a lightness of less than or equal to 85, less than or equal to 80, less than or equal to 75, less than or equal to 70, less than or equal to 65, less than or equal to 60, less than or equal to 55, less than or equal to 50, less than or equal to 45, less than or equal to 40, less than or equal to 35, less than or equal to 30, less than or equal to 27.5, less than or equal to 25, less than or equal to 22.5, less than or equal to 20, less than or equal to 17.5, less than or equal to 15, or less than or equal to 12.5. Combinations of the above-referenced ranges are also possible (e.g., greater than or equal to 10 and less than or equal to 85). Other ranges are possible.

When an article for inclusion in an electrochemical cell (e.g., a first electrode) comprises two or more passivating layers, each passivating layer may independently have a lightness in one or more of the above-referenced ranges.

In some embodiments, a passivating layer has a red/green saturation (an "a" saturation) of greater than or equal to −3, greater than or equal to −2.5, greater than or equal to −2, greater than or equal to −1.5, greater than or equal to −1, greater than or equal to −0.5, greater than or equal to 0, greater than or equal to 0.5, greater than or equal to 1, greater than or equal to 1.5, greater than or equal to 2, greater than or equal to 2.5, greater than or equal to 3, greater than or equal to 3.5, greater than or equal to 4, greater than or equal to 4.5, greater than or equal to 5, greater than or equal to 6, greater than or equal to 8, greater than or equal to 10, greater than or equal to 12.5, or greater than or equal to 15. In some embodiments, a passivating layer has a red/green saturation of less than or equal to 20, less than or equal to 15, less than or equal to 12.5, less than or equal to 10, less than or equal to 8, less than or equal to 6, less than or equal to 5, less than or equal to 4.5, less than or equal to 4, less than or equal to 3.5, less than or equal to 3, less than or equal to 2.5, less than or equal to 2, less than or equal to 1.5, less than or equal to 1, less than or equal to 0.5, less than or equal to 0, less than or equal to −0.5, less than or equal to −1, less than or equal to −1.5, less than or equal to −2, or less than or equal to −2.5. Combinations of the above-referenced ranges are also possible (e.g., greater than or equal to −3 and less than or equal to 20, or greater than or equal to −1 and less than or equal to 4). Other ranges are also possible.

When an article for inclusion in an electrochemical cell (e.g., a first electrode) comprises two or more passivating layers, each passivating layer may independently have a red/green saturation in one or more of the above-referenced ranges.

In some embodiments, a passivating layer has a yellow/blue saturation (a "b" saturation) of greater than or equal to −3, greater than or equal to −2.5, greater than or equal to −2, greater than or equal to −1.5, greater than or equal to −1, greater than or equal to −0.5, greater than or equal to 0, greater than or equal to 0.5, greater than or equal to 1, greater than or equal to 1.5, greater than or equal to 2, greater than or equal to 2.5, greater than or equal to 3, greater than or equal to 3.5, greater than or equal to 4, greater than or equal to 4.5, greater than or equal to 5, greater than or equal to 6, greater than or equal to 8, greater than or equal to 10, greater than or equal to 12.5, or greater than or equal to 15. In some embodiments, a passivating layer has a yellow/blue saturation of less than or equal to 20, less than or equal to 15, less than or equal to 12.5, less than or equal to 10, less than or equal to 8, less than or equal to 6, less than or equal to 5, less than or equal to 4.5, less than or equal to 4, less than or equal to 3.5, less than or equal to 3, less than or equal to 2.5, less than or equal to 2, less than or equal to 1.5, less than or equal to 1, less than or equal to 0.5, less than or equal to 0, less than or equal to −0.5, less than or equal to −1, less than or equal to −1.5, less than or equal to −2, or less than or equal to −2.5. Combinations of the above-referenced ranges are also possible (e.g., greater than or equal to −3 and less than or equal to 20, or greater than or equal to −1 and less than or equal to 4). Other ranges are possible.

When an article for inclusion in an electrochemical cell (e.g., a first electrode) comprises two or more passivating layers, each passivating layer may independently have a yellow/blue saturation in one or more of the above-referenced ranges.

In some embodiments, a passivating layer has a chroma of greater than or equal to −2, greater than or equal to −1.5, greater than or equal to −1, greater than or equal to −0.5, greater than or equal to 0, greater than or equal to 0.5, greater than or equal to 1, greater than or equal to 1.5, greater than or equal to 2, greater than or equal to 2.5, greater than or equal to 3, greater than or equal to 3.5, greater than or equal to 4, greater than or equal to 4.5, greater than or equal to 5, greater than or equal to 6, greater than or equal to 8, greater than or equal to 10, greater than or equal to 12.5, or greater than or equal to 15. In some embodiments, a passivating layer has a chroma of less than or equal to 20, less than or equal to 15, less than or equal to 12.5, less than or equal to 10, less than or equal to 8, less than or equal to 6, less than or equal to 5, less than or equal to 4.5, less than or equal to 4, less than or equal to 3.5, less than or equal to 3, less than or equal to 2.5, less than or equal to 2, less than or equal to 1.5, less than or equal to 1, less than or equal to 0.5, less than or equal to 0, less than or equal to −0.5, less than or equal to −1, or less than or equal to −1.5. Combinations of the above-referenced ranges are also possible (e.g., greater than or equal to −2 and less than or equal to 20). Other ranges are possible.

When an article for inclusion in an electrochemical cell (e.g., a first electrode) comprises two or more passivating layers, each passivating layer may independently have a chroma in one or more of the above-referenced ranges.

In some embodiments, a passivating layer has a hue of greater than or equal to −2°, greater than or equal to 0°, greater than or equal to 2°, greater than or equal to 5°, greater than or equal to 7.5°, greater than or equal to 10°, greater than or equal to 20°, greater than or equal to 50°, greater than or equal to 75°, greater than or equal to 100°, greater than or equal to 125°, greater than or equal to 150°, greater than or equal to 175°, greater than or equal to 200°, greater than or equal to 225°, greater than or equal to 250°, greater than or equal to 275°, greater than or equal to 300°, or greater than or equal to 325°. In some embodiments, a passivating layer has a hue of less than or equal to 360°, less than or equal to 325°, less than or equal to 300°, less than or equal to 275°, less than or equal to 250°, less than or equal to 225°, less than or equal to 200°, less than or equal to 175°, less than or equal to 150°, less than or equal to 125°, less than or equal to 100°, less than or equal to 75°, less than or equal to 50°, less than or equal to 20°, less than or equal to 10°, less than or equal to 7.5°, less than or equal to 5°, less than or equal to 2°, or less than or equal to 0°. Combinations of the above-referenced ranges are also possible (e.g., greater than or equal to −2° and less than or equal to 360°, or greater than or equal to 10° and less than or equal to 350°). Other ranges are possible.

When an article for inclusion in an electrochemical cell (e.g., a first electrode) comprises two or more passivating layers, each passivating layer may independently have a hue in one or more of the above-referenced ranges.

In some embodiments, a passivating layer is relatively smooth. The smoothness or roughness of a passivating layer may be characterized in a variety of manners. The techniques below may be employed with reference to cross-section of the passivating layer, and it should be understood that some passivating layers may comprise at least one cross-section having one or more of the properties described below, that some passivating layers may be made up exclusively of cross-sections having one or more of the properties described below, and that some passivating layers may have a morphology such that a majority of the cross-sections have one or more of the properties below (e.g., at least 50% of the cross-sections, at least 75% of the cross-sections, at least 90% of the cross-sections, at least 95% of the cross-sections, or at least 99% of the cross-sections). The smoothness and/or roughness of a passivating can be determined using atomic force microscopy using ISO 19606.

In some embodiments, a passivating layer has a value of R a (average roughness) of less than or equal to 1.5 microns, less than or equal to 1.25 microns, less than or equal to 1 micron, less than or equal to 0.75 microns, less than or equal to 0.5 microns, less than or equal to 0.25 microns, less than or equal to 0.2 microns, less than or equal to 0.18 microns, less than or equal to 0.15 microns, less than or equal to 0.125 microns, less than or equal to 0.1 micron, or less than or equal to 0.075 microns. In some embodiments, a passivating layer has a value of R a of greater than or equal to 0.05 microns, greater than or equal to 0.075 microns, greater than or equal to 0.1 micron, greater than or equal to 0.125 microns, greater than or equal to 0.15 microns, greater than or equal to 0.18 microns, greater than or equal to 0.2 microns, greater than or equal to 0.25 microns, greater than or equal to 0.5 microns, greater than or equal to 0.75 microns, greater than or equal to 1 micron, or greater than or equal to 1.25 microns. Combinations of the above-referenced ranges are also possible (e.g., less than or equal to 1.5 microns and greater than or equal to 0.05 microns). Other ranges are possible.

When an article for inclusion in an electrochemical cell (e.g., a first electrode) comprises two or more passivating layers, each passivating layer may independently have a value of $R_a$ in one or more of the above-referenced ranges.

In some embodiments, a passivating layer has a value of $R_q$ (root mean square (RMS) roughness) of less than or equal to 2.5 microns, less than or equal to 2.25 microns, less than or equal to 2 microns, less than or equal to 1.75 microns, less than or equal to 1.5 microns, less than or equal to 1.25 microns, less than or equal to 1 micron, less than or equal to 0.75 microns, less than or equal to 0.5 microns, less than or equal to 0.4 microns, less than or equal to 0.3 microns, or less than or equal to 0.2 microns. In some embodiments, a passivating layer has a value of $R_q$ of greater than or equal to 0.1 micron, greater than or equal to 0.2 microns, greater than or equal to 0.3 microns, greater than or equal to 0.4 microns, greater than or equal to 0.5 microns, greater than or equal to 0.75 microns, greater than or equal to 1 micron, greater than or equal to 1.25 microns, greater than or equal to 1.5 microns, greater than or equal to 1.75 microns, greater than or equal to 2 microns, or greater than or equal to 2.25 microns. Combinations of the above-referenced ranges are also possible (e.g., less than or equal to 2.5 microns and greater than or equal to 0.1 micron). Other ranges also possible.

When an article for inclusion in an electrochemical cell (e.g., a first electrode) comprises two or more passivating layers, each passivating layer may independently have a value of $R_q$ in one or more of the above-referenced ranges.

In some embodiments, a passivating layer has a value of $R_p$ (peak height profile) of less than or equal to 15 microns, less than or equal to 12.5 microns, less than or equal to 10 microns, less than or equal to 7.5 microns, less than or equal to 5 microns, less than or equal to 2.5 microns, less than or equal to 2 microns, less than or equal to 1.5 microns, or less than or equal to 1 micron. In some embodiments, a passivating layer has a value of $R_p$ of greater than or equal to 0.5 microns, greater than or equal to 1 micron, greater than or equal to 1.5 microns, greater than or equal to 2 microns, greater than or equal to 2.5 microns, greater than or equal to 5 microns, greater than or equal to 7.5 microns, greater than or equal to 10 microns, or greater than or equal to 12.5 microns. Combinations of the above-referenced ranges are also possible (e.g., less than or equal to 15 microns and greater than or equal to 0.5 microns). Other ranges are possible.

When an article for inclusion in an electrochemical cell (e.g., a first electrode) comprises two or more passivating layers, each passivating layer may independently have a value of $R_p$ in one or more of the above-referenced ranges.

In some embodiments, a passivating layer has a value of $R_v$ (valley depth profile) of greater than or equal to less than or equal to −15 microns, greater than or equal to −12.5 microns, greater than or equal to −10 microns, greater than or equal to −7.5 microns, greater than or equal to −5 microns, greater than or equal to −2.5 microns, greater than or equal to −2 microns, greater than or equal to −1.5 microns, or greater than or equal to −1 micron. In some embodiments, a passivating layer has a value of $R_v$ of less than or equal to −0.5 microns, less than or equal to −1 micron, less than or equal to −1.5 microns, less than or equal to −2 microns, less than or equal to −2.5 microns, less than or equal to −5 microns, less than or equal to −7.5 microns, less than or equal to −10 microns, or less than or equal to −12.5 microns. Combinations of the above-referenced ranges are also possible (e.g., greater than or equal to −15 microns and less than or equal to −0.5 microns). Other ranges are possible.

When an article for inclusion in an electrochemical cell (e.g., a first electrode) comprises two or more passivating layers, each passivating layer may independently have a value of $R_v$ in one or more of the above-referenced ranges.

In some embodiments, a passivating layer has a value of $R_t$ (total height profile) of less than or equal to 30 microns, less than or equal to 25 microns, less than or equal to 20 microns, less than or equal to 15 microns, less than or equal to 10 microns, less than or equal to 7.5 microns, less than or equal to 5 microns, less than or equal to 4 microns, less than or equal to 3 microns, less than or equal to 2.5 microns, less than or equal to 2 microns, or less than or equal to 1.5 microns. In some embodiments, a passivating layer has a value of $R_t$ of greater than or equal to 1 micron, greater than or equal to 1.5 microns, greater than or equal to 2 microns, greater than or equal to 2.5 microns, greater than or equal to 3 microns, greater than or equal to 4 microns, greater than or equal to 5 microns, greater than or equal to 7.5 microns, greater than or equal to 10 microns, greater than or equal to 15 microns, greater than or equal to 20 microns, or greater than or equal to 25 microns. Combinations of the above-referenced ranges are also possible (e.g., less than or equal to 25 microns and greater than or equal to 1 micron). Other ranges are possible.

When an article for inclusion in an electrochemical cell (e.g., a first electrode) comprises two or more passivating layers, each passivating layer may independently have a value of $R_t$ in one or more of the above-referenced ranges.

In some embodiments, a passivating layer has a value of $R_{pm}$ (average asperity of surface) of less than or equal to 15 microns, less than or equal to 12.5 microns, less than or equal to 10 microns, less than or equal to 7.5 microns, less than or equal to 5 microns, less than or equal to 3 microns, less than or equal to 2 microns, less than or equal to 1.5 microns, less than or equal to 1 micron, or less than or equal to 0.75 microns. In some embodiments, a passivating layer has a value of $R_{pm}$ of greater than or equal to 0.5 microns, greater than or equal to 0.75 microns, greater than or equal to 1 micron, greater than or equal to 1.5 microns, greater than or equal to 2 microns, greater than or equal to 3 microns, greater than or equal to 5 microns, greater than or equal to 7.5 microns, greater than or equal to 10 microns, or greater than or equal to 12.5 microns. Combinations of the above-referenced ranges are also possible (e.g., less than or equal to 15 microns and greater than or equal to 0.5 microns). Other ranges are possible.

When an article for inclusion in an electrochemical cell (e.g., a first electrode) comprises two or more passivating layers, each passivating layer may independently have a value of $R_{pm}$ in one or more of the above-referenced ranges.

In some embodiments, a passivating layer has a value of $R_{vm}$ (average maximum valley depth) of greater than or equal to −15 microns, greater than or equal to −12.5 microns, greater than or equal to −10 microns, greater than or equal to −7.5 microns, greater than or equal to −5 microns, greater than or equal to −3 microns, greater than or equal to −2 microns, greater than or equal to −1.5 microns, greater than or equal to 1 micron, or greater than or equal to −0.75 microns. In some embodiments, a passivating layer has a value of $R_{vm}$ of less than or equal to −0.5 microns, less than or equal to −0.75 microns, less than or equal to −1 micron, less than or equal to −1.5 microns, less than or equal to −2 microns, less than or equal to −3 microns, less than or equal to −5 microns, less than or equal to −7.5 microns, less than or equal to −10 microns, or less than or equal to −12.5 microns. Combinations of the above-referenced ranges are also possible (e.g., greater than or equal to −15 microns and less than or equal to −1 micron). Other ranges are possible.

When an article for inclusion in an electrochemical cell (e.g., a first electrode) comprises two or more passivating layers, each passivating layer may independently have a value of $R_{vm}$ in one or more of the above-referenced ranges.

In some embodiments, a passivating layer has a value of $R_z$ (average maximum height of the surface) of less than or equal to 20 microns, less than or equal to 17.5 microns, less than or equal to 15 microns, less than or equal to 12.5 microns, less than or equal to 10 microns, less than or equal to 7.5 microns, less than or equal to 5 microns, or less than or equal to 2.5 microns. In some embodiments, a passivating layer has a value of 12, of greater than or equal to 1 micron, greater than or equal to 2.5 microns, greater than or equal to 5 microns, greater than or equal to 7.5 microns, greater than or equal to 10 microns, greater than or equal to 12.5 microns, greater than or equal to 15 microns, or greater than or equal to 17.5 microns. Combinations of the above-referenced ranges are also possible (e.g., less than or equal to 20 microns and greater than or equal to 1 micron). Other ranges are possible.

When an article for inclusion in an electrochemical cell (e.g., a first electrode) comprises two or more passivating layers, each passivating layer may independently have a value of $R_z$ in one or more of the above-referenced ranges.

In some embodiments, a passivating layer has a value of $S_m$ (mean spacing between peaks) of less than or equal to 1 square micron, less than or equal to 0.75 square microns, less than or equal to 0.5 square microns, less than or equal to 0.3 square microns, less than or equal to 0.2 square microns, less than or equal to 0.15 square microns, less than or equal to 0.1 square micron, less than or equal to 0.075 square microns, less than or equal to 0.05 square microns, less than or equal to 0.03 square microns, less than or equal to 0.02 square microns, less than or equal to 0.015 square microns, less than or equal to 0.01 square micron, less than or equal to 0.0075 square microns, less than or equal to 0.005 square microns, less than or equal to 0.003 square microns, or less than or equal to 0.002 square microns. In some embodiments, a passivating layer has a value of $S_m$ of greater than or equal to 0.001 square micron, greater than or equal to 0.002 square microns, greater than or equal to 0.003 square microns, greater than or equal to 0.005 square microns, greater than or equal to 0.0075 square microns, greater than or equal to 0.01 square micron, greater than or equal to 0.02 square microns, greater than or equal to 0.05 square microns, greater than or equal to 0.075 square microns, greater than or equal to 0.1 square micron, greater than or equal to 0.15 square microns, greater than or equal to 0.2 square microns, greater than or equal to 0.3 square microns, greater than or equal to 0.5 square microns, or greater than or equal to 0.75 square microns. Combinations of the above-referenced ranges are also possible (e.g., less than or equal to 1 square micron and greater than or equal to 0.001 square micron). Other ranges are also possible.

When an article for inclusion in an electrochemical cell comprises two or more passivating layers, each passivating layer may independently have a value of $S_m$ in one or more of the above-referenced ranges.

In some embodiments, a passivating layer has a value of $S_{bi}$ (surface bearing index) of less than or equal to 2 microns, less than or equal to 1.75 microns, less than or equal to 1.5 microns, less than or equal to 1.25 microns, less than or equal to 1.1 microns, less than or equal to 1 micron, less than or equal to 0.95 microns, less than or equal to 0.9 microns, less than or equal to 0.85 microns, less than or equal to 0.8 microns, less than or equal to 0.6 microns, less than or equal to 0.4 microns, less than or equal to 0.35 microns, less than or equal to 0.3 microns, less than or equal to 0.25 microns, less than or equal to 0.2 microns, less than or equal to 0.15 microns, or less than or equal to 0.125 microns. In some embodiments, a passivating layer has a value of $S_{bi}$ of greater than or equal to 0.1 micron, greater than or equal to 0.125 microns, greater than or equal to 0.15 microns, greater than or equal to 0.2 microns, greater than or equal to 0.25 microns, greater than or equal to 0.3 microns, greater than or equal to 0.35 microns, greater than or equal to 0.4 microns, greater than or equal to 0.6 microns, greater than or equal to 0.8 microns, greater than or equal to 0.85 microns, greater than or equal to 0.9 microns, greater than or equal to 0.95 microns, greater than or equal to 1 micron, greater than or equal to 1.1 microns, greater than or equal to 1.25 microns, greater than or equal to 1.5 microns, or greater than or equal to 1.75 microns. Combinations of the above-referenced ranges are also possible (e.g., less than or equal to 2 microns and greater than or equal to 0.1 micron). Other ranges are possible.

When an article for inclusion in an electrochemical cell (e.g., a first electrode) comprises two or more passivating layers, each passivating layer may independently have a value of $S_{bi}$ in one or more of the above-referenced ranges.

In some embodiments, a passivating layer has a value of $S_{dq}$ (root mean square of the gradient of surface texture) of less than or equal to 100, less than or equal to 90, less than or equal to 80, less than or equal to 70, less than or equal to 60, less than or equal to 50, less than or equal to 40, less than or equal to 30, or less than or equal to 20. In some embodiments, a passivating layer has a value of $S_{dq}$ of greater than or equal to 10, greater than or equal to 20, greater than or equal to 30, greater than or equal to 40, greater than or equal to 50, greater than or equal to 60, greater than or equal to 70, greater than or equal to 80, or greater than or equal to 90. Combinations of the above-referenced ranges are also possible (e.g., less than or equal to 100 and greater than or equal to 10). Other ranges are possible.

When an article for inclusion in an electrochemical cell (e.g., a first electrode) comprises two or more passivating layers, each passivating layer may independently have a value of $S_{dq}$ in one or more of the above-referenced ranges.

In some embodiments, a passivating layer has a value of $S_{ku}$ (kurtosis) of less than or equal to 70, less than or equal to 60, less than or equal to 50, less than or equal to 40, less than or equal to 30, less than or equal to 25, less than or equal to 20, less than or equal to 15, less than or equal to 12.5, less than or equal to 10, less than or equal to 8, less than or equal to 6, less than or equal to 5, less than or equal to 4, less than or equal to 3.5, less than or equal to 3, or less than or equal to 2.5. In some embodiments, a passivating layer has a value of $S_{ku}$ of greater than or equal to 2, greater than or equal to 2.5, greater than or equal to 3, greater than or equal to 3.5, greater than or equal to 4, greater than or equal to 5, greater than or equal to 6, greater than or equal to 8, greater than or equal to 10, greater than or equal to 12.5, greater than or equal to 15, greater than or equal to 20, greater than or equal to 25, greater than or equal to 30, greater than or equal to 40, greater than or equal to 50, or greater than or equal to 60. Combinations of the above-referenced ranges are also possible (e.g., less than or equal to 70 and greater than or equal to 2). Other ranges are possible.

When an article for inclusion in an electrochemical cell (e.g., a first electrode) comprises two or more passivating layers, each passivating layer may independently have a value of $S_{ku}$ in one or more of the above-referenced ranges.

In some embodiments, a passivating layer has a value of $S_{sk}$ (degree of bias of the roughness shape) of less than or equal to 5, less than or equal to 4.5, less than or equal to 4, less than or equal to 3.5, less than or equal to 3, less than or equal to 2.5, less than or equal to 2, less than or equal to 1.5, less than or equal to 1, less than or equal to 0.75, less than or equal to 0.5, less than or equal to 0.3, less than or equal to 0.2, less than or equal to 0.1, less than or equal to 0, less than or equal to −0.1, less than or equal to −0.2, less than or equal to −0.3, less than or equal to −0.5, less than or equal to −0.75, less than or equal to −1, or less than or equal to −1.5. In some embodiments, a passivating layer has a value of $S_{sk}$ of greater than or equal to −2, greater than or equal to −1.5, greater than or equal to −1, greater than or equal to −0.75, greater than or equal to −0.5, greater than or equal to −0.3, greater than or equal to −0.2, greater than or equal to −0.1, greater than or equal to 0, greater than or equal to 0.1, greater than or equal to 0.2, greater than or equal to 0.3, greater than or equal to 0.5, greater than or equal to 0.75, greater than or equal to 1, greater than or equal to 1.5, greater than or equal to 2, greater than or equal to 2.5, greater than or equal to 3, greater than or equal to 3.5, greater than or equal to 4, or greater than or equal to 4.5. Combinations of the above-referenced ranges are also possible (e.g., less than or equal to 5 and greater than or equal to −2). Other ranges are possible.

When an article for inclusion in an electrochemical cell comprises two or more passivating layers, each passivating layer may independently have a value of $S_{ku}$ in one or more of the above-referenced ranges.

When present, a passivating layer may have a variety of suitable compositions. In some embodiments, a passivating layer comprises a reaction product of lithium metal with a gas reactive therewith. Accordingly, in some embodiments, a passivating layer comprises lithium in one or more forms (e.g., lithium ions, ceramics comprising lithium). It is also possible for a passivating layer to be deposited from a gas that has not undergone a reaction with lithium metal and/or has undergone such a reaction to a relatively low extent. Such passivating layers may lack lithium and/or may comprise lithium in relatively low amounts. For instance, they may comprise ceramics lacking lithium and/or including lithium in relatively low amounts. Some passivating layers may comprise, for instance, a non-metal and/or a metalloid. Suitable non-metals include carbon, oxygen, hydrogen, sulfur, nitrogen, selenium, and various halogens (e.g., fluorine, bromine, iodine). Suitable metalloids include boron, silicon, antimony, and tellurium. In some embodiments, a passivating layer comprises two or more species (e.g., two or more non-metals). Non-limiting examples of combinations of such species include: oxygen and carbon; oxygen and hydrogen; sulfur and oxygen; sulfur and carbon; sulfur, oxygen, and carbon; nitrogen and oxygen; nitrogen and hydrogen; fluorine and sulfur; fluorine, carbon, and hydrogen; fluorine and silicon; and carbon and hydrogen. For example, in some embodiments, the electrochemical cell further comprises a passivating layer disposed on the first and/or the second electrode, wherein the passivating layer comprises boron, phosphorus, antimony, selenium, tellurium, hydrogen, and/or a halogen.

When an article for inclusion in an electrochemical cell (e.g., a first electrode) comprises two or more passivating layers, each passivating layer may independently comprise one or more of the above-referenced species.

When a passivating layer comprises both carbon and oxygen, the ratio of carbon to oxygen may generally be selected as desired. For instance, the ratio of carbon to oxygen may be greater than or equal to 0.01, greater than or equal to 0.02, greater than or equal to 0.05, greater than or equal to 0.075, greater than or equal to 0.1, greater than or equal to 0.15, greater than or equal to 0.2, greater than or equal to 0.25, greater than or equal to 0.3, greater than or equal to 0.35, greater than or equal to 0.4, or greater than or equal to 0.45. In some embodiments, the ratio of carbon to oxygen in a passivating layer is less than or equal to 0.5, less than or equal to 0.45, less than or equal to 0.4, less than or equal to 0.35, less than or equal to 0.3, less than or equal to 0.25, less than or equal to 0.2, less than or equal to 0.15, less than or equal to 0.1, less than or equal to 0.075, less than or equal to 0.05, or less than or equal to 0.02. Combinations of the above-referenced ranges are also possible (e.g., greater than or equal to 0.01 and less than or equal to 0.5). Other ranges are possible. The ratio of carbon to oxygen in a passivating layer may be determined by energy dispersive spectroscopy.

When an article for inclusion in an electrochemical cell (e.g., a first electrode) comprises two or more passivating layers, each passivating layer may independently have a ratio of carbon to oxygen in one or more of the above-referenced ranges.

In some embodiments, a passivating layer comprises both carbon and sulfur. In such layers, the ratio of carbon to sulfur may generally be selected as desired. For instance, the ratio of carbon to sulfur may be greater than or equal to 0.01, greater than or equal to 0.02, greater than or equal to 0.05, greater than or equal to 0.075, greater than or equal to 0.1, greater than or equal to 0.15, greater than or equal to 0.2, greater than or equal to 0.25, greater than or equal to 0.3, greater than or equal to 0.35, or greater than or equal to 0.4. In some embodiments, the ratio of carbon to sulfur in a passivating layer is less than or equal to 0.45, less than or equal to 0.4, less than or equal to 0.35, less than or equal to 0.3, less than or equal to 0.25, less than or equal to 0.2, less than or equal to 0.15, less than or equal to 0.1, less than or equal to 0.075, less than or equal to 0.05, or less than or equal to 0.02. Combinations of the above-referenced ranges are also possible (e.g., greater than or equal to 0.01 and less than or equal to 0.45). Other ranges are possible. The ratio of carbon to sulfur in a passivating layer may be determined by energy dispersive spectroscopy.

When an article for inclusion in an electrochemical cell (e.g., a first electrode) comprises two or more passivating layers, each passivating layer may independently have a ratio of carbon to sulfur in one or more of the above-referenced ranges.

In some embodiments, a passivating layer comprises both carbon and fluorine. In such layers, the ratio of carbon to fluorine may generally be selected as desired. For instance, the ratio of carbon to fluorine may be greater than or equal to 0.01, greater than or equal to 0.02, greater than or equal to 0.05, greater than or equal to 0.075, greater than or equal to 0.1, greater than or equal to 0.15, greater than or equal to 0.2, greater than or equal to 0.25, greater than or equal to 0.3, or greater than or equal to 0.35. In some embodiments, the ratio of carbon to fluorine in a passivating layer is less than or equal to 0.4, less than or equal to 0.35, less than or equal to 0.3, less than or equal to 0.25, less than or equal to 0.2, less than or equal to 0.15, less than or equal to 0.1, less than or equal to 0.075, less than or equal to 0.05, or less than or equal to 0.02. Combinations of the above-referenced ranges are also possible (e.g., greater than or equal to 0.01 and less than or equal to 0.4). Other ranges are possible. The ratio of carbon to fluorine in a passivating layer may be determined by energy dispersive spectroscopy.

When an article for inclusion in an electrochemical cell comprises two or more passivating layers, each passivating layer may independently have a ratio of carbon to fluorine in one or more of the above-referenced ranges.

An electrode (e.g., a first electrode, a second electrode), or some other component of the electrochemical cell, may comprise a coating in some instances. In some embodiments, this coating may also passivate the surface of the electrode. In some embodiments, the coating may comprise a reaction product of a silylated sulfonic acid ester.

As described herein, silylated sulfonic acid esters can be used as electrolyte additives which may reduce the formation of gaseous by-products in an electrochemical cell. In some embodiments, electrolytes, articles, and methods comprise a silylated sulfonic acid ester as described below. As understood by those skilled in the art, a silylated sulfonic acid ester is the product of the reaction between a sulfonic acid and a silanol. However, other reactions may produce silylated sulfonic acid esters, as the formation of these compounds is not limited to only the reaction of a sulfonic acid and a silanol. It will be understood by those skilled in the art that silylated sulfonic acid esters may also be referred to as silyl sulfonates. As one example, a silylated sulfonic acid ester may comprise bis(trimethylsilyl) sulfate, as shown here:

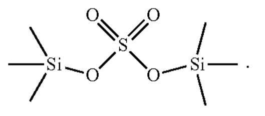

This compound can be formed by the reaction of trichloromethylsilane and sulfuric acid, although other synthetic routes may be used to form this compound. Additional examples of silylated sulfonic acid esters (i.e., silyl sulfonates) are described in more detail below.

In some embodiments, an electrolyte additive for forming a coating comprises the formula:

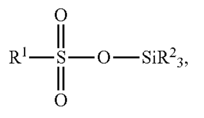

wherein, each $R^1$ and $R^2$ can be the same or different and each is independently selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl. In some embodiments, $R^1$ and $R^2$ are each independently selected from substituted or unsubstituted nitroaryl; substituted or unsubstituted fused aryl; and substituted or unsubstituted perfluoroalkyl aryl. In some embodiments, the electrolyte additive comprises the formula:

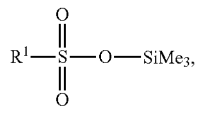

wherein $R^1$ is selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl. In some embodiments, $R^1$ is selected from substituted or unsubstituted nitroaryl; substituted or unsubstituted fused aryl; and substituted or unsubstituted perfluoroalkyl aryl. In some embodiments, the electrolyte additive comprises the formula:

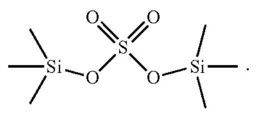

In some embodiments, the silylated sulfonic acid ester for forming a coating comprises an aromatic sulfonic acid ester. In some embodiments, an electrolyte additive comprises the formula:

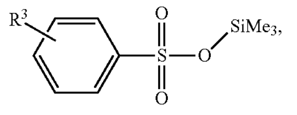

wherein $R^3$ is selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl. In some embodiments, $R^3$ is selected from substituted or unsubstituted nitroaryl; substituted or unsubstituted fused aryl; and substituted or unsubstituted perfluoroalkyl aryl. In some embodiments, the electrolyte additive comprises the formula:

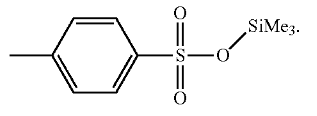

In some embodiments, a silylated sulfonic acid ester for forming a coating comprises a linked bisulfonate. In some embodiments, an electrolyte additive comprises the formula:

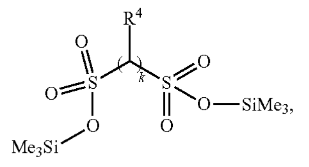

wherein $R^4$ is selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl, and wherein $1 \leq k \leq 10$. For example, in some cases, k=1, 2, 3, 4, 5, 6, 7, 8, 9, or 10. In some embodiments, $R^4$ is selected from substituted or unsubstituted nitroaryl; substituted or unsubstituted fused aryl; and substituted or unsubstituted perfluoroalkyl aryl. In some embodiments, the electrolyte additive comprises the formula:

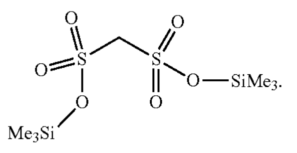

In some embodiments, a silylated sulfonic acid ester for forming a coating comprises a cyclic sulfonic acid ester. In some embodiments, an electrolyte additive comprises the formula:

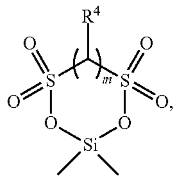

wherein $R^4$ is selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl, and wherein where $1 \leq m \leq 10$. For example, in some cases, m=1, 2, 3, 4, 5, 6, 7, 8, 9, or 10. In some embodiments, $R^4$ is selected from substituted or unsubstituted nitroaryl; substituted or unsubstituted fused aryl; and substituted or unsubstituted perfluoroalkyl aryl. In some embodiments, the electrolyte additive comprises the formula:

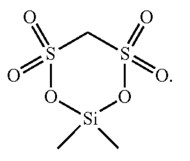

In some embodiments, an electrolyte additive for forming a coating comprises the formula:

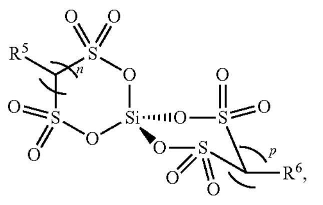

wherein, each $R^5$ and $R^6$ can be the same or different and each is independently selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl, wherein $1 \leq n \leq 10$, and wherein $1 \leq p \leq 10$. For example, in some cases, n=1, 2, 3, 4, 5, 6, 7, 8, 9, or 10, and, in some cases, p=1, 2, 3, 4, 5, 6, 7, 8, 9, or 10. In some embodiments, $R^5$ and $R^6$ are independently selected from substituted or unsubstituted nitroaryl; substituted or unsubstituted fused aryl; and substituted or unsubstituted perfluoroalkyl aryl. In some embodiments, the electrolyte additive comprises the formula:

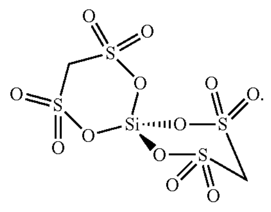

As described above, silylated sulfonic acid esters can comprise branched or unbranched aliphatic as R-groups (e.g., $R^1$, $R^2$, $R^3$ . . . $R^6$). The term "aliphatic" describes the radical of saturated aliphatic groups, including straight-chain alkyl groups (acyclic), branched-chain alkyl groups, cycloalkyl (cyclic) groups, alkyl substituted cycloalkyl groups, and/or cycloalkyl substituted alkyl groups from a designated attachment site on a molecule. The aliphatic groups may be optionally substituted, as described more fully below. Some examples of alkyl groups include, but are not limited to, methyl, ethyl, propyl, isopropyl, butyl, isobutyl, tert-butyl, 2-ethylhexyl, cyclopropyl, cyclobutyl, cyclopentyl, cyclohexyl, and the like.

Heteroaliphatic R-groups (e.g., $R^1$, $R^2$, $R^3$ . . . $R^6$) comprise heteroalkyl groups, which are aliphatic groups wherein at least one atom is a heteroatom (e.g., oxygen, sulfur, nitrogen, phosphorus, silicon, etc.), with the remainder of the atoms belonging to aliphatic groups as described above. Some examples of heteroaliphatic groups include, but are not limited to, alkoxy, alkylsiloxy, poly(ethylene glycol)-, alkyl-substituted amino, tetrahydrofuranyl, piperidinyl, morpholinyl, etc.

The term "acyl" (e.g., carbonyl group) includes such moieties as can be represented by the general formula:

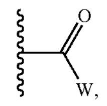

wherein W is H, halogen (e.g., F, Cl, Br, I), OH, O-alkyl, O-alkenyl, or a salt thereof. Where W is O-alkyl, the formula represents an ester. When W is OH, the formula represents a carboxylic acid. In general, when the oxygen atom of the above formula is replaced by sulfur, the formula represents a thiocarbonyl group. When W is a S-alkyl, the formula represents a thioester. When W is SH, the formula represents a thiocarboxylic acid. In other cases, when W is alkyl, the above formula represents a ketone group. When W is hydrogen, the above formula represents an aldehyde group. And when W is a halogen, the above formula represents an acyl halide.

The term "aryl" refers to an aromatic carbocyclic group having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl), all optionally substituted. A Heteroaryl group is an aryl groups wherein at least one ring atom in the aromatic ring is a heteroatom, with the remainder of the ring atoms being carbon atoms. Examples of heteroaryl groups include furanyl, thienyl, pyridyl, pyrrolyl, N lower alkyl pyrrolyl, pyridyl N oxide, pyrimidyl, pyrazinyl, imidazolyl, indolyl and the like, all optionally substituted. The term "nitroaryl" refers to an aryl group as described above, wherein one or more nitro (—$NO_2$) groups replaces a substituent on the aromatic carbocycle.

The term "perfluoroalkyl aryl" refers to an aryl group as described above, wherein one or more perfluoroalkyl moieties (e.g., —$CF_3$, —$CF_2CF_3$) replaces a substituent on the aromatic carbocycle. In general, perfluroalkyl groups refer to aliphatic groups where C—H bonds have been replaced with C—F bonds. Non-limiting examples of perfluoroalkyl groups include trifluoromethyl (—$CF_3$), 1,1-difluoro-2,2,2-trifluoroethyl (—$CF_2CF_3$), and 1,1-difluoro-2,2-difluoro-3,3,3-trifluoropropyl (—$CF_2CF_2CF_3$).

The term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. Thus "unsubstituted" refers to a case where a hydrogen on an atom has not been replaced, such as the hydrogens of an aliphatic group. However, "substituted," as used herein, does not encompass replacement and/or alteration of a key functional group by which a molecule is identified, e.g., such that the "substituted" functional group becomes, through substitution, a different functional group. For example, a "substituted phenyl" must still comprise the phenyl moiety and cannot be modified by substitution, in this definition, to become, e.g., a heteroaryl group such as pyridine. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this disclosure, the heteroatoms such as nitrogen may have hydrogen substituents and/or any permissible substituents of organic compounds described herein which satisfy the valencies of the heteroatoms. This disclosure is not intended to be limited in any manner by the permissible substituents of organic compounds.

Examples of substituents include, but are not limited to, alkyl, aryl, aralkyl, cyclic alkyl, heterocycloalkyl, hydroxy, alkoxy, aryloxy, perhaloalkoxy, arylalkoxy, heteroaryl, heteroaryloxy, heteroarylalkyl, heteroaralkoxy, azido, amino, halogen, alkylthio, oxo, acyl, acylalkyl, carboxy esters, carboxyl, carboxamido, nitro, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, alkoxyalkyl, perhaloalkyl, arylalkyloxyalkyl, and the like. Other substituents are possible.

In some embodiments, silylated sulfonic acid esters, such as those described above) are added (i.e., are additives) to an electrolyte (e.g., to an electrolyte solvent, to a mixture of electrolyte solvents). The electrolyte may further comprise a solvent (e.g., a carbonate-based solvent, or another solvent described herein) and a plurality of conductive ions (e.g., Li-ions, lithium salts), in addition to the silylated sulfonic acid ester. In some embodiments, a mixture of silylated sulfonic acid esters can be used, such that the electrolyte comprises two, three, four, or more silylated sulfonic acid esters.

In some embodiments, only a relatively small amount of silylated sulfonic acid ester is needed to afford protection or passivation to an electrode (e.g., a first electrode) and/or to reduce the formation of gaseous by-products in an electrochemical cell comprising the SSAE. That is to say, the silylated sulfonic acid ester may be a minority component of the electrolyte, while the solvent and/or the plurality of conductive ions (e.g., lithium salts) is present at a concentration higher than the silylated sulfonic acid ester. This can advantageously limit the amount of silylated sulfonic acid ester needed to afford electrode protection and/or to reduce the formation of gaseous by-products from the electrolyte. In some embodiments, the quantity (e.g., a concentration) of silylated sulfonic acid ester is high enough to afford electrode protection and/or reduced gassing, but is not so high as to substantially increase the viscosity of the electrolyte, which may lower the cycle life and rate capability of the electrochemical cell. For example, in some embodiments, the viscosity of the electrolyte increases by less than or equal to 10%, less than or equal to 8%, less than or equal to 6%, less than or equal to 4%, less than or equal to 2%, less than or equal to 1%, or 0%, relative to an electrolyte without the silylated sulfonic acid ester, all other factors being equal. Examples of quantities of silylated sulfonic acid ester are described in more detail below.

The concentration of a silylated sulfonic acid ester can be relatively low compared to the concentration of other components in the electrolyte. In some embodiments, the concentration of the silylated sulfonic acid ester in the electrolyte is less than or equal to 10 wt %, less than or equal to 8 wt %, less than or equal to 6 wt %, less than or equal to 5 wt %, less than or equal to 4 wt %, less than or equal to 3 wt %, less than or equal to 2 wt %, less than or equal to 1 wt %, less than or equal to 0.1 wt %, or less than or equal to 0.01 wt % based on the total weight of the electrolyte. In some embodiments, the concentration of the silylated sulfonic acid ester in the electrolyte is greater than or equal to 0.01 wt %, greater than or equal to 0.1 wt %, greater than or equal to 1 wt %, greater than or equal to 2 wt %, greater than or equal to 3 wt %, greater than or equal to 4 wt %, greater than or equal to 5 wt %, greater than or equal to 6 wt %, greater than or equal to 8 wt %, or greater than or equal to 10 wt % based on the total weight of the electrolyte. Combinations of the above-referenced ranges are also possible (e.g., less than or equal to 8 wt % and greater than or equal to 0.1 wt %). Other ranges are possible.

As mentioned above, some electrochemical cells and/or systems may include a second electrode (e.g., a positive electrode, a cathode). The second electrode may include a second active electrode species.

A variety of chemical species may be suitable for the second active electrode species. In some embodiments, the second active electrode species includes an active cathode species. In some embodiments, the second active electrode species comprises lithium, nickel, cobalt, and manganese. In some embodiments, the second active electrode species includes, but is not limited to, one or more metal oxides, one or more intercalation materials, electroactive transition metal chalcogenides, electroactive conductive polymers, sulfur, carbon and/or combinations thereof.

In some embodiments, the second active electrode species (e.g., a cathode active species) comprises a nickel-cobalt-manganese (NCM) compound, which may reversibly intercalate and deintercalate lithium (e.g., lithium ions). For example, the NCM compound may be a layered oxide, such as lithium nickel manganese cobalt oxide, $LiNi_xMn_yCo_zO_2$. In some such embodiments, the sum of x, y, and z is 1. For example, a non-limiting example of a suitable NCM compound is $LiNi_{1/3}Mn_{1/3}Co_{1/3}O_2$. In some such embodiments, the NCM compounds has a relatively high nickel content (e.g., greater than or equal to 70 mol %, greater than or equal to 75 mol %, greater than or equal to 80 mol %) relative to other transition metals in the compound. For example, in an NCM811, the relative atomic ratio of nickel, cobalt, and manganese is 8:1:1, respectively, such that the atomic percentage of nickel is 8/(8+1+1), or at 80 mol %. In some embodiments, the NCM compound is (at least initially) free of lithium, but lithium may intercalate into the compound during cycling (e.g., during one or more formation cycles).

In some embodiments, an active electrode species (e.g., the second active electrode species) is a lithium transition metal oxide (other than NCM) or a lithium transition metal phosphate. Non-limiting examples include $Li_xCoO_2$ (e.g., $Li_{1.1}CoO_2$), $Li_xNiO_2$, $Li_xMnO_2$, $Li_xMn_2O_4$ (e.g., $Li_{1.05}Mn_2O_4$), $Li_xCoPO_4$, $Li_xMnPO_4$, and $LiCo_xNi_{(1-x)}O_2$. In some such embodiments, the value of x may be greater than or equal to 0 and less than or equal to 2 and the value of y may be greater than 0 and less than or equal to 2. In some embodiments, x is typically greater than or equal to 1 and less than or equal to 2 when the electrochemical device is fully discharged, and less than 1 when the electrochemical device is fully charged. In some embodiments, a fully charged electrochemical cell or electrochemical system may have a value of x that is greater than or equal to 1 and less than or equal to 1.05, greater than or equal to 1 and less than or equal to 1.1, or greater than or equal to 1 and less than or equal to 1.2. Further examples include $Li_xNiPO_4$, where ($0<x\leq1$), $LiMn_xNi_yO_4$ where ($x+y=2$) (e.g., $LiMn_{1.5}Ni_{0.5}O_4$), $LiNi_xCo_yAl_zO_2$ where ($x+y+z=1$), $LiFePO_4$, and combinations thereof. In some embodiments, an active electrode species (e.g., the second active electrode species) within an electrode (e.g., the second electrode) comprises a lithium transition metal phosphate (e.g., $LiFePO_4$), which can, in some embodiments, be substituted with borates and/or silicates.

As mentioned above, in some embodiments, an active electrode species (e.g., the second active electrode species) may comprises a lithium intercalation compound (i.e., a compound that is capable of reversibly inserting lithium ions at lattice sites and/or interstitial sites). In some cases, the active electrode species comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In some embodiments, the electroactive material is a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the active electrode species is a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is a lithium manganese oxide with the chemical formula $LiM_xMn_{2-x}O_4$ where M is one or more of Co, Mg, Cr, Ni, Fe, Ti, and Zn. In some embodiments, x may equal 0 and the spinel may be lithium manganese oxide ($LiMn_2O_4$, also referred to as "LMO"). Another non-limiting example is lithium manganese nickel oxide ($LiNi_xMn_{2-x}O_4$, also referred to as "LMNO"). A non-limiting example of a suitable LMNO compound is $LiNi_{0.5}Mn_{1.5}O_4$. In some cases, the active electrode species of an electrode (e.g., the second active electrode species of the second electrode) comprises $Li_{1.14}Mn_{0.42}Ni_{0.25}Co_{029}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, an active electrode species (e.g., a second active electrode species) comprises a conversion compound. It has been recognized that an electrode (e.g., a cathode) comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs).

In some cases, an active electrode species (e.g., a second active electrode species, an active cathode species) may be doped with one or more dopants to alter the electrical properties (e.g., electrical conductivity) of the species. Non-limiting examples of suitable dopants include aluminum, niobium, silver, and zirconium.

In some embodiments, an active electrode species (e.g., the second active electrode species) may be modified by a surface coating comprising an oxide. Non-limiting examples of surface oxide coating materials include: MgO, $Al_2O_3$, $SiO_2$, $TiO_2$, $ZnO_2$, $SnO_2$, and $ZrO_2$. In some embodiments, such coatings may prevent direct contact between the active electrode species and the electrolyte, thereby suppressing side reactions.

In some embodiments, an active electrode species (e.g., a second active electrode species) has a particular loading. For example, in some embodiments, the second active electrode species has a loading of greater than or equal to 10 mg/cm$^2$, greater than or equal to 15 mg/cm$^2$, greater than or equal to 20 mg/cm$^2$, greater than or equal to 22 mg/cm$^2$, or greater than or equal to 25 mg/cm$^2$. In some embodiments, the second active electrode species has a loading of less than or equal to 30 mg/cm$^2$, 25 mg/cm$^2$, less than or equal to 22 mg/cm$^2$, less than or equal to 20 mg/cm$^2$, less than or equal to 15 mg/cm$^2$, or less than or equal to 10 mg/cm$^2$. Combinations of the above-reference ranges are also possible (e.g., greater than or equal to 10 mg/cm$^2$ and less than or equal to 25 mg/cm$^2$). Other ranges are possible.

An electrode active species of an electrode (e.g., a second active species of the second electrode) may have a particular thickness. In some embodiments, the second electrode, or a second active species of the second electrode, has a thickness of greater than or equal to 100 nm, greater than or equal to 250 nm, greater than or equal to 500 nm, greater than or equal to 750 nm, greater than or equal to 1 micron, greater than or equal to 2 microns, greater than or equal to 3 microns, greater than or equal to 5 microns, greater than or equal to 10 microns, greater than or equal to 20 microns, greater than or equal to 25 microns, or greater than or equal to 50 microns. In some embodiments, the second electrode, or an electrode active species of the second electrode has a thickness of less than or equal to 50 microns, less than or equal to 25 microns, less than or equal to 20 microns, less than or equal to 10 microns, less than or equal or equal to 5 microns, less than or equal to 3 microns, less than or equal to 2 microns, less than or equal to 1 micron, less than or equal to 750 nm, less than or equal to 500 nm, less than or equal to 250 nm, or less than or equal to 100 nm. Combinations of the above-referenced ranges are also possible (e.g., greater than or equal to 100 nm and less than or equal to 10 microns). Other ranges are possible.

An electrode (e.g., a first electrode, a second electrode) may be porous or comprise a porous region. Thus, in some embodiments, an electrode may comprise one or more pores. In some embodiments, the electrode comprising pores (e.g., the porous electrode) is an intercalation electrode. As used herein, a "pore" generally refers to a conduit, void, or passageway at least partially surrounded by a solid material and capable of being occupied by a liquid or gas. For the purposes of this disclosure, voids within a material that are completely surrounded by the material (and thus, not accessible from outside the material, e.g., closed cells) are not considered pores. It should be understood that, in cases where an electrode (or other article for an electrochemical cell) comprises an agglomeration of particles, pores include both the interparticle pores (i.e., those pores defined between particles when they are packed together, e.g., interstices) and intraparticle pores (e.g., those pores lying within the envelopes of the individual particles). Pores may comprise any suitable cross-sectional shape such as, for example, circular, elliptical, polygonal (e.g., rectangular, triangular, etc.), irregular, and the like. Pore size distribution and volume can be measured via mercury intrusion porosimetry using ASTM Standard Test D4284-07.

The pores of an electrode or a portion of an electrode may be of any of a variety of suitable sizes (e.g., measured as an average cross-sectional pore diameter). For example, in some cases, the pores of a porous portion can be sufficiently large to allow for the passage of liquid electrolyte into the pores of an electrode due to, for example, capillary forces. In addition, in some cases, the pores may be smaller than millimeter-scale or micron-scale pores, which may be too large such that they render the electrode mechanically unstable. In some embodiments, the pores have an average cross-sectional diameter of greater than or equal to 0.2 nm, greater than or equal to 0.5 nm, greater than or equal to 1 nm, greater than or equal to 5 nm, greater than or equal to 10 nm, greater than or equal to 20 nm, greater than or equal to 30 nm, greater than or equal to 40 nm, greater than or equal to 50 nm, greater than or equal to 100 nm, or more. In some embodiments, the pores have an average cross-sectional diameter of less than or equal to 500 nm, less than or equal to 400 nm, less than or equal to 300 nm, less than or equal to 200 nm, less than or equal to 200 nm, less than or equal to 100 nm, or less. Combinations of the above-referenced ranges are also possible (e.g., greater than or equal to 0.2 nm and less than or equal to 200 nm). Other ranges are possible. The cross-sectional diameter of a pore and the average cross-sectional pore diameter of an electroactive region can be measured via mercury intrusion porosimetry using ASTM Standard Test D4284-07.

In some embodiments, an electrode (e.g., a first electrode, a second electrode) may have a porosity or a porous portion with a low porosity. Without wishing to be bound by any particular theory, this discovery was unexpected in that it was originally believed that such low porosities would have decreased cycle life by limiting electrolyte penetration into the electrode. However, it has been discovered that low porosity electrodes may also advantageously increase the volumetric energy density relative to higher porosity electrodes.

The term "porosity" is generally used herein to describe the ratio of void volume to overall volume and is expressed as a percentage. In the case of an electrode or a porous portion of the electrode, the porosity can be considered as the result of dividing the void volume of the electrode or portion by the overall volume of the electrode or portion and multiplying the result by 100%, where the void volume refers to the portions of a particular portion that are capable of being occupied by a liquid or a gas. In the case of an electrode, the void volume corresponds to the volumes of the electrode that are capable of being occupied by a liquid or a gas. The void volume of the electrode would not include, for example, the volume occupied by a lithium intercalation compound of the electrode, an electronically conductive material of the electrode (e.g., carbon black), or any solid binder material of the electrode. Void volume may be occupied by electrolyte, gases, or other liquid or gas components. The porosity of an electrode or a porous portion of the electrode can be measured via mercury intrusion porosimetry, using a standard test such as ASTM Standard Test D4284-07.

As mentioned above, an electrode or a porous portion (e.g., a porous electroactive region) of an electrode may have a relatively low porosity. For example, in some embodiments, an electrode or the porous portion of an electrode has a porosity of less than or equal to 20%, less than or equal to 18%, less than or equal to 17%, less than or equal to 16%, less than or equal to 15%, less than or equal to 12%, less than or equal to 10%, less than or equal to 9%, less than or equal to 8%, less than or equal to 7%, less than or equal to 6%, or less. In some embodiments, an electrode or the porous portion of an electrode has a porosity of greater than or equal to 3%, greater than or equal to 5%, greater than or equal to 6%, greater than or equal to 7%, greater than or equal to 8%, greater than or equal to 10%, greater than or equal to 12%, greater than or equal to 15%, or more. Combinations of the above-referenced ranges are also possible (e.g., greater than or equal to 5% and less than or equal to 16%). Other ranges are possible.

In some embodiments, an electrode or a porous portion of an electrode may have a relatively high porosity. For example, in some embodiments, an electrode or the porous portion of an electrode has a porosity of greater than or equal to 20%, greater than or equal to 30%, greater than or equal to 50%, or greater than or equal to 70%. In some embodiments, an electrode or the porous portion of an electrode has a porosity of less than or equal to 70%, less than or equal to 50%, less than or equal to 30%, or less than or equal to 20%. Combinations of the above-referenced ranges are also possible (e.g., greater than or equal to 20% and less than or equal to 70%). Those skilled in the art, in view of the present disclosure, will be capable of selecting a porosity (e.g., a low porosity, a high porosity) for a particular application.

In some cases, an electrode (e.g., a second electrode) may comprise a binder. The binder can hold an active electrode species (e.g., a second active electrode species) together with electronically conductive particles (e.g., carbon block), in addition to providing, at least some, mechanical support to the electrode. A variety of materials may be suitable for the binder. For example, the binder may comprise a polymeric binder. In some embodiments, the polymeric binder comprises a polyvinylidene difluoride (PVDF) polymer. However, other polymeric binders are possible. Non-limiting examples of other polymeric binders include polyether sulfone, polyether ether sulfone, polyvinyl alcohol, polyvinyl acetate, and polybenzimidazole. Additional non-limiting examples of polymeric binders include a poly(vinylidene fluoride copolymer) such as a copolymer with hexafluorophosphate, a poly(styrene)-poly(butadiene) copolymer, a poly(styrene)-poly(butadiene) rubber, carboxymethyl cellulose, and poly(acrylic acid). In some embodiments, the binder comprises a fluorinated compound. Other polymeric binders are possible.

In some embodiments, the weight percentage of binder within an electrode (e.g., a second electrode) is greater than or equal to 1 wt %, greater than or equal to 2 wt %, greater than or equal to 3 wt %, greater than or equal to 4 wt %, greater than or equal to 5 wt %, greater than or equal to 6 wt %, greater than or equal to 7 wt %, greater than or equal to 8 wt %, greater than or equal to 9 wt %, greater than or equal to 10 wt %. In some embodiments, the wt % of binder in the porous electroactive region is less than or equal to 10 wt %, less than or equal to 9 wt %, less than or equal to 8 wt %, less than or equal to 7 wt %, less than or equal to 6 wt %, less than or equal to 5 wt %, less than or equal to 4 wt %, less than or equal to 3 wt %, less than or equal to 2 wt %, or less than or equal to 1 wt %. Combinations of the above-referenced ranges are also possible (e.g., greater than or equal to 1 wt % and less than or equal to 3 wt %). Other ranges are possible.

As mentioned above, a binder may also comprise an electronically conductive material (e.g., conductive carbon). In some embodiments, the electronically conductive material comprises carbon, such as elemental carbon. Elemental carbon contains carbon in an oxidation state of zero. The elemental carbon can contain $sp^3$- and/or $sp^2$-hybrized carbon atoms. In some embodiments, the elemental carbon contains almost exclusively carbon atoms and hence contains a relatively high atomic percent (mol %) of carbon atoms (e.g., 98 mol % carbon, 99 mol % carbon, 99.9 mol %). In some embodiments, the elemental carbon contains trace amounts (e.g., less than 2 mol %, less than 1 mol %, less than 0.1 mol %) of other elements (e.g., hydrogen, nitrogen, oxygen, sulfur), for example, on the surface to terminate dangling bonds of the elemental carbon. In some embodiments, the electronically conductive material comprises carbon black. In some embodiments, the amount of the electronically conductive material (e.g., carbon black) relative to the binder or within an electrode (e.g., a first electrode) is greater than or equal to 0.1 wt %, greater than or equal to 0.5 wt %, greater than or equal to 1 wt %, greater than or equal to 2 wt %, greater than or equal to 3 wt %, greater than or equal to 4 wt %, greater than or equal to 5 wt %, greater than or equal to 10 wt %, greater than or equal to 15 wt %, or greater than or equal to 20 wt %. In some embodiments, the amount of the electronically conductive material (e.g., carbon black) relative to the binder or within an electrode is less than or equal to 20 wt %, less than or equal to 15 wt %, less than or equal to 10 wt %, less than or equal to 5 wt %, less than or equal to 4 wt %, less than or equal to 3 wt %, less than or equal to 2 wt %, less than or equal to 1 wt %, less than or equal to 0.5 wt %, or less than or equal to 0.1 wt %. Combinations of the above-referenced ranges are also possible (e.g., greater than or equal to 0.1 wt % and less than or equal to 20 wt %). Other ranges are possible.

In some cases, other electronically conductive materials can be used and may include, for example, other conductive carbons such as graphite fibers, graphite fibrils, graphite powder (e.g., Fluka #50870), activated carbon fibers, carbon fabrics, and non-activated carbon nanofibers, without limitation. Other non-limiting examples of electronically conductive materials include metal-coated glass particles, metal particles, metal fibers, nanoparticles, nanotubes, nanowires, metal flakes, metal powders, metal fibers, and metal meshes.

Various embodiments described herein may include a current collector. A current collector may be positioned adjacent to (e.g., directly adjacent to) an electrode or an active electrode species of an electrode. As known by those skilled in the art, a current collector can facilitate the collection and transfer of current so that it can be delivered for its desired application. A current collector, when present, may be of any suitable material. Suitable current collectors may include, for example, metals, metal foils (e.g., aluminum foil), polymer films, metallized polymer films (e.g., aluminized plastic films, such as aluminized polyester film), electrically conductive polymer films, polymer films having an electrically conductive coating, electrically conductive polymer films having an electrically conductive metal coating, and polymer films having conductive particles dispersed therein. In some embodiments, the current collector includes one or more conductive metals such as aluminum, copper, magnesium, chromium, stainless steel and/or nickel. For example, a current collector may include a copper and/or magnesium metal layer on at least a portion of the current collector. Optionally, a current collector may include more than one layers. For instance, another conductive metal layer, such as magnesium or titanium, may be positioned on a copper layer. For example, as mentioned above, in some embodiments, a current collector (e.g., a copper current collector) has magnesium deposited on at least a portion of a surface of the current collector. Additional current collectors may include, for example, expanded metals, metal mesh, metal grids, expanded metal grids, metal wool, woven carbon fabric, woven carbon mesh, non-woven carbon mesh, and carbon felt. Furthermore, a current collector may be electrochemically inactive. In other embodiments, however, a current collector may comprise an active electrode species or have an active electrode species deposited on at least a portion a surface of the current collector.

As described above, in some embodiments, a current collector may be present without an active electrode species (e.g., a first active electrode species, a second active electrode species) present during at least a portion of a charge/discharge cycle. In such an embodiment, the current collector may act as an electrode precursor in which, during formation and/or during subsequent charge/discharge cycles, an active electrode species (e.g., an active anode species such as lithium) may be formed (or deposited) on at least a portion of a surface of the current collector.

A current collector may have any suitable thickness. For instance, the thickness of a current collector may be greater than or equal to 0.1 microns, greater than or equal to 0.3 microns, greater than or equal to 0.5 microns, greater than or equal to 1 micron, greater than or equal to 3 microns, greater than or equal to 5 microns, greater than or equal to 7 microns, greater than or equal to 9 microns, greater than or equal to 10 microns, greater than or equal to 12 microns, greater than or equal to 15 microns, greater than or equal to 20 microns, greater than or equal to 25 microns, greater than or equal to 30 microns, greater than or equal to 40 microns, or greater than or equal to 50 microns. In some embodiments, the thickness of the current collector may be less than or equal to 50 microns, less than or equal to 40 microns, less than or equal to 30 microns, less than or equal to 25 microns, less than or equal to 20 microns, less than or equal to 15 microns, less than or equal to 12 microns, less than or equal to 10 microns, less than or equal to 9 microns, less than or equal to 7 microns, less than or equal to 5 microns, less than or equal to 3 microns, less than or equal to 1 micron, less than or equal to 0.5 microns, less than or equal to 0.3 microns, or less than or equal to 0.1 microns. Combinations of the above-referenced ranges are also possible (e.g., greater than or equal to 0.3 microns and less than or equal to 15 microns). Other ranges are possible.

In some embodiments, the electrochemical cells and systems include a separator, for example, between the first electrode and the second electrode. The separator may be a solid, non-electronically conductive or insulative material which separates or insulates the first electrode and the second electrode from each other preventing short circuiting, and which permits the transport of ions between the first electrode and the second electrode. That is to say, the separator can be electronically insulating but ionically conductive. In some embodiments, the separator can be porous and may be permeable to a liquid electrolyte. In some such embodiments, the pores of the separator may be partially or substantially filled with liquid electrolyte. In some embodiments, separators may be supplied as porous, free-standing films which are interleaved with the first electrode and the second electrode during the fabrication of cells. Alternatively, the separator layer may be applied directly to the surface of one of the electrodes.

The separator may include a variety of suitable materials. For example, in some embodiments, the separator comprises a polymer as the separator material. Examples of suitable separator materials include, but are not limited to, polyolefins, such as, for example, polyethylenes (e.g., SETELA™ made by Tonen Chemical Corp) and/or polypropylenes, glass fiber filter papers, and ceramic materials. For example, in some embodiments, the separator comprises a microporous polyethylene film. Additional examples of separators and separator materials suitable for use in this disclosure are those comprising a microporous xerogel layer, for example, a microporous pseudo-boehmite layer, which may be provided either as a free-standing film or by a direct coating application on one of the electrode. In some embodiments, solid electrolytes and gel electrolytes may also function as a separator in addition to performing their electrolyte functions.

A separator may be of any suitable thickness that provides adequate physical separation between the first electrode and the second electrode. In some embodiments, the separator has a thickness of greater than or equal to 1 micron, greater than or equal to 2 microns, greater than or equal to 3 microns, greater than or equal to 4 microns, greater than or equal to 5 microns, greater than or equal to 6 microns, greater than or equal to 9 microns, greater than or equal to 12 microns, greater than or equal 15 microns, greater than or equal to 20 microns, greater than or equal to 25 microns, or more. In some embodiments, the separator has a thickness of less than or equal to 25 microns, less than or equal to 20 microns, less than or equal to 15 microns, less than or equal to 12 microns, less than or equal to 9 microns, less than or equal to 6 microns, less than or equal to 5 microns, less than or equal to 4 microns, less than or equal to 3 microns, less than or equal to 2 microns, less than or equal to 1 micron, or less. Combinations of the above-referenced ranges are also possible (e.g., greater than or equal to 3 microns and less than or equal to 12 microns). Other ranges are possible.

In some embodiments, a separator includes a z-fold or accordion fold. For example, some electrochemical cells include a z-folded separator. In some such embodiments, a first electrode and/or a second electrode may also be folded. In some embodiments, a first electrode is folded in a first direction and a z-folded separator that is z-folded in a second direction, which is orthogonal to the first direction. Additionally or alternatively, exemplary electrochemical cells may include a first electrode that is z-folded along a first direction and a combination of a second electrode and a separator that is z-folded in a second direction, which is orthogonal to the first direction. As set forth in more detail below, the electrochemical cells of the present disclosure may provide advantages over certain existing electrochemical cells, including relative ease and low cost of manufacture, high energy density, and safety.

In some embodiments, an electrochemical cell includes a first electrode (or first electrode layer), a separator (or separator layer) overlaying the first electrode, the separator folded back upon itself in a first direction to form a first separator section, a second separator section and an opening there between, and a second electrode comprising a plate, wherein the plate is between the first separator section and the second separator section. The first electrode is folded over the separator in a second direction, which is orthogonal to the first direction, to form a first electrode section underlying the first separator section and a second first electrode section overlying the second separator section. In some embodiments, an electrochemical cell includes a plurality (e.g., greater than two, greater than three, greater than four) of first electrode sections, separator sections, and plates, such that the first electrode and the separator each form z-folded layers. In some embodiments, the first electrode includes first active electrode species, which may be patch coated onto another electrochemical cell component. In some embodiments, the first electrode comprises first active electrode species. In accordance with yet additional aspects, the folded separator may overlap the plate(s) in areas where the plate(s) are overlapped by the folded first electrode to prevent shorting between the first electrode and the second electrode. The use of the folds may allow for the relatively easy and inexpensive manufacture of cells with starting materials in the form of, for example, a continuous or semi-continuous roll, tape, or web of first electrode material and separator material, and the use of second electrode plate(s) allows for the formation of a cell with relatively even pressure distribution.

In some embodiments, a protective layer is present and may be positioned adjacent to an electrode (e.g., a first electrode, a second electrode) or on the base electrode material layer. In some embodiments, the protective layer is adjacent to a separator or is a coating on a separator. The protective layer may reduce or prevent direct exposure of an adjacent layer from, for example, a liquid electrolyte and/or from metallic dendrites that may form.

In some embodiments, the protective layer for an electrode may comprise a plurality of particles (e.g., ceramic particles such as an $Li_{22}$-containing ceramic compound, polymeric particles). In some embodiments, at least a portion of the plurality of particles are fused to one another. For instance, in some embodiments, the protective layer may be formed by aerosol deposition, or another suitable process, that involves subjecting the particles to a relatively high velocity such that fusion of at least some of the particles occurs during deposition. In some embodiments, the protective layer is an ion-conducting layer. In some such embodiments, the protective layer comprises a relatively low amount of polymer (e.g., less than or equal to about 20 vol % polymer versus total volume fraction of the protective layer). In some embodiments, at least a portion of the plurality of particles may be embedded within another layer (e.g., embedded into an electrode, embedding into an active electrode species of an adjacent layer). In some embodiments, the plurality of particles are formed of a first material (e.g., ceramic particles), and the layer may comprise a second material (e.g., a polymeric material) different from the first material. Advantageously, an ion-conductive protective layer may maintain the bulk properties of the materials used to form the protective layer (e.g., crystallinity, ion-conductivity), may exhibit increased flexibility, and/or may permit the incorporation of materials (e.g., ceramics) that would not be generally feasible under traditional vacuum deposition methods. When used as a protective layer, the protective layer may be substantially impermeable to a liquid electrolyte, according to some embodiments; however, there may be some embodiments in which the protective layer is porous and permeable to a liquid electrolyte.

In some embodiments, the protective layer may be substantially non-porous (e.g., have a low porosity). For instance, in some embodiments, less than or equal to 99.9%, less than or equal to 99.5%, less than or equal to 99%, less than or equal to 98%, or less than or equal to about 97% of the protective layer is non-porous. In some embodiments, greater than or equal to 95%, greater than or equal to 97%, greater than or equal to 98%, greater than or equal to 99%, or greater than or equal to 99.5% of the protective layer is non-porous. In some embodiments, the porosity of the protective layer may be less than or equal to 5%, less than or equal to 3%, less than or equal to 2%, or less than or equal to 1%. Porosity/non-porosity can be determined, for example, by mercury porosimetry.

In some embodiments, the protective layer is a porous protective layer. For example, in some embodiments, a porous protective layer has a porosity of greater than or equal to 20%, greater than or equal to 30%, greater than or equal to 40%, greater than or equal to 50%, greater than or equal to 60%, or greater than or equal to 70%. In some embodiments, a porous protective layer has a porosity of less than or equal to 70%, less than or equal to 60%, less than or equal to 50%, less than or equal to 40%, less than or equal to 30%, or less than or equal to 20%. Combinations of the above-referenced ranges are also possible (e.g., greater than or equal to 20% and less than or equal to 70%). Those skilled in the art, in view of the present disclosure, will be capable of selecting a porosity (e.g., a low porosity, a high porosity) for a particular application.

In some embodiments, the average largest cross-sectional dimension of particles (i.e., prior to being fused or absent any fusion, unfused particles) may be, for example, less than or equal to 20 microns, less than or equal to 10 microns, less than or equal to 5 microns, less or equal to 2 microns, less than or equal to 1 micron, or less than or equal to 0.75 microns. In some embodiments, the average largest cross-sectional dimension of the plurality of particles may be greater than or equal to 0.5 microns, greater than or equal to 0.75 microns, greater than or equal to 1 micron, greater than or equal to 1.5 microns, greater than or equal to 2 microns, greater than or equal to 3 microns, greater than or equal to 5 microns, greater than or equal to 10 microns, or greater than or equal to 15 microns. Combinations of the above-referenced ranges are also possible (e.g., a largest cross-sectional dimension of less than 20 microns and greater than 0.5 microns). Other ranges are possible. For embodiments in which more than one particle type is included in a layer, each particle type may have a value of particle size in one or more of the above-referenced ranges.

In some embodiments, the average largest cross-sectional dimension of fused particles (e.g., after fusing) may be, for example, less than or equal to 10 microns, less than or equal to 5 microns, less or equal to 2 microns, less than or equal to 1 micron, less than or equal to 0.75 microns, less than or equal to 0.5 microns, less than or equal to 0.2 microns, less than or equal to 0.1 microns. In some embodiments, the average largest cross-sectional dimension of the plurality of particles (e.g., after being deposited on a surface) may be greater than or equal to 0.01 microns, greater than or equal to 0.1 microns, greater than or equal to 0.5 microns, greater than or equal to 0.75 microns, greater than or equal to 1 micron, greater than or equal to 1.5 microns, greater than or equal to 2 microns, greater than or equal to 3 microns, greater than or equal to 5 microns. Combinations of the above-referenced ranges are also possible (e.g., a largest cross-sectional dimension of less than 10 microns and greater than 0.1 microns, a largest cross-sectional dimension of less than 5 microns and greater than 0.01 micron). Other ranges are possible. For embodiments in which more than one particle type is included in a layer, each particle type may have a value of particle size in one or more of the above-referenced ranges.

As described above, in some embodiments at least a portion of the plurality of particles in a layer may be fused to one another. As recited herein, the terms "fuse" and "fused" (and "fusion") refers to the physical joining of two or more objects (e.g., particles) such that they form a single object. Those skilled in the art would understand that the terms "fuse," "fused," and "fusion" do not refer to particles that merely contact one another at one or more surfaces, but particles wherein at least a portion of the original surface of each individual particle can no longer be discerned from the other particle. For example, in some embodiments, each particle in a plurality of particles (e.g., a first plurality of particles, a second plurality of particles) has an original surface, wherein at least a portion of the plurality of particles are fused to one another such that at least a portion of the original surface of the particles can no longer be discerned in the plurality of particles that are fused to one another. In some embodiments, a layer (e.g., a first layer, a second layer) comprises a plurality of particles, each particle having an original surface, wherein at least a portion of the plurality of particles are fused to one another such that at least a portion of the original surface of the particles can no longer be discerned in the plurality of particles fused to one another.

As noted above, a variety of materials may be suitable for the particles of the protective layer. In some embodiments, the particles of a protective layer are formed of an inorganic material. In some embodiments, the inorganic material comprises a ceramic material (e.g., glasses, glassy-ceramic materials). Non-limiting examples of suitable ceramic materials include oxides (e.g., aluminum oxide, silicon oxide, lithium oxide), nitrides, and/or oxynitrides of aluminum, silicon, zinc, tin, vanadium, zirconium, magnesium, indium, and alloys thereof, $Li_xMP_yS_z$ (where x, y, and z are integers, e.g., integers less than 32; and where M=Sn, Ge, or Si) such as $Li_{22}SiP_2S_{18}$, $Li_{24}MP_2S_{19}$, or $LiMP_2S_{12}$ (e.g., where M=Sn, Ge, Si) and LiSiPS, garnets, crystalline or glass sulfides, phosphates, perovskites, anti-perovskites, other ion-conductive inorganic materials and mixtures thereof. $Li_xMP_yS_z$ particles can be formed, for example, using raw components $Li_2S$, $SiS_2$ and $P_2S_5$ (or alternatively $Li_2S$, Si, S and $P_2S_5$).

In an exemplary embodiment, the ceramic material is $Li_{24}SiP_2S_{19}$. In another exemplary embodiment, the ceramic material is $Li_{22}SiP_2S_{18}$.

In some embodiments, the particles of a protective layer may comprise a material including one or more of lithium nitrides, lithium nitrates (e.g., $LiNO_3$), lithium silicates, lithium borates (e.g., lithium bis(oxalate)borate, lithium difluoro(oxalate)borate), lithium aluminates, lithium oxalates, lithium phosphates (e.g., $LiPO_3$, $Li_3PO_4$), lithium phosphorus oxynitrides, lithium silicosulfides, lithium germanosulfides, lithium oxides (e.g., $Li_2O$, LiO, $LiO_2$, $LiRO_2$, where R is a rare earth metal), lithium fluorides (e.g., LiF, $LiBF_4$, $LiAlF_4$, $LiPF_6$, $LiAsF_6$, $LiSbF_6$, $Li_2SiF_6$, $LiSO_3F$, $LiN(SO_2F)_2$, $LiN(SO_2CF_3)_2$), lithium lanthanum oxides, lithium titanium oxides, lithium borosulfides, lithium aluminosulfides, and lithium phosphosulfides, oxy-sulfides (e.g., lithium oxy-sulfides), and combinations thereof. In some embodiments, the plurality of particles comprise $Al_2O_3$, $ZrO_2$, $SiO_2$, $CeO_2$, and/or $Al_2TiO_5$ (e.g., either alone or in combination with one or more of the above materials). In an exemplary embodiment, the plurality of particles may comprise Li—Al—Ti—$PO_4$ (LATP). The selection of the material (e.g., ceramic) will be dependent on a number of factors including, but not limited to, the properties of electrolyte and an electrode (e.g., an anode and/or cathode) used in the cell.

In some embodiments, the protective layer comprises a compound of formula (A): $Li_xM_yQ_wP_zS_uX_t$ (A) wherein: M is Fe Q is absent or selected from the group consisting of Cr, B, Sn, Si, Ta, Nb, V, P, Fe, Ga, Al, As, and combinations thereof, and wherein Q, when present, is different than M, X is absent or selected from the group consisting of halide and pseudohalide, where x is 8-22, y is 0.1-3, w is 0-3, z is 0.1-3, u is 7-20, and t is 0-8.

In some embodiments, the protective layer comprises a compound of formula (B):$Li_{2x}S_{x+w+5z}M_yP_{2z}$ (B) wherein: M is selected from the group consisting of Lanthanides, Group 3, Group 4, Group 5, Group 6, Group 7, Group 8, Group 9, Group 12, Group 13, and Group 14 atoms, and combinations thereof; x is 8-16, y is 0.1-6, w is 0.1-15, and z is 0.1-3.

In some embodiments, the protective layer (or at least some of the plurality of particles of the protective layer) comprises ionically non-conductive particles. In some embodiments, the protective layer (or at least some of the plurality of particles of the protective layer) comprises ionically conductive and ionically non-ionically conductive particles.

In some embodiments, the particles of a protective layer comprise or consist of a polymeric material (e.g., a non-ionically conductive polymeric material and/or an ionically conductive polymeric material). In an exemplary embodiment, the polymeric material is polyethylene. Additional examples of polymeric material include, but are not limited to, polyamines (e.g., poly(ethylene imine) and polypropylene imine (PPI)); polyamides (e.g., polyamide (Nylon), poly(ϵ-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamides, poly(acrylates), poly (methacrylates), poly(2-vinyl pyridine), poly(N-vinylpyrrolidone), poly(methylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyolefins (e.g., poly(butene-1), poly(n-pentene-2), polyethylene, polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some aspects, the polymeric material may be selected from the group consisting of polyvinyl alcohol, polyisobutylene, epoxy, polyethylene, polypropylene, polytetrafluoroethylene, and combinations thereof.

A protective layer may have any suitable thickness. For instance, the thickness of a protective layer may be greater than or equal to 0.1 microns, greater than or equal to 0.3 microns, greater than or equal to 0.5 microns, greater than or equal to 1 micron, greater than or equal to 3 microns, greater than or equal to 5 microns, greater than or equal to 7 microns, greater than or equal to 9 microns, greater than or equal to 10 microns, greater than or equal to 12 microns, greater than or equal to 15 microns, greater than or equal to 20 microns, greater than or equal to 25 microns, greater than or equal to 30 microns, greater than or equal to 40 microns, or greater than or equal to 50 microns. In some embodiments, the thickness of the protective layer may be less than or equal to 50 microns, less than or equal to 40 microns, less than or equal to 30 microns, less than or equal to 25 microns, less than or equal to 20 microns, less than or equal to 15 microns, less than or equal to 12 microns, less than or equal to 10 microns, less than or equal to 9 microns, less than or equal to 7 microns, less than or equal to 5 microns, less than or equal to 3 microns, less than or equal to 1 micron, less than or equal to 0.5 microns, less than or equal to 0.3 microns, or less than or equal to 0.1 microns. Combinations of the above-referenced ranges are also possible (e.g., greater than or equal to 0.3 microns and less than or equal to 15 microns). Other ranges are possible.

In some embodiments, a protective layer or an electrode protected by a protective layer may comprise a nitrogen-containing species. For example, in some embodiments, a first electrode and/or a second electrode comprises a species comprising a conjugated, negatively-charged ring comprising a nitrogen atom and/or a reaction product thereof. In some embodiments, a protective layer disposed on a first electrode and/or a second electrode, wherein the protective layer disposed on the second electrode comprises a species comprising a conjugated, negatively-charged ring comprising a nitrogen atom and/or a reaction product thereof. In some embodiments, the electrolyte comprises a species comprising a conjugated, negatively-charged ring comprising a nitrogen atom, and wherein an electron-withdrawing substituent is absent from the species. In some such embodiments, the species within the electrolyte may subsequently form a protective layer on an electrode. In some embodiments, a protective layer is disposed on the first electrode and/or the second electrode, wherein the protective layer disposed on the first electrode and/or the second electrode comprises a species comprises a conjugated, negatively-charged ring comprising a nitrogen atom and/or a reaction product thereof, and wherein an electron-withdrawing substituent is absent from the species.

In some embodiments, a protective layer is formed on (at least a portion of) a surface of an electrode. For example, some embodiments describe a method of forming a protective layer on an electrode (e.g., a high-voltage electrode configured to undergo a plurality of charge/discharge cycles wherein the voltage exceeds at least 4.4 V). In some such embodiments, the method may also include applying one or more formation cycles to a first electrode and/or a second electrode, the one or more formation cycles comprising: charging the first electrode and/or second electrode at a first current to a voltage of greater than or equal to 4.4 V, and discharging the first and/or second electrode at a second current to a voltage of less than 4.4 V. In some embodiment, the protective layer comprises a lithium compound comprising $LiO_2$, $Li_2CO_3$, and/or LiF. In some embodiments, the method may include forming a protective layer on at least a portion of a surface of a first electrode and/or second electrode, wherein the protective layer comprises a magnesium compound, by applying one or more formation cycles to the first electrode and/or second electrode, the one or more formation cycles comprising: charging the first electrode and/or second electrode at a first current to a voltage of greater than or equal to 4.4 V, discharging the first electrode and/or second electrode at a second current to a voltage of less than 4.4 V. In some embodiments, the method comprises forming a protective layer comprising a magnesium compound using a first electrode and/or a second electrode comprising a lithium intercalation compound having a nickel content of greater than or equal to 70 mol % relative to other transition metals in the lithium intercalation compound; a second electrode comprising a current collector with magnesium on at least a portion of a surface of the current collector; and a separator between the first electrode and the second electrode.

In some embodiments, a layer (e.g., a protective layer, a passivating layer) may be present along or within a solid-electrolyte interface between an electrolyte and an electrode (e.g., a first electrode, a second electrode). For example, in some embodiments, a solid electrolyte interphase layer is disposed between a first electrode and/or a second electrode and the electrolyte, wherein the solid electrolyte interphase layer comprises an inorganic material comprising an inorganic material including one or more of LiF, $Li_2CO_3$, $Li_2O$ (e.g., LiF and $Li_2CO_3$). In some such embodiments, a first ratio of fluorine atoms to oxygen atoms adjacent the electrolyte is higher than a second ratio of fluorine atoms to oxygen atoms adjacent the anode in the solid electrolyte interphase layer. In some embodiments, a solid electrolyte interphase layer is disposed between an electrode and the electrolyte, wherein the solid electrolyte interphase layer comprises LiF and has: (1) a hardness of greater than or equal to 0.001 GPa and less than or equal to 5 GPa; and/or (2) a porosity of greater than equal to 1% and less than or equal to 90%; and wherein the electrochemical cell exhibits a decrease in discharge capacity of less than or equal to 10% after 100 cycles of charge and discharge with respect to a discharge capacity at the 5th charge-discharge cycle after formation. In some embodiments, the electrochemical cell exhibits a decrease in discharge capacity of less than or equal to 10% after 100 cycles of charge and discharge with respect to a discharge capacity at the 5th charge-discharge cycle after formation.

In some embodiments, an electrochemical cell comprises a solid electrolyte interphase layer (e.g., comprising one or more of LiF, $Li_2CO_3$, $Li_2O$, etc.) formed in the presence of a fluorinated electrolyte solvent and is subjected to an applied anisotropic force during at least a period of charge and discharge cycles. Such an electrochemical cell may exhibit enhanced physical properties compared to an otherwise equivalent cell comprising a solid electrolyte interphase layer formed in the presence of a non-fluorinated electrolyte solvent and subjected to the same applied anisotropic force. For example, compared to the solid electrolyte interphase layer of the cell comprising the non-fluorinated electrolyte and subjected to the anisotropic force, the solid electrolyte interphase layer in the electrochemical cell comprising the fluorinated electrolyte solvent and subjected to the same applied anisotropic force may exhibit a slower increase in thickness and/or a slower decrease in bulk density over cycles of charge and discharge. These differences in physical properties may, at least in part, contribute to an improved cycle life.

In some embodiments, an electrochemical cell comprising a solid electrolyte interphase layer (e.g., comprising one or more of LiF, $Li_2CO_3$, $Li_2O$, etc.) formed under high formation voltage exhibits enhanced physical properties compared to otherwise equivalent cells comprising a solid electrolyte interphase layer formed without the high formation voltage. In some embodiments, an electrochemical cell comprising a solid electrolyte interphase layer described herein (e.g., comprising one or more of LiF, $Li_2CO_3$, $Li_2O$, etc.) formed under high formation voltage exhibits an cycle life that is greater than or equal to 2 times, greater than or equal to 3 times, greater than or equal to 5 times, greater than or equal to 10 times, greater than or equal to 15 times, greater than or equal to 20 times, greater than or equal to 25 times, greater than or equal to 30 times, greater than or equal to 40 times, greater than or equal to 50 times, greater than or equal to 100 times, greater than or equal to 200 times, greater than or equal 300 times, or greater than or equal to 400 times the cycle life of an otherwise equivalent electrochemical cells comprising a solid electrolyte interphase layer but formed without the high formation voltage. In some embodiments, the electrochemical cell comprising a solid electrolyte interphase layer formed under high formation voltage exhibits an cycle life that is less than or equal to 500 times, less than or equal to 400 times, less than or equal to 300 times, less than or equal to 200 times, less than or equal to 100 times, less than or equal to 50 times, less than or equal to 40 times, less than or equal to 30 times, less than or equal to 20 times, less than or equal to 10 times, or less than or equal to 3 times the cycle life of an otherwise equivalent electrochemical cells comprising the solid electrolyte interphase formed without the high formation voltage. Combination of the above-referenced ranges are possible (e.g., greater than or equal to 2 times and less than or equal to 500 times). Other ranges are also possible.

As mentioned above, some embodiments include a release layer. These release layers may facilitate the ease of fabrication, arrangements, assemblies, methods of electrochemical cell components, such as electrodes. The release layer may facilitate the lamination/delamination of adjacent layers during electrochemical cell fabrication by facilitate facile removal of adjacent layers from certain electrochemical cell fabrication components (e.g., substrates). In some embodiments, the release layer may be removed prior to the final assembly of an electrochemical cell or system, but in other embodiments, the release may be left within the final electrochemical cell or system.

In some embodiments, the release layer is a non-electronically conductive release layer. However, in other embodiments, the release layer is an electronically conductive release layer that can conduct electrons, for example, from one portion of the conductive release layer (e.g., a first surface) to another portion of the conductive release layer (e.g., a second surface). In some cases, it may be beneficial for to provide a conductive release layer that separates portions of the electrode from a carrier substrate (e.g., a metal foil) on which the electrode was fabricated and/or an adjacent electrode and/or active electrode material. For example, an intermediate electrode assembly may include, in sequence, a first electrode layer, a current collector of the first electrode, a conductive release layer, and a carrier substrate. In another embodiment, an intermediate electrode assembly may include, in sequence, a first electrode, a conductive release layer, and a carrier substrate. In one or both of these embodiments, the carrier substrate can facilitate handling of the electrode during fabrication and/or assembly, but may be released (e.g., by the conductive release layer) from the electrode prior to commercial use and/or prior to incorporation into a final electrochemical cell.

By contrast, certain existing methods of fabricating electrodes involve depositing electrode components onto a substrate that is eventually incorporated into an electrochemical cell (e.g., a battery). The substrate must be of sufficient thickness and/or formed of a suitable material in order to be compatible with the electrode fabrication process. For example, fabrication of an electrode comprising lithium metal as first electrode (or a current collector of the first electrode) may involve vacuum deposition of lithium metal at relatively high temperatures and high rates that would cause certain substrates to buckle unless the substrate was made of a particular material and/or had a sufficient thickness. Some substrates that are suitable for such fabrication steps may, however, end up reducing the performance of the cell if the substrate is incorporated into the cell. For instance, thick substrates may prevent buckling and therefore allow the deposition of a thick layer of an electroactive layer but may reduce the specific energy density of the cell. Furthermore, certain substrates that are incorporated into the electrochemical cell may react adversely with chemical species within the electrochemical cell during cycling. Furthermore, in some existing systems, if a first active species like lithium metal was positioned (e.g., deposited) adjacent to an additional active electrode material with a non-conductive release layer in between the two electroactive layers and then positioned in an electrochemical cell or a battery, the non-conductive release layer would be an isolative layer between two layers, which would result in uneven distribution and utilization of the two active electrode layers when utilized in an electrochemical cell, system, or battery. As a result, during cycling of the cell, the utilization of active electrode species (e.g., lithium metal) on both sides can uneven and negatively impact performance.

To remedy some of the above-mentioned issues, the present disclosure describes that, in some aspects, an electrode can be fabricated to include a conductive release layer to separate portions of the electrode. Advantageously, such systems and methods allow for a larger variety of substrates and/or more extreme processing conditions to be used when fabricating electrodes compared to that when a conductive release layer is not used. In addition, the use of a conductive release layer may provide electronic communication between two adjacent the electrodes (or two adjacent active electrode species) through the conductive release layer, which may result in more uniform current distribution and electrode active species (e.g., lithium metal) utilization during cycling inside the electrochemical cell when compared to certain existing systems and methods that utilize a non-conductive release layer (all other relevant factors being equal). For example, in some embodiments, a conductive release layer may be positioned in between (e.g., directly between) a first electrode and a second electrode such that the first and second electrodes are in electronic communication through the conductive release layer. In some such embodiments, a first active electrode species and a second active electrode species can be the same (e.g., both comprising lithium metal) or different. In some embodiments, the first active electrode species of a first electrode and a second active electrode species of an adjacent, second electrode both comprise lithium. Of course, it is again noted that some embodiments do not include an electronically conductive release layer (i.e., some embodiments may include an electronically non-conductive release layer, or may contain no release layer at all).

Several factors may be considered in determining the type of release layer of an electrochemical cell, including, but not limited to, the nature of the adjacent electrodes in which a release layer would be placed in between. Other factors in considering the release layer include, without limitation, relatively good adhesion to a first component (e.g., an electrode, a current collector, a substrate) but relatively moderate or poor adhesion to a second component (e.g., a carrier substrate, a current collector); the degree of electrical resistance/conductivity; high mechanical stability to facilitate delamination without mechanical disintegration; high thermal stability; ability to withstand the application of a force or pressure applied to the electrochemical cell or a component of the cell during fabrication and/or during cycling of the cell; and compatibility with processing conditions (e.g., deposition of layers on top of the release layer, as well as compatibility with techniques used to form the release layer). Release layers may be thin (e.g., less than about 10 microns) to reduce overall battery weight if the conductive release layer is incorporated into the electrochemical cell. Furthermore, release layers, when incorporated into a cell, should be stable in the electrolyte and should not interfere with the structural integrity of the electrodes in order for the electrochemical cell to have a high electrochemical capacity or energy storage capability (i.e., reduced capacity fade). In some cases, release layers from two electrode portions can be adhered together, optionally using an adhesion promoter as described in more detail below.

Determining suitable compositions, configurations (e.g., crosslinked or substantially uncrosslinked, degree of hydrolyzation) and dimensions of release layers (e.g., conductive release layers) and/or adhesion promoters can be carried out by those of ordinary skill in the art, without undue experimentation, in view of this disclosure. As described herein, a release layer may be chosen based on, for example, its inertness in the electrolyte and whether the release layer is to be incorporated into the electrochemical cell. The particular materials used to form the release layer may depend on, for example, the material compositions of the layers to be positioned adjacent the release layer and its adhesive affinity to those layers, as well as the thicknesses and method(s) used to deposit each of the layers. The dimensions of the release layer may be chosen such that the electrochemical cell has a low overall weight, while providing suitable release properties during fabrication.

One simple screening test for choosing appropriate materials for a release layer may include forming the release layer and immersing the layer in an electrolyte and observing whether inhibitory or other destructive behavior (e.g., disintegration) occurs compared to that in a control system. The same can be done with other layers (e.g., one or more of the conductive release layers, electroactive layer, an adhesion promoter, and/or another release layer) attached to the release layer. Another simple screening test may include forming an electrode including the one or more release layers and immersing the electrode in the electrolyte of the battery in the presence of the other battery components, discharging/charging the battery, and observing whether specific discharge capacity is higher or lower compared to a control system. A high discharge capacity may indicate no or minimal adverse reactions between the release layer and other components of the battery.

To test whether a release layer has adequate adhesion to one surface but relatively low adhesion to another surface to allow the release layer to be released, the adhesiveness or force required to remove a release layer from a unit area of a surface can be measured (e.g., in units of $N/m^2$). Adhesiveness can be measured using a tensile testing apparatus or another suitable apparatus. Such experiments can optionally be performed in the presence of a solvent (e.g., an electrolyte) or other components (e.g., fillers) to determine the influence of the solvent and/or components on adhesion. In some embodiments, mechanical testing of tensile strength or shear strength can be performed. For example, a release layer may be positioned on a first surface and opposite forces can be applied until the surfaces are no longer joined. The (absolute) tensile strength or shear strength is determined by measuring the maximum load under tensile or shear, respectively, divided by the interfacial area between the articles (e.g., the surface area of overlap between the articles). The normalized tensile strength or shear strength can be determined by dividing the tensile strength or shear strength, respectively, by the mass of the release layer applied to the articles. In one set of embodiments, a "T-peel test" is used. For example, a flexible article such as a piece of tape can be positioned on a surface of the release layer, and the tape can be pulled away from the surface of the other layer by lifting one edge and pulling that edge in a direction approximately perpendicular to the layer so that as the tape is being removed, it continually defines a strip bent at approximately 90 degrees to the point at which it diverges from the other layer. In other embodiments, relative adhesion between layers can be determined by positioning a release layer between two layers (e.g., between a carrier substrate and a current collector), and a force applied until the surfaces are no longer joined. In some such embodiments, a release layer that adheres to a first surface but releases from a second surface, without mechanical disintegration of the release layer, may be useful as a release layer for fabricating components of an electrochemical cell. The effectiveness of an adhesion promoter to facilitate adhesion between two surfaces can be tested using similar methods. Other simple tests are known and can be conducted by those of ordinary skill in the art.

The percent difference in adhesive strength between the release layer and the two surfaces in which the release layer is in contact may be calculated by taking the difference between the adhesive strengths at these two interfaces. For instance, for a release layer positioned between two layers (e.g., between a carrier substrate and a current collector), the adhesive strength of the release layer on the first layer (e.g., a carrier substrate) can be calculated, and the adhesive strength of the release layer on the second layer (e.g., a current collector) can be calculated. The smaller value can then be subtracted from the larger value, and this difference divided by the larger value to determine the percentage difference in adhesive strength between each of the two layers and the release layer. In some embodiments, this percent difference in adhesive strength is greater than about 20%, greater than about 30%, greater than about 40%, greater than about 50%, greater than about 60%, greater than about 70%, or greater than about 80%. The percentage difference in adhesive strength may be tailored by methods described herein, such as by choosing appropriate materials for each of the layers.

A peel test may include measuring the adhesiveness or force required to remove a layer (e.g., a conductive release layer) from a unit area of a surface of a second layer (e.g., an electroactive layer), which can be measured in N/m, using a tensile testing apparatus or another suitable apparatus. One example of a peel test that can be used is the MARK-10 BG5 gauge with ESM301 motorized test stand.

In some embodiments, the strength of adhesion between two layers (e.g., a release layer and an adjacent electrode) may range, for example, between 0.01 N/m to 2000 N/m. In some embodiments, the strength of adhesion may be greater than or equal to 0.01 N/m, greater than or equal to 0.02 N/m, greater than or equal to 0.04 N/m, greater than or equal to 0.06 N/m, greater than or equal to 0.08 N/m, greater than or equal to 0.1 N/m, greater than or equal to 0.5 N/m, greater than or equal to 1 N/m, greater than or equal to 10 N/m, greater than or equal to 25 N/m, greater than or equal to 50 N/m, greater than or equal to 100 N/m, greater than or equal to 200 N/m, greater than or equal to 350 N/m, greater than or equal to 500 N/m, greater than or equal to 700 N/m, greater than or equal to 900 N/m, greater than or equal to 1000 N/m, greater than or equal to 1200 N/m, greater than or equal to 1400 N/m, greater than or equal to 1600 N/m, or greater than or equal to 1800 N/m. In certain embodiments, the strength of adhesion may be less than or equal to 2000 N/m, less than or equal to 1500 N/m, less than or equal to 1000 N/m, less than or equal to 900 N/m, less than or equal to 700 N/m, less than or equal to 500 N/m, less than or equal to 350 N/m, less than or equal to 200 N/m, less than or equal to 100 N/m, less than or equal to 50 N/m, less than or equal to 25 N/m, less than or equal to 10 N/m, less than or equal to 1 N/m, less than or equal to 0.5 N/m, less than or equal to 0.1 N/m, less than or equal to 0.08 N/m, less than or equal to 0.06 N/m, less than or equal to 0.04 N/m, less than or equal to 0.02 N/m, or less than or equal to 0.01 N/m. Combinations of the above-referenced ranges are also possible (e.g., greater than or equal to 0.1 N/m and less than or equal to 50 N/m). Other ranges are possible.

Adhesion and/or release between a release layer and components of an electrochemical cell (including a second release layer) may involve associations such as adsorption, absorption, Van der Waals interactions, hydrogen bonding, covalent bonding, ionic bonding, cross linking, electrostatic interactions, and combinations thereof. The type and degree of such interactions can also be tailored as described herein.

A release layer can be fabricated by any suitable method. In some embodiments, thermal evaporation, vacuum deposition, sputtering, jet vapor deposition, or laser ablation can be used to deposit a release layer on a surface. The release layer may contain additional components to modify its properties (e.g., polymeric binder for binding and/or mechanical strength, conductive particles such as carbon black).

In some embodiments, a release layer is incorporated into a final electrochemical cell.

The electrochemical cells and systems described herein may also comprise an electrolyte. As understood by those skilled in the art, an electrolyte may provide ionic conductivity between two electrodes. In some embodiments, the electrolyte is a solid electrolyte. In other embodiments, the electrolyte is a liquid electrolyte, comprising one or more solvents (e.g., an electrolyte solvents). For example, in some embodiments, the electrolyte comprises a first solvent comprising a fluorinated carbonate and a second solvent comprising a carbonate (e.g., a non-fluorinated carbonate, or a different carbonate that then first solvent).

A variety of solvents may be suitable for the electrolyte. The solvent may be an aqueous solvent or a non-aqueous solvent. Examples of useful non-aqueous solvents (i.e., non-aqueous liquid electrolyte solvents) include, but are not limited to, N-methyl acetamide, acetonitrile, acetals, ketals, esters (e.g., esters of carbonic acid, sulfonic acid, an/or phosphoric acid), carbonates (e.g., dimethyl carbonate, diethyl carbonate, ethyl methyl carbonate, propylene carbonate, ethylene carbonate, fluoroethylene carbonate, difluoroethylene carbonate), sulfones, sulfites, sulfolanes, sulfonimides (e.g., bis(trifluoromethane)sulfonimide lithium salt), ethers (e.g., aliphatic ethers, acyclic ethers, cyclic ethers), glymes, polyethers, phosphate esters (e.g., hexafluorophosphate), siloxanes, dioxolanes, N-alkylpyrrolidones (e.g., N-methyl-2-pyrrolidone), nitrate containing compounds, substituted forms of the foregoing, and blends thereof. Examples of acyclic ethers that may be used include, but are not limited to, diethyl ether, dipropyl ether, dibutyl ether, dimethoxymethane, trimethoxymethane, 1,2-dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. These electrolytes may optionally include one or more ionic electrolyte salts (e.g., to provide or enhance ionic conductivity).

In some embodiments, an electrolyte comprises fluoroethylene carbonate. In some embodiments, the total weight of the fluoroethylene carbonate in the electrolyte may be less than or equal to 30 wt %, less than or equal to 28 wt %, less than or equal to 25 wt %, less than or equal to 22 wt %, less than or equal to 20 wt %, less than or equal to 18 wt %, less than or equal to 15 wt %, less than or equal to 12 wt %, less than or equal to 10 wt %, less than or equal to 8 wt %, less than or equal to 6 wt %, less than or equal to 5 wt %, less than or equal to 4 wt %, less than or equal to 3 wt %, less than or equal to 2 wt %, or less than or equal to 1 wt % versus the total weight of the electrolyte. In some embodiments, the total weight of the fluoroethylene carbonate in the electrolyte is greater than 0.2 wt %, greater than 0.5 wt %, greater than 1 wt %, greater than 2 wt %, greater than 3 wt %, greater than 4 wt %, greater than 6 wt %, greater than 8 wt %, greater than 10 wt %, greater than 15 wt %, greater than 18 wt %, greater than 20 wt %, greater than 22 wt %, greater than 25 wt %, or greater than 28 wt % versus the total weight of the electrolyte. Combinations of the above-referenced ranges are also possible (e.g., less than or equal to 0.2 wt % and greater than 30 wt %, less than or equal to 15 wt % and greater than 20 wt %, or less than or equal to 20 wt % and greater than 25 wt %). Other ranges are also possible.

In some embodiments, an electrolyte (e.g., a liquid electrolyte) comprises mixtures of two or more solvents or electrolytes, such as those described herein. For instance, an electrolyte may include a first solvent and a second solvent in one or more of the ranges described below. For example, in some embodiments, mixtures of solvents are selected from the following pairs of solvents: 1,3-dioxolane and dimethoxyethane, 1,3-dioxolane and diethyleneglycol dimethyl ether, 1,3-dioxolane and triethyleneglycol dimethyl ether, 1,3-dioxolane and sulfolane, dimethyl carbonate and ethylene carbonate, and fluoroethylene carbonate and dimethyl carbonate, ethylene carbonate and ethyl methyl carbonate, a fluorinated carbonate solvent and a non-fluorinated carbonate solvent, or other combinations of these and/or other solvents/electrolytes described herein.

In some such embodiments, the weight ratio of fluoroethylene carbonate to a non-fluorinated carbonate (e.g., dimethyl carbonate) may be greater than or equal to 5:95, greater than or equal to 10:90, greater than or equal to 15:85, greater than or equal to 20:80, greater than or equal to 25:75, greater than or equal to 30:70, greater than or equal to 40:60, or greater than or equal to 50:50, greater than or equal to 60:40, greater than or equal to 70:30, greater than or equal to 75:25, greater than or equal to 80:20, greater than or equal to 85:15, greater than or equal to 90:10, or greater than or equal to 95:5. In some such embodiments, the weight ratio of fluoroethylene carbonate to a non-fluorinated carbonate (e.g., dimethyl carbonate) is less than or equal to 95:5, less than or equal to 90:10, less than or equal to 85:15, less than or equal to 80:20, less than or equal to 75:25, less than or equal to 70:30, less than or equal to 60:40, less than or equal to 50:50, less than or equal to 40:60, less than or equal to 30:70, less than or equal to 25:75, less than or equal to 20:80, less than or equal to 15:85, less than or equal to 10:90, or less than or equal to 5:95. Combinations of the above-referenced ranges are also possible (e.g., greater than or equal to 5:95 and less than or equal to 50:50). In some embodiments, the ratio of the fluorinated carbonate to the non-fluorinated carbonate (e.g., dimethyl carbonate) is greater than 1:1 and less than or equal to 10:1. Other ranges are possible. In some embodiments, an additional electrolyte solvent may be present (e.g., a third electrolyte solvent, a fourth electrolyte solvent) and the additional electrolyte solvent may have a ratio with the first electrolyte solvent and/or a ratio with the second electrolyte solvent within one or more of the above-referenced ranges.

In some embodiments, an electrolyte may comprise several species together that are particularly beneficial in combination. For instance, in some embodiments, the electrolyte comprises fluoroethylene carbonate, dimethyl carbonate, and/or one or more salts such as $LiPF_6$. The weight ratio of the two solvents in the mixtures may range, in some cases, from about 5:95 to 95:5. In some embodiments, a ratio of a first electrolyte solvent to a second electrolyte solvent is greater than or equal to 5:95, greater than or equal to 10:90, greater than or equal to 15:85, greater than or equal to 20:80, greater than or equal to 25:75, greater than or equal to 30:70, greater than or equal to 40:60, or greater than or equal to 50:50, greater than or equal to 60:40, greater than or equal to 70:30, greater than or equal to 75:25, greater than or equal to 80:20, greater than or equal to 85:15, greater than or equal to 90:10, or greater than or equal to 95:5. In some embodiments, a ratio of a first electrolyte solvent to a second electrolyte solvent is less than or equal to 95:5, less than or equal to 90:10, less than or equal to 85:15, less than or equal to 80:20, less than or equal to 75:25, less than or equal to 70:30, less than or equal to 60:40, less than or equal to 50:50, less than or equal to 40:60, less than or equal to 30:70, less than or equal to 25:75, less than or equal to 20:80, less than or equal to 15:85, less than or equal to 10:90, or less than or equal to 5:95. Combinations of the above-referenced ranges are also possible (e.g., greater than or equal to 5:95 and less than or equal to 50:50). Other ranges are possible. In some such embodiments, the weight ratio of fluoroethylene carbonate to dimethyl carbonate may be between 20:80 and 25:75 and the concentration of $LiPF_6$ in the electrolyte may be between 0.05 M and 2 M (e.g., approximately 1 M) or another range of concentrations as described herein for lithium salts. The electrolyte may further comprise lithium bis(oxalato)borate (e.g., at a concentration between 0.1 wt % and 6 wt %, between 0.5 wt % and 6 wt %, or between 1 wt % and 6 wt % in the electrolyte), and/or lithium tris(oxalato) phosphate (e.g., at a concentration between 1 wt % and 6 wt % in the electrolyte). Other concentrations may also be possible.

In some embodiments, the electrolyte comprises an organic solvent comprising fluoroethylene carbonate at a concentration greater than 10% by weight of the electrolyte, and an aromatic hydrocarbon solvent that is different from the organic solvent, wherein the aromatic hydrocarbon solvent is present at an amount that deviates no more than 40 wt % with respect to a critical amount of aromatic hydrocarbon solvent in the electrolyte, and wherein the critical amount of aromatic hydrocarbon solvent in the electrolyte is an amount at which the electrolyte phase separates from a single liquid phase into at least two or more liquid phases.

In some embodiments, an electrolyte includes both an aromatic hydrocarbon solvent and another (e.g., a second) electrolyte solvent, wherein the aromatic hydrocarbon solvent is different from the electrolyte solvent, and wherein the aromatic hydrocarbon solvent has a formula (C):

(C)

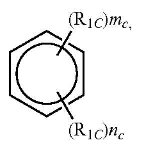

wherein, $R_{1C}$ and $R_{2C}$ can be the same or different and each is independently selected from hydrogen; halogen; unsubstituted, branched or unbranched aliphatic; substituted or unsubstituted, branched or unbranched haloaliphatic; substituted or unsubstituted, branched or unbranched haloheteroaliphatic; substituted or unsubstituted aryl; substituted or unsubstituted haloaryl; substituted or unsubstituted haloheteroaryl; wherein $R_{1C}$ and/or $R_{2C}$ can be substituted, branched or unbranched aliphatic when $R_{1C}$ and $R^{2C}$ are different and are not hydrogen or a nitro group; and wherein n and m are integers from 0 to 6, with $n_c+m_c \leq 6$. In some such embodiments, the aromatic hydrocarbon solvent is present at greater than or equal to 10% by weight of the electrolyte. In some embodiments, the aromatic hydrocarbon solvent is present at an amount that deviates no more than 40 wt % with respect to a critical amount of aromatic hydrocarbon solvent in the electrolyte, and wherein the critical amount of aromatic hydrocarbon solvent in the electrolyte is an amount at which the electrolyte phase separates from a single liquid phase into at least two or more liquid phases.

In some embodiments comprising an electrolyte including two or more solvents, the first solvent may comprise an asymmetric sulfonamide and a second solvent, different from the first solvent. In some embodiments, the second solvent comprises a cyclic carbonate (e.g., propylene carbonate, ethylene carbonate, fluoroethylene carbonate, difluoroethylene carbonate) and/or a linear carbonate (e.g., dimethyl carbonate, diethyl carbonate, ethyl methyl carbonate).

In some embodiments, an electrolyte solvent comprises an asymmetric sulfonamide having a formula (D):

(D)

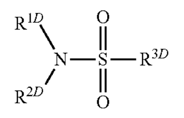

wherein $R^{1D}$ and $R^{2D}$ can be the same or different and each is independently selected from unsubstituted, branched or unbranched aliphatic chains; silyl substituents; or wherein $R^{1D}$ and $R^{2D}$ are connected to form an N-bound heterocycle; wherein, if $R^{1D}$ is selected from unsubstituted, branched or unbranched aliphatic chains, $R^{1D}$ comprises $n_D$ carbon atoms, where $n_D$ is an integer greater than or equal to 1 and less than or equal to 10; wherein, if $R^{2D}$ is selected from unsubstituted, branched or unbranched aliphatic chains, $R^{2D}$ comprises m carbon atoms, where m D is an integer greater than or equal to 1 and less than or equal to 10; wherein, if $R^{1D}$ and $R^{2D}$ are connected to form an N-bound heterocycle, the N-bound heterocycle comprises j D carbon atoms, where j D is an integer greater than or equal to 2 and less than or equal to 11; wherein, if $R^{1D}$ and/or $R^{2D}$ is a silyl substituent, the silyl substituent has the form $SiR^{4D}_3$, where $R^{4D}$ is an unsubstituted, branched or unbranched aliphatic chain comprising k D carbon atoms, where $k_D$ is an integer greater than or equal to 1 and less than or equal to 10; and wherein $R^{3D}$ is an electron withdrawing species.

In some embodiments, the electrolyte is a heterogenous electrolyte. As used herein, a "heterogeneous electrolyte" is an electrolyte including at least two different liquid solvents (e.g., a first and second electrolyte solvents, or anode-side and cathode-side electrolyte solvents) that are immiscible (e.g., at a particular temperature) (or can be made immiscible within an electrochemical cell or system) to the extent that they will largely separate (i.e., phase segregate) and at least one can be isolated from at least one component of the cell. A heterogeneous electrolyte may be in the form of a liquid, a gel, or a combination thereof. Specific examples of heterogeneous electrolytes are provided below.

In some embodiments, the electrolyte comprises a heterogeneous electrolyte between the first electrode and the second electrode, wherein the heterogeneous electrolyte comprises a first electrolyte solvent comprising benzene and a second electrolyte solvent comprising one or more non-aqueous organic solvents selected from the group consisting of carbonates, sulfones, acetals, esters, and ethers. In some such embodiments, the first electrolyte solvent is present disproportionately near the first electrode and the second electrolyte solvent is present disproportionately near the second electrode during use. In some such embodiments, the first and second electrolyte solvents are immiscible with one another during use of the lithium battery.

For embodiments comprising a heterogenous electrolyte, phase separation of the electrolyte compositions (e.g., a first electrolyte solvent, a second electrolyte solvent) may be carried out in a variety of manners. In one set of techniques, a polymer (which may be a gel) is positioned at a location in the device where it is desirable for a particular electrolyte solvent, which has relatively high affinity for the polymer, to reside. In another set of techniques, two different polymers are positioned in the device at particular locations where two different electrolyte solvents, each having a relatively greater affinity for one of the polymers, are desirably positioned. Similar arrangements can be constructed using more than two polymers. Relatively immiscible electrolyte solvents can be used, and positioned relative to each other, with or without a polymer, and to other components of the device, so as to control exposure of at least one component of the device to a particular species, by exploiting the fact that the species may be more highly soluble in one solvent than the other.

In some embodiments, the electrolyte comprises a heterogeneous electrolyte and is between the first electrode and a current collector of the second electrode, comprising a first electrolyte solvent comprising, for example, 1,3-dioxolane, and a second electrolyte solvent comprising, for example, dimethoxyethane (DME). In some such embodiments, at least a portion of the first electrolyte solvent is present disproportionately in a layer adjacent the first electrode.

In some embodiments involving a heterogeneous electrolyte, the first electrolyte solvent is present disproportionately near the first electrode and the second electrolyte solvent is present disproportionately near the second electrode, e.g., during use. In some embodiments, the first electrolyte solvent is present disproportionately near or at the first electrode at a molar or weight ratio of at least 2:1 relative to the second electrolyte solvent, and at least a portion of a second electrolyte solvent is present disproportionately near or at the second electrode at a molar or weight ratio of at least 2:1 relative to the first electrolyte solvent. In some such embodiments, the second electrolyte solvent includes at least one species which reacts adversely with the first electrode.

As mentioned above, in some cases, an aqueous solvent can be used with electrolytes, for example, in a lithium electrochemical cell. Aqueous solvents include water, which may further comprise other components, such as ionic salts. In some embodiments, the electrolyte can include species such as lithium hydroxide, or other species rendering the electrolyte basic, so as to reduce the concentration of hydrogen ions in the electrolyte.

In some embodiments, liquid electrolyte solvents may be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, polysulfones, polyethersulfones, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, between 20-40%, between 60-70%, between 70-80%, between 80-90%, or between 90-95% of a heterogeneous electrolyte by volume.

In some embodiments, one or more gel and/or solid polymers may be used to form the electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

An electrolyte salt may be present within the electrolyte. Examples of ionic electrolyte salts for use in the electrolyte of the electrochemical cells described herein include, but are not limited to, LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2$, and lithium bis(fluorosulfonyl) imide (LiFSI). Other electrolyte salts that may be useful include lithium polysulfides ($Li_2S_x$), and lithium salts of organic polysulfides ($(LiS_xR)_n$), where x is an integer from 1 to 20, n is an integer from 1 to 3, and R is an organic group, and those disclosed in U.S. Pat. No. 5,538,812 to Lee et al., which is incorporated herein by reference in its entirety for all purposes.

When present, a lithium salt may be present in the electrolyte at a variety of suitable concentrations. In some embodiments, the lithium salt is present in the electrolyte at a concentration of greater than or equal to 0.01 M, greater than or equal to 0.02 M, greater than or equal to 0.05 M, greater than or equal to 0.1 M, greater than or equal to 0.2 M, greater than or equal to 0.5 M, greater than or equal to 1 M, greater than or equal to 2 M, or greater than or equal to 5 M. The lithium salt may be present in the electrolyte at a concentration of less than or equal to 10 M, less than or equal to 5 M, less than or equal to 2 M, less than or equal to 1 M, less than or equal to 0.5 M, less than or equal to 0.2 M, less than or equal to 0.1 M, less than or equal to 0.05 M, or less than or equal to 0.02 M. Combinations of the above-referenced ranges are also possible (e.g., greater than or equal to 0.01 M and less than or equal to 10 M, or greater than or equal to 0.01 M and less than or equal to 5 M). Other ranges are also possible.

In some embodiments, the electrolyte comprises one or more room temperature ionic liquids. The room temperature ionic liquid, if present, typically comprises one or more cations and one or more anions. Non-limiting examples of suitable cations include lithium cations and/or one or more quaternary ammonium cations such as imidazolium, pyrrolidinium, pyridinium, tetraalkylammonium, pyrazolium, piperidinium, pyridazinium, pyrimidinium, pyrazinium, oxazolium, and trizolium cations. Non-limiting examples of suitable anions include trifluromethylsulfonate ($CF_3SO_3^-$), bis (fluorosulfonyl)imide ($N(FSO_2)_2^-$, bis (trifluoromethyl sulfonyl)imide ($(CF_3SO_2)_2N^-$, bis (perfluoroethylsulfonyl) imide($(CF_3CF_2SO_2)_2N^-$ and tris(trifluoromethylsulfonyl) methide ($(CF_3SO_2)_3C^-$. Non-limiting examples of suitable ionic liquids include N-methyl-N-propylpyrrolidinium/bis (fluorosulfonyl) imide and 1,2-dimethyl-3-propylimidazolium/bis(trifluoromethanesulfonyl)imide. In some embodiments, the electrolyte comprises both a room temperature ionic liquid and a lithium salt. In some other embodiments, the electrolyte comprises a room temperature ionic liquid and does not include a lithium salt.

As mentioned above, in some embodiments, the electrolyte is a solid electrolyte. In some such embodiments, the solid electrolyte may function as a separator, separating the first electrode and the second electrode (e.g., a cathode and an anode) such that solid electrolyte can facilitate the transport of ions (e.g., lithium ions) between the first electrode and the second electrode while also being electronically non-conductive to prevent short circuiting. However, it should be understood that, for some embodiments, a battery or a cell may additionally or alternatively comprise a liquid electrolyte. Details regarding liquid electrolytes are described above and elsewhere herein.

In some embodiments, the solid electrolyte comprises a ceramic material (e.g., particles of a ceramic material). Non-limiting examples of suitable ceramic materials include oxides (e.g., aluminum oxide, silicon oxide, lithium oxide), nitrides, and/or oxynitrides of aluminum, silicon, zinc, tin, vanadium, zirconium, magnesium, indium, and alloys thereof, $Li_xMP_yS_z$ (where x, y, and z are each integers, e.g., integers less than 32, less than or equal to 24, less than or equal 16, less than or equal to 8; and/or greater than or equal to 8, greater than or equal to 16, greater than or equal to 24); and where M=Sn, Ge, or Si) such as $Li_{22}SiP_2S_{18}$, $Li_{24}MP_2S_{19}$, or $LiMP_2S_{12}$ (e.g., where M=Sn, Ge, Si) and LiSiPS, garnets, crystalline or glass sulfides, phosphates, perovskites, anti-perovskites, other ion conductive inorganic materials and mixtures thereof. $Li_xMP_yS_z$ particles can be formed, for example, using raw components $Li_2S$, $SiS_2$ and $P_2S_5$ (or alternatively $Li_2S$, Si, S and $P_2S_5$), for example. In some embodiments, the solid electrolyte comprises a lithium ion-conducting ceramic compound. In an exemplary embodiment, the ceramic compound is $Li_{24}SiP_2S_{19}$. In another exemplary embodiment, the ceramic compound is $Li_{22}SiP_2S_{18}$.

In some embodiments, the ceramic material may comprise a material including one or more of lithium nitrides, lithium nitrates (e.g., $LiNO_3$), lithium silicates, lithium borates (e.g., lithium bis(oxalate)borate, lithium difluoro (oxalate)borate), lithium aluminates, lithium oxalates, lithium phosphates (e.g., $LiPO_3$, $Li_3PO_4$), lithium phosphorus oxynitrides, lithium silicosulfides, lithium germanosulfides, lithium oxides (e.g., $Li_2O$, LiO, $LiO_2$, $LiRO_2$, where R is a rare earth metal), lithium fluorides (e.g., LIF, $LiBF_4$, $LiAlF_4$, $LiPF_6$, $LiAsF_6$, $LiSbF_6$, $Li_2SiF_6$, $LiSO_3F$, $LiN(SO_2F)_2$, $LiN(SO_2CF_3)_2$), lithium lanthanum oxides, lithium titanium oxides, lithium borosulfides, lithium aluminosulfides, and lithium phosphosulfides, oxy-sulfides (e.g., lithium oxy-sulfides) and combinations thereof. In some embodiments, the plurality of particles may comprise $Al_2O_3$, $ZrO_2$, $SiO_2$, $CeO_2$, and/or $Al_2TiO_5$ (e.g., alone or in combination with one or more of the above materials). In a particular aspect, the plurality of particles may comprise Li—Al—Ti—$PO_4$ (LATP). The selection of the material (e.g., ceramic) will be dependent on a number of factors including, but not limited to, the properties of the layer and adjacent layers, for example, used in an electrochemical cell.

In some embodiments, an electrolyte is in the form of a layer having a particular thickness. An electrolyte layer may have a thickness of, for example, greater than or equal to 1 micron, greater than or equal to 5 microns, greater than or equal to 10 microns, greater than or equal to 15 microns, greater than or equal to 20 microns, greater than or equal to 25 microns, greater than or equal to 30 microns, greater than or equal to 40 microns, greater than or equal to 50 microns, greater than or equal to 70 microns, greater than or equal to 100 microns, greater than or equal to 200 microns, greater than or equal to 500 microns, or greater than or equal to 1 mm. In some embodiments, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 5 microns. Combinations of the above-referenced ranges are also possible (e.g., greater than or equal to 1 micron and less than or equal to 1 mm). Other ranges are possible.

In some embodiments, the electrolyte may further comprise one or more electrolyte additives. Electrolyte additives are described here and elsewhere herein. For example, in some embodiments, the electrolyte addictive includes sulfur, such as a xanthate-comprising compound or a salt thereof. These additives can provide additional functionality to the electrolyte, such as improved ionic conductivity, a passivating species for forming a passivation layer on an electrochemical cell component (e.g., a passivation layer on a first electrode, on a second electrode), reducing the formation of gaseous species formed during charging or discharging, improved electrode stability, as non-limiting examples. In some embodiments, the electrolyte additive is a silylated sulfonic acid ester as described above. In some embodiments, the electrolyte additive is a hydrocarbon solvent (e.g., an aliphatic solvent, an ethereal solvent, a cyclic ethereal solvent) as describe elsewhere herein.

In some embodiments in which the electrolyte comprises one or more additives, a total amount of additives in the electrolyte is greater than or equal to 0.1 wt %, greater than or equal to 0.5 wt %, greater than or equal to 1 wt %, or greater than or equal to 2 wt %, greater than or equal to 3 wt %, greater than or equal to 4 wt %, greater than or equal to 5 wt %, greater than or equal to 6 wt %, greater than or equal to 7 wt %, greater than or equal to 8 wt %, greater than or equal to 10 wt %, greater than or equal to 12 wt %, or greater than or equal to 15 wt % based on the total wt % of the electrolyte. In some embodiments, a total amount of additives in the electrolyte is less than or equal to 20 wt %, less than or equal to 15 wt %, less than or equal to 10 wt %, less than or equal to 7 wt %, less than or equal to 6 wt %, less than or equal to 5 wt %, less than or equal to 4 wt % based on the total wt % of the electrolyte. Combinations of the above-referenced ranges are also possible (e.g., greater than or equal to 0.1 wt % and less than or equal to 10 wt %). Other ranges are possible.

In some embodiments, an electrolyte includes an additive having a structure as in Formula (I) and/or an additive precursor having a structure as in Formula (II):

(I)

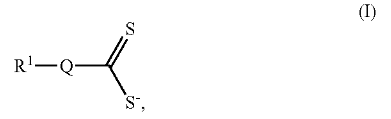

(II)

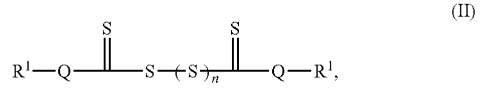

wherein each occurrence of Q is independently selected from the group consisting of Se, O, S, $PR^2$, $CR^2_2$, and $SiR^2_2$, n is 1-6, and each $R^1$ and $R^2$ can be the same or different, optionally connected, and are independently selected from the group consisting of hydrogen, oxygen, sulfur, halogen, nitrogen, phosphorus, substituted or unsubstituted, branched or unbranched aliphatic, substituted or unsubstituted cyclic, substituted or unsubstituted, branched or unbranched acyclic, substituted or unsubstituted, branched or unbranched heteroaliphatic, substituted or unsubstituted, branched or unbranched acyl, substituted or unsubstituted aryl, and substituted or unsubstituted heteroaryl.

In some embodiments, an electrolyte includes an additive having a structure as in Formula (I) and/or an additive precursor having a structure as in Formula (II):

(I)

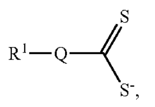

(II)

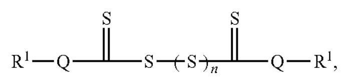

wherein each occurrence of Q is independently selected from the group consisting of Se, O, S, $PR^2$, $NR^2$, $CR^2_2$, and $SiR^2_2$, n is 1-6, each $R^1$ and $R^2$ can be the same or different, optionally connected, and are independently selected from the group consisting of hydrogen, oxygen, sulfur, halogen, nitrogen, phosphorus, substituted or unsubstituted, branched or unbranched aliphatic, substituted or unsubstituted cyclic, substituted or unsubstituted, branched or unbranched acyclic, substituted or unsubstituted, branched or unbranched heteroaliphatic, substituted or unsubstituted, branched or unbranched acyl, substituted or unsubstituted aryl, and substituted or unsubstituted heteroaryl, and the additive and any additive precursor is present in the electrochemical cell in a total amount of less than or equal to about 20 wt % versus the total weight of the electrolyte and additive and/or additive precursor, or the additive and any additive precursor is present in the electrochemical cell in a total amount of less than or equal to about 4 wt % versus the weight of each of the first and second electrodes.

In some embodiments, an electrolyte comprises an additive having a structure as in Formula (I) and/or an additive precursor having a structure as in Formula (II):

(I)

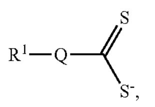

(II)

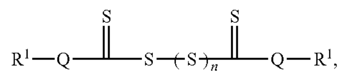

wherein each occurrence of Q is independently selected from the group consisting of Se, O, S, $PR^2$, $NR^2$, $CR^2_2$, and $SiR^2_2$, n is 1-6, each $R^1$ and $R^2$ can be the same or different, optionally connected, and are independently selected from the group consisting of hydrogen, oxygen, sulfur, halogen, nitrogen, phosphorus, substituted or unsubstituted, branched or unbranched aliphatic, substituted or unsubstituted cyclic, substituted or unsubstituted, branched or unbranched acyclic, substituted or unsubstituted, branched or unbranched heteroaliphatic, substituted or unsubstituted, branched or unbranched acyl, substituted or unsubstituted aryl, and substituted or unsubstituted heteroaryl, and wherein the additive and any additive precursor is/are different from the first and second active electrode species.

In some embodiments, an electrolyte comprises lithium bis-oxalatoborate and an additive having a structure as in Formula (I):

(I)

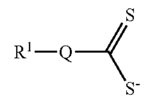

wherein each occurrence of Q is independently selected from the group consisting of Se, O, S, $PR^2$, $NR^2$, $CR^2_2$, and $SiR^2_2$, each $R^1$ and $R^2$ can be the same or different, optionally connected, and are independently selected from the group consisting of hydrogen, oxygen, sulfur, halogen, nitrogen, phosphorus, substituted or unsubstituted, branched or unbranched aliphatic, substituted or unsubstituted cyclic, substituted or unsubstituted, branched or unbranched acyclic, substituted or unsubstituted, branched or unbranched heteroaliphatic, substituted or unsubstituted, branched or unbranched acyl, substituted or unsubstituted aryl, and substituted or unsubstituted heteroaryl, and wherein the additive and any additive precursor is/are different from the first and second active electrode species.

In some embodiments, an electrolyte comprises lithium bis-oxalatoborate and one or more of an ethyl xanthate salt, a diethiocarbamate salt, and an isopropyl xanthate salt.

In some embodiments, an electrolyte comprises lithium bis-oxalatoborate, and an additive having a structure as in Formula (I):

(I)

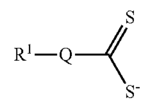

wherein each occurrence of Q is independently selected from the group consisting of Se, O, S, $PR^2$, $NR^2$, $CR^2_2$, and $SiR^2_2$, each $R^1$ and $R^2$ can be the same or different, optionally connected, and are independently selected from the group consisting of hydrogen, oxygen, sulfur, halogen, nitrogen, phosphorus, substituted or unsubstituted, branched or unbranched aliphatic, substituted or unsubstituted cyclic, substituted or unsubstituted, branched or unbranched acyclic, substituted or unsubstituted, branched or unbranched heteroaliphatic, substituted or unsubstituted, branched or unbranched acyl, substituted or unsubstituted aryl, and substituted or unsubstituted heteroaryl, and wherein the additive and any additive precursor is/are different from the first and second active electrode species. The second electrode is an intercalation electrode (e.g., a lithium intercalation electrode), optionally comprising one or more of $Li_xCoO_2$, $Li_xNiO_2$, $Li_xMnO_2$, $Li_xMn_2O_4$, $Li_xFePO_4$, $Li_xCoPO_4$, $Li_xMnPO_4$, and $Li_xNiPO_4$, where ($0<x\leq1$), and $LiNi_xMn_yCo_zO_2$ where ($x+y+z=1$).

In some embodiments, a method comprises introducing into an electrochemical cell an additive having a structure as in Formula (I) and/or an additive precursor having a structure as in Formula (II):

(I)

(II)

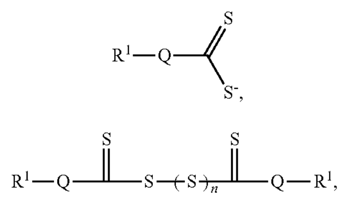

wherein each occurrence of Q is independently selected from the group consisting of Se, O, S, $NR^2$, $PR^2$, $CR^2_2$, and $SiR^2_2$, n is 1-6, each $R^1$ and $R^2$ can be the same or different, optionally connected, and are independently selected from the group consisting of hydrogen, oxygen, sulfur, halogen, nitrogen; phosphorus; substituted or unsubstituted, branched or unbranched aliphatic, substituted or unsubstituted cyclic, substituted or unsubstituted, branched or unbranched acyclic, substituted or unsubstituted, branched or unbranched heteroaliphatic, substituted or unsubstituted, branched or unbranched acyl, substituted or unsubstituted aryl, and substituted or unsubstituted heteroaryl, and wherein the electrode comprises active electrode species that is/are different from the additive and any additive precursor.

In some embodiments, a method comprises introducing into an electrochemical cell or a component of an electrochemical cell an additive having a structure as in Formula (I) and/or an additive precursor having a structure as in Formula (II):

(I)

(II)

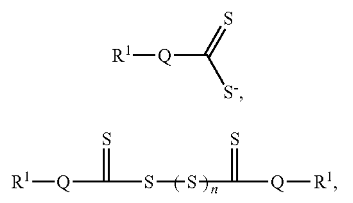

wherein each occurrence of Q is independently selected from the group consisting of Se, O, S, $PR^2$, $CR^2_2$, and $SiR^2_2$, n is 1-6, and each $R^1$ and $R^2$ can be the same or different, optionally connected, and are independently selected from the group consisting of hydrogen, oxygen, sulfur, halogen, nitrogen, phosphorus, substituted or unsubstituted, branched or unbranched aliphatic, substituted or unsubstituted cyclic, substituted or unsubstituted, branched or unbranched acyclic, substituted or unsubstituted, branched or unbranched heteroaliphatic, substituted or unsubstituted, branched or unbranched acyl, substituted or unsubstituted aryl, and substituted or unsubstituted heteroaryl.

In some embodiments involving the methods described above and herein, an introducing step comprises adding to an electrolyte the additive having a structure as in Formula (I) and/or the additive precursor having a structure as in Formula (II). In some embodiments involving the methods described above and herein, an introducing step comprises applying a coating to at least a portion of a surface of an electrode, the coating comprises the additive having a structure as in Formula (I) and/or the additive precursor having a structure as in Formula (II).

In some embodiments involving the electrochemical cells, electrolytes, and/or methods described above and herein, the electrochemical cell comprises a first electrode comprising a first active electrode species and a second electrode comprising a second active electrode species, wherein the first and second active electrode species are different from the additive and the additive precursor.

In some embodiments involving the electrochemical cells, electrolytes, and/or methods described above and herein, the additive and/or additive precursor is polyanionic and/or a salt. In some embodiments, the additive comprises a cation selected from the group of $Li^+$, $Na^+$, $K^+$, $Cs^+$, $Rb^+$, $Ca^{+2}$, $Mg^{+2}$, substituted or unsubstituted ammonium, guanidinium and imidazolium. In some embodiments, the additive and/or additive precursor comprises a xanthate group.

In some embodiments described above and herein, each $R^1$ is $C_2H_5$ and/or each $R^2$ is $C_2H_5$. In some embodiments, Q is oxygen or sulfur. In some embodiments, n=1.

In some embodiments involving the electrochemical cells and/or methods described above and herein, at least a portion of the additive and/or additive precursor is in solid form. In some embodiments, at least a portion of the additive and/or additive precursor is dissolved in the electrolyte. In some embodiments, the additive and/or additive precursor is at least partially soluble in the electrolyte.

In some embodiments, the additive and/or additive precursor is disposed on and/or within the first electrode and/or the second electrode. In some embodiments, the additive and/or additive precursor is present in the electrolyte. In some embodiments, the additive and/or additive precursor is disposed on and/or within a separator positioned between the first electrode and the second electrode. In some embodiments, the additive and/or additive precursor is present in a reservoir positioned between the first electrode and the second electrode.

In some embodiments, the additive and any additive precursor is present in the electrolyte in a total amount ranging between about 0.5 wt % and about 20 wt % versus the total weight of the electrolyte and additive and/or additive precursor. In certain embodiments, the additive and any additive precursor is present in the electrolyte in a total amount ranging between about 0.5 wt % and about 10 wt % versus the weight of each of the first and second electrodes.

In some embodiments, the electrolyte comprises a nitrate selected from the group of $LiNO_3$, guanidine nitrate, and pyridine nitrate. In some embodiments, the electrolyte comprises one or more of a carbonate, a hexafluorophosphate, 1,3-dioxolane, 1,2-dimethoxyethane, a sulfonimide, sulfones, sulfolanes, esters of carbonic acid, and/or a nitrate containing compound.

In some embodiments involving the electrochemical cells and/or methods described above and herein, the second electrode is an intercalated electrode.

In one set of embodiments, electrochemical cells comprising a first passivating agent and a second passivating agent are provided. The electrochemical cell may comprise a first electrode comprising lithium and a first surface, a second electrode comprising a second surface, an electrolyte, a first passivating agent, and a second passivating agent. In some embodiments, the first passivating agent comprises an N—O compound and the second passivating agent comprises one or more of lithium difluoro(oxalato) borate and difluoroethylene carbonate.

In some embodiments, an electrochemical cell comprises a first electrode comprising lithium and a first surface, a second electrode comprising a second surface, an electrolyte, a first passivating agent comprising an N—O compound, and a second passivating agent. In some embodiments, the second passivating agent comprises one or more of lithium difluoro(oxalato)borate and a species absent a vinyl group but is capable of developing a vinyl group upon electrochemical cell cycling.

In some embodiments, an electrochemical cell comprises a first electrode comprising lithium and a first surface, a second electrode comprising a second surface, an electrolyte, a first passivating agent comprising an N—O compound, and a second passivating agent comprising a species that is capable of undergoing polymerization to form a layer on the cathode during cell cycling. In some embodiments, the second electrode has a voltage with respect to lithium of greater than or equal to 2.8 V and less than or equal to 4.5 V.

In some embodiments, an electrochemical cell comprises a first electrode comprising lithium and a first surface, a second electrode comprising a second surface, an electrolyte, a first passivating agent comprising a xanthate group, and a second passivating agent. The second passivating agent may comprise one or more of lithium difluoro(oxalato)borate, a species that is capable of undergoing polymerization to form a layer on the cathode during cell cycling, and a species absent a vinyl group but is capable of developing a vinyl group upon electrochemical cell cycling.

In some embodiments, an electrochemical cell comprises a first electrode comprising lithium and a first surface, a second electrode comprising a second surface, an electrolyte, a first passivating agent comprising a xanthate group, and a second passivating agent comprising an (oxalato) borate group. The second passivating agent is present in the electrolyte at greater than or equal to 0.2 wt %.

In some embodiments, an electrochemical cell comprises a first electrode comprising lithium and a first surface, a second electrode comprising a second surface, an electrolyte, a first passivating agent comprising lithium nitrate, and a second passivating agent comprising a species that is capable of undergoing polymerization to form a layer on the cathode during cell cycling.

In some embodiments, an electrochemical cell comprises a first electrode comprising lithium and a first surface, a second electrode comprising a second surface, an electrolyte, a first passivating agent comprising tert-butyl xanthate, and a second passivating agent. The second passivating agent may comprise one or more of an (oxalato)borate group, a second passivating agent comprises a species that is capable of undergoing polymerization to form a layer on the cathode during cell cycling, a species which comprises a vinyl group, and a species absent a vinyl group but is capable of developing a vinyl group upon electrochemical cell cycling.

In some embodiments, an electrochemical cell comprises a first electrode comprising lithium and a first surface, a second electrode comprising a second surface, an electrolyte, a first passivating agent, and a second passivating agent. The first passivating agent may comprise one or more of a xanthate salt and a carbamate salt. The second passivating agent may comprise a silane.

In some embodiments, an electrolyte comprises a first passivating agent, wherein the first passivating agent comprises a xanthate (e.g., one or more of lithium xanthate, potassium xanthate, lithium ethyl xanthate, potassium ethyl xanthate, lithium isobutyl xanthate, potassium isobutyl xanthate, lithium tert-butyl xanthate, and potassium tert-butyl xanthate); and a second passivating agent, wherein the second passivating agent comprises an (oxalato)borate group, and wherein the second passivating agent is present in the electrolyte at greater than or equal to 0.2 wt %.

In some embodiments, an electrolyte comprises a first passivating agent, wherein the first passivating agent comprises a xanthate (e.g., one or more of lithium xanthate, potassium xanthate, lithium ethyl xanthate, potassium ethyl xanthate, lithium isobutyl xanthate, potassium isobutyl xanthate, lithium tert-butyl xanthate, and potassium tert-butyl xanthate); and a second passivating agent, wherein the second passivating agent comprises one or more of lithium difluoro(oxalato)borate, a species that is capable of undergoing polymerization to form a layer on the cathode during cell cycling, and a species absent a vinyl group but is capable of developing a vinyl group upon electrochemical cell cycling.

In some embodiments, an electrolyte comprises a first passivating agent, wherein the first passivating agent comprises a carbamate group; and a second passivating agent, wherein the second passivating agent comprises an (oxalato) borate group, and wherein the second passivating agent is present in the electrolyte at greater than or equal to 0.2 wt %.

In some embodiments, an electrolyte comprises a first passivating agent, wherein the first passivating agent comprises a carbamate group; and a second passivating agent, wherein the second passivating agent comprises one or more of lithium difluoro(oxalato)borate, a species that is capable of undergoing polymerization to form a layer on the cathode during cell cycling, and a species absent a vinyl group but is capable of developing a vinyl group upon electrochemical cell cycling.

In some embodiments, an electrochemical cell comprises a first electrode comprising lithium and a first surface, a second electrode comprising a second surface, an electrolyte, a first passivating agent comprising an N—O compound, and a second passivating agent comprising a silane. The silane may be chemically bonded to at least a portion of the second surface.

Some embodiments relate to methods. In some embodiments, a method may be performed in an electrochemical cell comprising a first electrode comprising lithium and a first surface, a second electrode comprising a second surface, a first passivating agent, and a second passivating agent different from the first passivating agent. The method may comprise forming a passivating layer on the second surface of the second electrode using the second passivating agent, and reducing decomposition of the first passivating agent and/or reducing decomposition of an electrolyte component promoted by the first passivating agent compared to decomposition in a similar electrochemical cell that does not include the second passivating agent, all other factors being equal.

In some embodiments, a method comprises exposing a particulate electroactive material to a silane, and adding the electroactive material to a solvent comprising a binder to form a slurry. In some embodiments, for at least 1 hour, the loss modulus of the slurry is greater than the storage modulus of the slurry for at least one frequency when the slurry is subject to an oscillating shear strain at a frequency of between 0.010 and 100 $s^{-1}$.

Some embodiments relate to slurries. In some embodiments, a slurry comprises a particulate electroactive material, a binder, and a solvent. The particulate electroactive material may comprise a lithium ion intercalation cathode material, and the particulate electroactive material may have a mean particle diameter of less than or equal to 8 microns. In some embodiments, the loss modulus of the slurry is greater than the storage modulus of the slurry for at least one frequency when the slurry is subject to an oscillating shear strain at a frequency of between 0.01 $s^{-1}$ and 100 $s^{-1}$.

In some embodiments, a slurry comprises a particulate electroactive material comprising nickel in an amount of at least 25 wt % and having a mean particle diameter of less than or equal to 20 microns, a binder, and a solvent. The loss modulus of the slurry is greater than the storage modulus of the slurry for at least one frequency when the slurry is subject to an oscillating shear strain at a frequency of between 0.010 and 100 $s^{-1}$.

Electrochemical cells and systems described herein may include or be operated under an applied anisotropic force. An "anisotropic force" is a force that is not equal in all directions. In some embodiments, the electrodes or electrochemical systems described herein can be configured to withstand an applied anisotropic force (e.g., a force applied to enhance the morphology or performance of an electrode within the cell) while maintaining their structural integrity. In some embodiments, the electrodes or electrochemical systems are adapted and arranged such that, during at least one period of time during charge and/or discharge of the cell, an anisotropic force with a component normal to the active surface of a layer within the electrochemical cell is applied to the cell.

In some such cases, the anisotropic force comprises a component normal to an active surface of an electrode (e.g., a first electrode, a second electrode) within an electrochemical cell. As used herein, the term "active surface" is used to describe a surface of an electrode at which electrochemical reactions may take place. A force with a "component normal" to a surface is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill will understand other examples of these terms, especially as applied within the description of this disclosure. In the case of a curved surface (for example, a concave surface or a convex surface), the component of the anisotropic force that is normal to an active surface of an electrode may correspond to the component normal to a plane that is tangent to the curved surface at the point at which the anisotropic force is applied. The anisotropic force may be applied, in some cases, at one or more pre-determined locations, in some cases distributed over the active surface of an electrode or layer. In some embodiments, the anisotropic force is applied uniformly over the active surface of a layer.

Any of the electrochemical cell properties and/or performance metrics described herein may be achieved, alone or in combination with each other, while an anisotropic force is applied to the electrochemical cell (e.g., during charge and/or discharge of the cell). In some embodiments, the anisotropic force applied to a layer or to the electrochemical cell (e.g., during at least one period of time during charge and/or discharge of the cell) can include a component normal to an active surface of a layer.

In some embodiments, the component of the anisotropic force that is normal to an active surface of a layer or an electrode defines a pressure of greater than or equal to 1 $kg_f/cm^2$, greater than or equal to 2 $kg_f/cm^2$, greater than or equal to 4 $kg_f/cm^2$, greater than or equal to 6 $kg_f/cm^2$, greater than or equal to 7.5 $kg_f/cm^2$, greater than or equal to 8 $kg_f/cm^2$, greater than or equal to 10 $kg_f/cm^2$, greater than or equal to 12 $kg_f/cm^2$, greater than or equal to 14 $kg_f/cm^2$, greater than or equal to 16 $kg_f/cm^2$, greater than or equal to 18 $kg_f/cm^2$, greater than or equal to 20 $kg_f/cm^2$, greater than or equal to 22 $kg_f/cm^2$, greater than or equal to 24 $kg_f/cm^2$, greater than or equal to 26 $kg_f/cm^2$, greater than or equal to 28 $kg_f/cm^2$, greater than or equal to 30 $kg_f/cm^2$, greater than or equal to 32 $kg_f/cm^2$, greater than or equal to 34 $kg_f/cm^2$, greater than or equal to 36 $kg_f/cm^2$, greater than or equal to 38 $kg_f/cm^2$, greater than or equal to 40 $kg_f/cm^2$, greater than or equal to 42 $kg_f/cm^2$, greater than or equal to 44 $kg_f/cm^2$, greater than or equal to 46 $kg_f/cm^2$, greater than or equal to 48 $kg_f/cm^2$, or more. In some embodiments, the component of the anisotropic force normal to the active surface may, for example, define a pressure of less than or equal to 50 $kg_f/cm^2$, less than or equal to 48 $kg_f/cm^2$, less than or equal to 46 $kg_f/cm^2$, less than or equal to 44 $kg_f/cm^2$, less than or equal to 42 $kg_f/cm^2$, less than or equal to 40 $kg_f/cm^2$, less than or equal to 38 $kg_f/cm^2$, less than or equal to 36 $kg_f/cm^2$, less than or equal to 34 $kg_f/cm^2$, less than or equal to 32 $kg_f/cm^2$, less than or equal to 30 $kg_f/cm^2$, less than or equal to 28 $kg_f/cm^2$, less than or equal to 26 $kg_f/cm^2$, less than or equal to 24 $kg_f/cm^2$, less than or equal to 22 $kg_f/cm^2$, less than or equal to 20 $kg_f/cm^2$, less than or equal to 18 $kg_f/cm^2$, less than or equal to 16 $kg_f/cm^2$, less than or equal to 14 $kg_f/cm^2$, less than or equal to 12 $kg_f/cm^2$, less than or equal to 10 $kg_f/cm^2$, less than or equal to 8 $kg_f/cm^2$, less than or equal to 6 $kg_f/cm^2$, less than or equal to 4 $kg_f/cm^2$, less than or equal to 2 $kg_f/cm^2$, or less. Combinations of the above-referenced ranges are also possible (e.g., greater than or equal to 1 $kg_f/cm^2$ and less than or equal to 50 $kg_f/cm^2$). Other ranges are possible.

The anisotropic forces applied during at least a portion of charge and/or discharge may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. Pat. No. 9,105,938, which is incorporated herein by reference in its entirety.

In some embodiments, one or more electrochemical cells may be operated within an electrochemical cell management system. It has been discovered that, in some cases, the cycle life of an electrochemical cell may increase if discharged, over at least a portion of a discharge cycle, at a rate that is at least 2 times greater than a related charging rate of at least a portion of a previous cycle. In certain conventional systems, cells are discharged and charged at the same rate or cells are charged substantially faster than they are discharged. However, it has been discovered that providing a discharge rate that is at least 2 times greater than a related charging rate may improve performance of an electrochemical cell. In some embodiments, a system comprising multiple cells is described where the above discharge/charge ratios are implemented within each individual cell of the system while also allowing the entire collection of cells of the system to provide high capacity and fast charging (i.e., by quickly discharging one subset of cells within the system while slowly charging all others and alternating which subset of cells is being discharged at a given time).

In some embodiments, the electrochemical cell management system is operatively associated with the electrochemical cell. In some embodiments, the electrochemical cell management system comprises at least one controller configured to control the electrochemical cell such that the electrochemical cell is charged at a charging rate over a first state of charge range having breadth of at least 2%. In some embodiments, the at least one controller is configured to control the electrochemical cell such that the electrochemical cell is discharged at a discharging rate over a second state of charge range having a breadth of at least 2%, wherein the discharging rate is at least 2 times the charging rate.

In some embodiments, one or more electrochemical cells may be cycled (i.e., charged/discharged) without a significant (e.g., less than or equal to 20%, less than or equal to 15%, less than or equal to 10%, less than or equal to 5%, less than or equal to 1%) change in capacity. In some embodiments, an electrochemical cell may be cycled greater than or equal to 1 cycle, greater than or equal to 20 cycles, greater than or equal to 50 cycles, greater than or equal to 100 cycles, greater than or equal to 150 cycles, greater than or equal to 200 cycles, greater than or equal to 250 cycles, greater than or equal to 300 cycles, greater than or equal to 350 cycles, or less than or equal to 400 cycles without a significant (e.g., less than or equal to 20%, less than or equal to 15%, less than or equal to 10%, less than or equal to 5%, less than or equal to 1%) change in capacity. In some embodiments, an electrochemical cell may be cycled less than or equal to 400 cycles, less than or equal to 350 cycles, less than or equal to 300 cycles, less than or equal to 250 cycles, less than or equal to 200 cycles, less than or equal to 150 cycles, less than or equal to 100 cycles, less than or equal to 50 cycles, less than or equal to 20 cycles, or less than or equal to 1 cycle without a significant (e.g., less than or equal to 20%, less than or equal to 15%, less than or equal to 10%, less than or equal to 5%, less than or equal to 1%) change in capacity. Combinations of the above-referenced ranges are also possible (e.g., greater than or equal to 1 cycle and less than or equal to 400 cycles). Other ranges are possible.

In some embodiments, an electrochemical cell has a particular specific capacity. In some embodiment, the specific capacity is greater than or equal to 50 mAh/g, greater than or equal to 100 mAh/g, greater than or equal to 150 mAh/g, greater than or equal to 200 mAh/g, greater than or equal to 250 mAh/g, greater than or equal to 300 mAh/g, greater than or equal to 350 mAh/g, greater than or equal to 300 mAh/g, greater than or equal to 450 mAh/g, greater than or equal to 475 mAh/g, greater than or equal to 500 mAh/g, greater than or equal to 600 mAh/g, greater than or equal to 700 mAh/g, greater than or equal to 800 mAh/g, greater than or equal to 900 mAh/g, or greater than or equal to 1,000 mAh/g. In some embodiments, the specific capacity is less than or equal to 1,000 mAh/g, less than or equal to 900 mAh/g, less than or equal to 800 mAh/g, less than or equal to 700 mAh/g, less than or equal to 600 mAh/g, less than or equal to, 500 mAh/g, less than or equal to 475 mAh/g, less than or equal to 400 mAh/g, less than or equal to 350 mAh/g, less than or equal to 300 mAh/g, less than or equal to 250 mAh/g, less than or equal to 200 mAh/g, less than or equal to 150 mAh/g, less than or equal to 100 mAh/g, or less than or equal to 50 mAh/g. Combinations of the above-referenced ranges are also possible (e.g., greater than or equal to 50 mAh/g and less than or equal to 1,000 mAh/g). Other ranges are possible.

In some embodiments, an electrochemical cell has a particular volumetric capacity. In some embodiments, an electrochemical cell has a volumetric capacity of greater than or equal to 100 mAh/L, greater than or equal to 200 mAh/L, greater than or equal to 300 mAh/L, greater than or equal to 400 mAh/L, greater than or equal to 500 mAh/L, greater than or equal to 600 mAh/L, greater than or equal to 700 mAh/L, greater than or equal to 800 mAh/L, greater than or equal to 805 mAh/L, or greater than or equal to 1000 mAh/L. In some embodiments, an electrochemical cell has a volumetric capacity of less than or equal to 1000 mAh/L, less than or equal to 805 mAh/L, less than or equal to 800 mAh/L, less than or equal to 700 mAh/L, less than or equal to 600 mAh/L, less than or equal to 500 mAh/L, less than or equal to 400 mAh/L, less than or equal to 300 mAh/L, less than or equal to 200 mAh/L, or less than or equal to 100 mAh/L. Combinations of the above-referenced ranges are also possible (e.g., greater than or equal to 100 Wh/L and less than or equal to 1000 Wh/L). Other ranges are possible.

The electrochemical cells and systems described herein can be integrated into a battery (e.g., a rechargeable battery). In some embodiments, the electrochemical cells and systems can be used to provide power to an electric vehicle or otherwise be incorporated into an electric vehicle. As a non-limiting example, electrochemical cells and systems described herein can, in some cases, be used to provide power to a drive train of an electric vehicle. The vehicle may be any suitable vehicle, adapted for travel on land, sea, and/or air. For example, the vehicle may be an automobile, truck, motorcycle, boat, helicopter, airplane, and/or any other suitable type of vehicle. In some instances, the electrochemical cells and systems may be used in battery applications. In some embodiments, a battery comprises one electrochemical cell. In some embodiments, a battery comprises, at least 10, 20, 30, 40, or 50 electrochemical cells.

The following applications are incorporated herein by reference, in their entirety, for all purposes: U.S. Publication No. US-2007-0221265-A1 published on Sep. 27, 2007, filed as U.S. application Ser. No. 11/400,781 on Apr. 6, 2006, and entitled "RECHARGEABLE LITHIUM/WATER, LITHIUM/AIR BATTERIES"; U.S. Publication No. US-2009-0035646-A1, published on Feb. 5, 2009, filed as U.S. application Ser. No. 11/888,339 on Jul. 31, 2007, and entitled "SWELLING INHIBITION IN BATTERIES"; U.S. Publication No. US-2010-0129699-A1 published on May 17, 2010, filed as U.S. application Ser. No. 12/312,764 on Feb. 2, 2010; patented as U.S. Pat. No. 8,617,748 on Dec. 31, 2013, and entitled "SEPARATION OF ELECTROLYTES"; U.S. Publication No. US-2010-0291442-A1 published on Nov. 18, 2010, filed as U.S. application Ser. No. 12/682,011 on Jul. 30, 2010, patented as U.S. Pat. No. 8,871,387 on Oct. 28, 2014, and entitled "PRIMER FOR BATTERY ELECTRODE"; U.S. Publication No. US-2009-0200986-A1 published on Aug. 13, 2009, filed as U.S. application Ser. No. 12/069,335 on Feb. 8, 2008, patented as U.S. Pat. No. 8,264,205 on Sep. 11, 2012, and entitled "CIRCUIT FOR CHARGE AND/OR DISCHARGE PROTECTION IN AN ENERGY-STORAGE DEVICE"; U.S. Publication No. US-2007-0224502-A1 published on Sep. 27, 2007, filed as U.S. application Ser. No. 11/400,025 on Apr. 6, 2006, patented as U.S. Pat. No. 7,771,870 on Aug. 10, 2010, and entitled "ELECTRODE PROTECTION IN BOTH AQUEOUS AND NON-AQUEOUS ELECTROCHEMICAL CELLS, INCLUDING RECHARGEABLE LITHIUM BATTERIES"; U.S. Publication No. US-2008-0318128-A1 published on Dec. 25, 2008, filed as U.S. application Ser. No. 11/821,576 on Jun. 22, 2007, and entitled “LITHIUM ALLOY/SULFUR BATTERIES”; U.S. Publication No. US-2002-0055040-A1 published on May 9, 2002, filed as U.S. application Ser. No. 09/795,915 on Feb. 27, 2001, patented as U.S. Pat. No. 7,939,198 on May 10, 2011, and entitled “NOVEL COMPOSITE CATHODES, ELECTROCHEMICAL CELLS COMPRISING NOVEL COMPOSITE CATHODES, AND PROCESSES FOR FABRICATING SAME”; U.S. Publication No. US-2006-0238203-A1 published on Oct. 26, 2006, filed as U.S. application Ser. No. 11/111,262 on Apr. 20, 2005, patented as U.S. Pat. No. 7,688,075 on Mar. 30, 2010, and entitled “LITHIUM SULFUR RECHARGEABLE BATTERY FUEL GAUGE SYSTEMS AND METHODS”; U.S. Publication No. US-2008-0187663-A1 published on Aug. 7, 2008, filed as U.S. application Ser. No. 11/728,197 on Mar. 23, 2007, patented as U.S. Pat. No. 8,084,102 on Dec. 27, 2011, and entitled “METHODS FOR CO-FLASH EVAPORATION OF POLYMERIZABLE MONOMERS AND NON-POLYMERIZABLE CARRIER SOLVENT/SALT MIXTURES/SOLUTIONS”; U.S. Publication No. US-2011-0006738-A1 published on Jan. 13, 2011, filed as U.S. application Ser. No. 12/679,371 on Sep. 23, 2010, and entitled “ELECTROLYTE ADDITIVES FOR LITHIUM BATTERIES AND RELATED METHODS”; U.S. Publication No. US-2011-0008531-A1 published on Jan. 13, 2011, filed as U.S. application Ser. No. 12/811,576 on Sep. 23, 2010, patented as U.S. Pat. No. 9,034,421 on May 19, 2015, and entitled “METHODS OF FORMING ELECTRODES COMPRISING SULFUR AND POROUS MATERIAL COMPRISING CARBON”; U.S. Publication No. US-2010-0035128-A1 published on Feb. 11, 2010, filed as U.S. application Ser. No. 12/535,328 on Aug. 4, 2009, patented as U.S. Pat. No. 9,105,938 on Aug. 11, 2015, and entitled “APPLICATION OF FORCE IN ELECTROCHEMICAL CELLS”; U.S. Publication No. US-2011-0165471-A9 published on Jul. 15, 2011, filed as U.S. application Ser. No. 12/180,379 on Jul. 25, 2008, and entitled “PROTECTION OF ANODES FOR ELECTROCHEMICAL CELLS”; U.S. Publication No. US-2006-0222954-A1 published on Oct. 5, 2006, filed as U.S. application Ser. No. 11/452,445 on Jun. 13, 2006, patented as U.S. Pat. No. 8,415,054 on Apr. 9, 2013, and entitled “LITHIUM ANODES FOR ELECTROCHEMICAL CELLS”; U.S. Publication No. US-2010-0239914-A1 published on Sep. 23, 2010, filed as U.S. application Ser. No. 12/727,862 on Mar. 19, 2010, and entitled “CATHODE FOR LITHIUM BATTERY”; U.S. Publication No. US-2010-0294049-A1 published on Nov. 25, 2010, filed as U.S. application Ser. No. 12/471,095 on May 22, 2009, patented as U.S. Pat. No. 8,087,309 on Jan. 3, 2012, and entitled “HERMETIC SAMPLE HOLDER AND METHOD FOR PERFORMING MICROANALYSIS UNDER CONTROLLED ATMOSPHERE ENVIRONMENT”; U.S. Publication No. US-2011-0076560-A1 published on Mar. 31, 2011, filed as U.S. application Ser. No. 12/862,581 on Aug. 24, 2010, and entitled “ELECTROCHEMICAL CELLS COMPRISING POROUS STRUCTURES COMPRISING SULFUR”; U.S. Publication No. US-2011-0068001-A1 published on Mar. 24, 2011, filed as U.S. application Ser. No. 12/862,513 on Aug. 24, 2010, and entitled “RELEASE SYSTEM FOR ELECTROCHEMICAL CELLS”; U.S. Publication No. US-2012-0048729-A1 published on Mar. 1, 2012, filed as U.S. application Ser. No. 13/216,559 on Aug. 24, 2011, and entitled “ELECTRICALLY NON-CONDUCTIVE MATERIALS FOR ELECTROCHEMICAL CELLS”; U.S. Publication No. US-2011-0177398-A1 published on Jul. 21, 2011, filed as U.S. application Ser. No. 12/862,528 on Aug. 24, 2010, patented as U.S. Pat. No. 10,629,947 on Apr. 21, 2020, and entitled “ELECTROCHEMICAL CELL”; U.S. Publication No. US-2011-0070494-A1 published on Mar. 24, 2011, filed as U.S. application Ser. No. 12/862,563 on Aug. 24, 2010, and entitled “ELECTROCHEMICAL CELLS COMPRISING POROUS STRUCTURES COMPRISING SULFUR”; U.S. Publication No. US-2011-0070491-A1 published on Mar. 24, 2011, filed as U.S. application Ser. No. 12/862,551 on Aug. 24, 2010, and entitled “ELECTROCHEMICAL CELLS COMPRISING POROUS STRUCTURES COMPRISING SULFUR”; U.S. Publication No. US-2011-0059361-A1 published on Mar. 10, 2011, filed as U.S. application Ser. No. 12/862,576 on Aug. 24, 2010, patented as U.S. Pat. No. 9,005,809 on Apr. 14, 2015, and entitled “ELECTROCHEMICAL CELLS COMPRISING POROUS STRUCTURES COMPRISING SULFUR”; U.S. Publication No. US-2012-0052339-A1 published on Mar. 1, 2012, filed as U.S. application Ser. No. 13/216,579 on Aug. 24, 2011, and entitled “ELECTROLYTE MATERIALS FOR USE IN ELECTROCHEMICAL CELLS”; U.S. Publication No. US-2012-0070746-A1 published on Mar. 22, 2012, filed as U.S. application Ser. No. 13/240,113 on Sep. 22, 2011, and entitled “LOW ELECTROLYTE ELECTROCHEMICAL CELLS”; U.S. Publication No. US-2011-0206992-A1 published on Aug. 25, 2011, filed as U.S. application Ser. No. 13/033,419 on Feb. 23, 2011, and entitled “POROUS STRUCTURES FOR ENERGY STORAGE DEVICES”; U.S. Publication No. US-2012-0082872-A1 published on Apr. 5, 2012, filed as U.S. application Ser. No. 13/249,605 on Sep. 30, 2011, and entitled “ADDITIVE FOR ELECTROLYTES”; U.S. Publication No. US-2012-0082901-A1 published on Apr. 5, 2012, filed as U.S. application Ser. No. 13/249,632 on Sep. 30, 2011, and entitled “LITHIUM-BASED ANODE WITH IONIC LIQUID POLYMER GEL”; U.S. Publication No. US-2013-0164635-A1 published on Jun. 27, 2013, filed as U.S. application Ser. No. 13/700,696 on Mar. 6, 2013, patented as U.S. Pat. No. 9,577,243 on Feb. 21, 2017, and entitled “USE OF EXPANDED GRAPHITE IN LITHIUM/SULPHUR BATTERIES”; U.S. Publication No. US-2013-0017441-A1 published on Jan. 17, 2013, filed as U.S. application Ser. No. 13/524,662 on Jun. 15, 2012, patented as U.S. Pat. No. 9,548,492 on Jan. 17, 2017, and entitled “PLATING TECHNIQUE FOR ELECTRODE”; U.S. Publication No. US-2013-0224601-A1 published on Aug. 29, 2013, filed as U.S. application Ser. No. 13/766,862 on Feb. 14, 2013, patented as U.S. Pat. No. 9,077,041 on Jul. 7, 2015, and entitled “ELECTRODE STRUCTURE FOR ELECTROCHEMICAL CELL”; U.S. Publication No. US-2013-0252103-A1 published on Sep. 26, 2013, filed as U.S. application Ser. No. 13/789,783 on Mar. 8, 2013, patented as U.S. Pat. No. 9,214,678 on Dec. 15, 2015, and entitled “POROUS SUPPORT STRUCTURES, ELECTRODES CONTAINING SAME, AND ASSOCIATED METHODS”; U.S. Publication No. US-2015-0287998-A1 published on Oct. 8, 2015, filed as U.S. application Ser. No. 14/743,304 on Jun. 18, 2015, patented as U.S. Pat. No. 9,577,267 on Feb. 21, 2017, and entitled “ELECTRODE STRUCTURE AND METHOD FOR MAKING SAME”; U.S. Publication No. US-2013-0095380-A1 published on Apr. 18, 2013, filed as U.S. application Ser. No. 13/644,933 on Oct. 4, 2012, patented as U.S. Pat. No. 8,936,870 on Jan. 20, 2015, and entitled “ELECTRODE STRUCTURE AND METHOD FOR MAKING THE SAME”; U.S. Publication No. US-2012-0052397-A1 published on Mar. 1, 2012, filed as U.S. application Ser. No. 13/216,538 on Aug. 24, 2011, patented as U.S. Pat. No. 9,853,287 on Dec. 26, 2017, and entitled "ELECTROLYTE MATERIALS FOR USE IN ELECTROCHEMICAL CELLS"; U.S. Publication No. US-2014-0123477-A1 published on May 8, 2014, filed as U.S. application Ser. No. 14/069,698 on Nov. 1, 2013, patented as U.S. Pat. No. 9,005,311 on Apr. 14, 2015, and entitled "ELECTRODE ACTIVE SURFACE PRETREATMENT"; U.S. Publication No. US-2014-0193723-A1 published on Jul. 10, 2014, filed as U.S. application Ser. No. 14/150,156 on Jan. 8, 2014, patented as U.S. Pat. No. 9,559,348 on Jan. 31, 2017, and entitled "CONDUCTIVITY CONTROL IN ELECTROCHEMICAL CELLS"; U.S. Publication No. US-2014-0255780-A1 published on Sep. 11, 2014, filed as U.S. application Ser. No. 14/197,782 on Mar. 5, 2014, patented as U.S. Pat. No. 9,490,478 on Nov. 8, 2016, and entitled "ELECTROCHEMICAL CELLS COMPRISING FIBRIL MATERIALS"; U.S. Publication No. US-2014-0272594-A1 published on Sep. 18, 2014, filed as U.S. application Ser. No. 13/833,377 on Mar. 15, 2013, and entitled "PROTECTIVE STRUCTURES FOR ELECTRODES"; U.S. Publication No. US-2014-0272597-A1 published on Sep. 18, 2014, filed as U.S. application Ser. No. 14/209,274 on Mar. 13, 2014, patented as U.S. Pat. No. 9,728,768 on Aug. 8, 2017, and entitled "PROTECTED ELECTRODE STRUCTURES AND METHODS"; U.S. Publication No. US-2015-0280277-A1 published on Oct. 1, 2015, filed as U.S. application Ser. No. 14/668,102 on Mar. 25, 2015, patented as U.S. Pat. No. 9,755,268 on Sep. 5, 2017, and entitled "GEL ELECTROLYTES AND ELECTRODES"; U.S. Publication No. US-2015-0180037-A1 published on Jun. 25, 2015, filed as U.S. application Ser. No. 14/576,570 on Dec. 19, 2014, patented as U.S. Pat. No. 10,020,512 on Jul. 10, 2018, and entitled "POLYMER FOR USE AS PROTECTIVE LAYERS AND OTHER COMPONENTS IN ELECTROCHEMICAL CELLS"; U.S. Publication No. US-2015-0349310-A1 published on Dec. 3, 2015, filed as U.S. application Ser. No. 14/723,132 on May 27, 2015, patented as U.S. Pat. No. 9,735,411 on Aug. 15, 2017, and entitled "POLYMER FOR USE AS PROTECTIVE LAYERS AND OTHER COMPONENTS IN ELECTROCHEMICAL CELLS"; U.S. Publication No. US-2014-0272595-A1 published on Sep. 18, 2014, filed as U.S. application Ser. No. 14/203,802 on Mar. 11, 2014, and entitled "COMPOSITIONS FOR USE AS PROTECTIVE LAYERS AND OTHER COMPONENTS IN ELECTROCHEMICAL CELLS"; U.S. Publication No. US-2019-0006699-A1 published on Jan. 3, 2019, filed as U.S. application Ser. No. 15/727,438 on Oct. 6, 2017, and entitled "PRESSURE AND/OR TEMPERATURE MANAGEMENT IN ELECTROCHEMICAL SYSTEMS"; U.S. Publication No. US-2014-0193713-A1 published on Jul. 10, 2014, filed as U.S. application Ser. No. 14/150,196 on Jan. 8, 2014, patented as U.S. Pat. No. 9,531,009 on Dec. 27, 2016, and entitled "PASSIVATION OF ELECTRODES IN ELECTROCHEMICAL CELLS"; U.S. Publication No. US-2014-0127577-A1 published on May 8, 2014, filed as U.S. application Ser. No. 14/068,333 on Oct. 31, 2013, patented as U.S. Pat. No. 10,243,202 on Mar. 26, 2019, and entitled "POLYMERS FOR USE AS PROTECTIVE LAYERS AND OTHER COMPONENTS IN ELECTROCHEMICAL CELLS"; U.S. Publication No. US-2015-0318539-A1 published on Nov. 5, 2015, filed as U.S. application Ser. No. 14/700,258 on Apr. 30, 2015, patented as U.S. Pat. No. 9,711,784 on Jul. 18, 2017, and entitled "ELECTRODE FABRICATION METHODS AND ASSOCIATED SYSTEMS AND ARTICLES"; U.S. Publication No. US-2014-0272565-A1 published on Sep. 18, 2014, filed as U.S. application Ser. No. 14/209,396 on Mar. 13, 2014, patented as U.S. Pat. No. 10,862,105 on Dec. 8, 2020 and entitled "PROTECTED ELECTRODE STRUCTURES"; U.S. Publication No. US-2015-0010804-A1 published on Jan. 8, 2015, filed as U.S. application Ser. No. 14/323,269 on Jul. 3, 2014, patented as U.S. Pat. No. 9,994,959 on Jun. 12, 2018, and entitled "CERAMIC/POLYMER MATRIX FOR ELECTRODE PROTECTION IN ELECTROCHEMICAL CELLS, INCLUDING RECHARGEABLE LITHIUM BATTERIES"; U.S. Publication No. US-2015-0162586-A1 published on Jun. 11, 2015, filed as U.S. application Ser. No. 14/561,305 on Dec. 5, 2014, and entitled "NEW SEPARATOR"; U.S. Publication No. US-2015-0044517-A1 published on Feb. 12, 2015, filed as U.S. application Ser. No. 14/455,230 on Aug. 8, 2014, patented as U.S. Pat. No. 10,020,479 on Jul. 10, 2018, and entitled "SELF-HEALING ELECTRODE PROTECTION IN ELECTROCHEMICAL CELLS"; U.S. Publication No. US-2015-0236322-A1 published on Aug. 20, 2015, filed as U.S. application Ser. No. 14/184,037 on Feb. 19, 2014, patented as U.S. Pat. No. 10,490,796 on Nov. 26, 2019, and entitled "ELECTRODE PROTECTION USING ELECTROLYTE-INHIBITING ION CONDUCTOR"; U.S. Publication No. US-2015-0236320-A1 published on Aug. 20, 2015, filed as U.S. application Ser. No. 14/624,641 on Feb. 18, 2015, patented as U.S. Pat. No. 9,653,750 on May 16, 2017, and entitled "ELECTRODE PROTECTION USING A COMPOSITE COMPRISING AN ELECTROLYTE-INHIBITING ION CONDUCTOR"; U.S. Publication No. US-2016-0118638-A1 published on Apr. 28, 2016, filed as U.S. application Ser. No. 14/921,381 on Oct. 23, 2015, and entitled "COMPOSITIONS FOR USE AS PROTECTIVE LAYERS AND OTHER COMPONENTS IN ELECTROCHEMICAL CELLS"; U.S. Publication No. US-2016-0118651-A1 published on Apr. 28, 2016, filed as U.S. application Ser. No. 14/918,672 on Oct. 21, 2015, and entitled "ION-CONDUCTIVE COMPOSITE FOR ELECTROCHEMICAL CELLS"; U.S. Publication No. US-2016-0072132-A1 published on Mar. 10, 2016, filed as U.S. application Ser. No. 14/848,659 on Sep. 9, 2015, patented as U.S. Pat. No. 11,038,178 on Jun. 15, 2021 and entitled "PROTECTIVE LAYERS IN LITHIUM-ION ELECTROCHEMICAL CELLS AND ASSOCIATED ELECTRODES AND METHODS"; U.S. Publication No. US-2018-0138542-A1 published on May 17, 2018, filed as U.S. application Ser. No. 15/567,534 on Oct. 18, 2017, patented as U.S. Pat. No. 10,847,833 on Nov. 24, 2020 and entitled "GLASS-CERAMIC ELECTROLYTES FOR LITHIUM-SULFUR BATTERIES"; U.S. Publication No. US-2016-0344067-A1 published on Nov. 24, 2016, filed as U.S. application Ser. No. 15/160,191 on May 20, 2016, patented as U.S. Pat. No. 10,461,372 on Oct. 29, 2019, and entitled "PROTECTIVE LAYERS FOR ELECTROCHEMICAL CELLS"; U.S. Publication No. US-2020-0099108-A1 published on Mar. 26, 2020, filed as U.S. application Ser. No. 16/587,939 on Sep. 30, 2019, and entitled "PROTECTIVE LAYERS FOR ELECTROCHEMICAL CELLS"; U.S. Publication No. US-2017-0141385-A1 published on May 18, 2017, filed as U.S. application Ser. No. 15/343,890 on Nov. 4, 2016, and entitled "LAYER COMPOSITE AND ELECTRODE HAVING A SMOOTH SURFACE, AND ASSOCIATED METHODS"; U.S. Publication No. US-2017-0141442-A1 published on May 18, 2017, filed as U.S. application Ser. No. 15/349,140 on Nov. 11, 2016, and entitled "ADDITIVES FOR ELECTROCHEMICAL CELLS"; patented as U.S. patent Ser. No. 10/320,031 on Jun. 11, 2019, and entitled "ADDITIVES FOR ELECTROCHEMICAL CELLS"; U.S. Publication No. US-2017-0149086-A1 published on May 25, 2017, filed as U.S. application Ser. No. 15/343,635 on Nov. 4, 2016, patented as U.S. Pat. No. 9,825,328 on Nov. 21, 2017, and entitled "IONICALLY CONDUCTIVE COMPOUNDS AND RELATED USES"; U.S. Publication No. US-2018-0337406-A1 published on Nov. 22, 2018, filed as U.S. application Ser. No. 15/983,352 on May 18, 2018, patented as U.S. Pat. No. 10,868,306 on Dec. 15, 2020 and entitled "PASSIVATING AGENTS FOR ELECTROCHEMICAL CELLS"; U.S. Publication No. US-2018-0261820-A1 published on Sep. 13, 2018, filed as U.S. application Ser. No. 15/916,588 on Mar. 9, 2018, patented as U.S. Pat. No. 11,024,923 on Jun. 1, 2021 and entitled "ELECTROCHEMICAL CELLS COMPRISING SHORT-CIRCUIT RESISTANT ELECTRONICALLY INSULATING REGIONS"; U.S. Publication No. US-2020-0243824-A1 published on Jul. 30, 2020, filed as U.S. application Ser. No. 16/098,654 on Nov. 2, 2018, patented as U.S. Pat. No. 10,991,925 on Apr. 27, 2021 and entitled "COATINGS FOR COMPONENTS OF ELECTROCHEMICAL CELLS"; U.S. Publication No. US-2018-0351158-A1 published on Dec. 6, 2018, filed as U.S. application Ser. No. 15/983,363 on May 18, 2018, patented as U.S. Pat. No. 10,944,094 on Mar. 9, 2021 and entitled "PASSIVATING AGENTS FOR ELECTROCHEMICAL CELLS"; U.S. Publication No. US-2018-0277850-A1 published on Sep. 27, 2018, filed as U.S. application Ser. No. 15/923,342 on Mar. 16, 2018, and patented as U.S. Pat. No. 10,720,648 on Jul. 21, 2020, and entitled "ELECTRODE EDGE PROTECTION IN ELECTROCHEMICAL CELLS"; U.S. Publication No. US-2018-0358651-A1 published on Dec. 13, 2018, filed as U.S. application Ser. No. 16/002,097 on Jun. 7, 2018, and patented as U.S. Pat. No. 10,608,278 on Mar. 31, 2020, and entitled "IN SITU CURRENT COLLECTOR"; U.S. Publication No. US-2017-0338475-A1 published on Nov. 23, 2017, filed as U.S. application Ser. No. 15/599,595 on May 19, 2017, patented as U.S. Pat. No. 10,879,527 on Dec. 29, 2020, and entitled "PROTECTIVE LAYERS FOR ELECTRODES AND ELECTROCHEMICAL CELLS"; U.S. Publication No. US-2019-0088958-A1 published on Mar. 21, 2019, filed as U.S. application Ser. No. 16/124,384 on Sep. 7, 2018, and entitled "PROTECTIVE MEMBRANE FOR ELECTROCHEMICAL CELLS"; U.S. Publication No. US-2019-0348672-A1 published on Nov. 14, 2019, filed as U.S. application Ser. No. 16/470,708 on Jun. 18, 2019. patented as U.S. Pat. No. 11,183,690 on Nov. 23, 2021, and entitled "PROTECTIVE LAYERS COMPRISING METALS FOR ELECTROCHEMICAL CELLS"; U.S. Publication No. US-2017-0200975-A1 published Jul. 13, 2017, filed as U.S. application Ser. No. 15/429,439 on Feb. 10, 2017, and patented as U.S. Pat. No. 10,050,308 on Aug. 14, 2018, and entitled "LITHIUM-ION ELECTROCHEMICAL CELL, COMPONENTS THEREOF, AND METHODS OF MAKING AND USING SAME"; U.S. Publication No. US-2018-0351148-A1 published Dec. 6, 2018, filed as U.S. application Ser. No. 15/988,182 on May 24, 2018, patented as U.S. Pat. No. 11,251,501 on Feb. 15, 2022, and entitled "IONICALLY CONDUCTIVE COMPOUNDS AND RELATED USES"; U.S. Publication No. US-2018-0254516-A1 published Sep. 6, 2018, filed as U.S. application Ser. No. 15/765,362 on Apr. 2, 2018, and entitled "NON-AQUEOUS ELECTROLYTES FOR HIGH ENERGY LITHIUM-ION BATTERIES"; U.S. Publication No. US-2020-0044460-A1 published Feb. 6, 2020, filed as U.S. Application No. 16,527,903 on Jul. 31, 2019, and entitled "MULTIPLEXED CHARGE DISCHARGE BATTERY MANAGEMENT SYSTEM"; U.S. Publication No. US-2020-0220146-A1 published Jul. 9, 2020, filed as U.S. application Ser. No. 16/724,586 on Dec. 23, 2019, and entitled "ISOLATABLE ELECTRODES AND ASSOCIATED ARTICLES AND METHODS"; U.S. Publication No. US-2020-0220149-A1 published Jul. 9, 2020, filed as U.S. application Ser. No. 16/724,596 on Dec. 23, 2019, and entitled "ELECTRODES, HEATERS, SENSORS, AND ASSOCIATED ARTICLES AND METHODS"; U.S. Publication No. US-2020-0220197-A1 published Jul. 9, 2020, filed as U.S. application Ser. No. 16/724,612 on Dec. 23, 2019, and entitled "FOLDED ELECTROCHEMICAL DEVICES AND ASSOCIATED METHODS AND SYSTEMS", U.S. Publication No. US-2020-0373578-A1 published Nov. 26, 2020, filed as U.S. application Ser. No. 16/879,861 on May 21, 2020, and entitled "ELECTROCHEMICAL DEVICES INCLUDING POROUS LAYERS", U.S. Publication No. US-2020-0373551-A1 published Nov. 26, 2020, filed as U.S. application Ser. No. 16/879,839 on May 21, 2020, and entitled "ELECTRICALLY COUPLED ELECTRODES, AND ASSOCIATED ARTICLES AND METHODS", U.S. Publication No. US-2020-0395585-A1 published Dec. 17, 2020, filed as U.S. application Ser. No. 16/057,050 on Aug. 7, 2018, and entitled "LITHIUM-COATED SEPARATORS AND ELECTROCHEMICAL CELLS COMPRISING THE SAME", U.S. Publication No. US-2021-0057753-A1 published Feb. 25, 2021, filed as U.S. application Ser. No. 16/994,006 on Aug. 14, 2020, and entitled "ELECTROCHEMICAL CELLS AND COMPONENTS COMPRISING THIOL GROUP-CONTAINING SPECIES", U.S. Publication No. US-2021-0135297-A1 published on May 6, 2021, filed as U.S. application Ser. No. 16/670,905 on Oct. 31, 2019, and entitled SYSTEM AND METHOD FOR OPERATING A RECHARGEABLE ELECTROCHEMICAL CELL OR BATTERY", U.S. Publication No. US-2021-0138673-A1 published on May 13, 2021, filed as U.S. application Ser. No. 17/089,092 on Nov. 4, 2020, and entitled "ELECTRODE CUTTING INSTRUMENT", U.S. Publication No. US-2021-0135294-A1 published on May 6, 2021, filed as U.S. application Ser. No. 16/670,933 on Oct. 31, 2019, patented as U.S. Pat. No. 11,056,728 on Jul. 6, 2021 and entitled "SYSTEM AND METHOD FOR OPERATING A RECHARGEABLE ELECTROCHEMICAL CELL OR BATTERY"; U.S. Publication No. US-2021-0151839-A1 published on May 2021, filed as U.S. application Ser. No. 16/952,177 on Nov. 19, 2020, and entitled "BATTERIES, AND ASSOCIATED SYSTEMS AND METHODS"; U.S. Publication No. US-2021-0151830-A1 published on May 20, 2021, filed as U.S. application Ser. No. 16/952,235 on Nov. 19, 2020, and entitled "BATTERIES WITH COMPONENTS INCLUDING CARBON FIBER, AND ASSOCIATED SYSTEMS AND METHODS"; U.S. Publication No. US-2021-0151817-A1 published on May 20, 2021, filed as U.S. application Ser. No. 16/952,228 on Nov. 19, 2020, and entitled "BATTERY ALIGNMENT, AND ASSOCIATED SYSTEMS AND METHODS"; U.S. Publication No. US-2021-0151841-A1 published on May 20, 2021, filed as U.S. application Ser. No. 16/952,240 on Nov. 19, 2020, and entitled "SYSTEMS AND METHODS FOR APPLYING AND MAINTAINING COMPRESSION PRESSURE ON ELECTROCHEMICAL CELLS"; U.S. Publication No. US-2021-0151816-A1 published on May 20, 2021, filed as U.S. application Ser. No. 16/952,223 on Nov. 19, 2020, and entitled "THERMALLY INSULATING COMPRESSIBLE COMPONENTS FOR BATTERY PACKS"; U.S. Publication No. US-2021-0151840-A1 published on May 20, 2021, filed as U.S. application Ser. No. 16/952,187 on Nov. 19, 2020, and entitled "COMPRESSION SYSTEMS FOR BAT- TERIES"; U.S. Publication No. US-2021-0193984-A1 published on Jun. 24, 2021, filed as U.S. application Ser. No. 17/125,124 on Dec. 17, 2020, and entitled "SYSTEMS AND METHODS FOR FABRICATING LITHIUM METAL ELECTRODES"; U.S. Publication No. US-2021-0193985-A1 published on Jun. 24, 2021, filed as U.S. application Ser. No. 17/125,110 on Dec. 17, 2020, and entitled "LITHIUM METAL ELECTRODES AND METHODS"; U.S. Publication No. US-2021-0193996-A1 published on Jun. 24, 2021, filed as U.S. application Ser. No. 17/125,070 on Dec. 17, 2020, and entitled "LITHIUM METAL ELECTRODES"; U.S. Publication No. US-2021-0194069-A1 published on Jun. 24, 2021, filed as U.S. application Ser. No. 17/126,390 on Dec. 18, 2020, and entitled "SYSTEMS AND METHODS FOR PROVIDING, ASSEMBLING, AND MANAGING INTEGRATED POWER BUS FOR RECHARGEABLE ELECTROCHEMICAL CELL OR BATTERY"; U.S. Publication No. US-2021-0218243 published on Jul. 15, 2021, filed as U.S. application Ser. No. 17/126,424 on Dec. 18, 2020, and entitled "SYSTEMS AND METHODS FOR PROTECTING A CIRCUIT, RECHARGEABLE ELECTROCHEMICAL CELL, OR BATTERY"; U.S. Publication No. 2022-0069593 published on Mar. 3, 2022, filed as U.S. application Ser. No. 17/463,467 filed on Aug. 31, 2021, and entitled "Multiplexed Battery Management System"; U.S. Publication No. 2022-0048121 published on Feb. 17, 2022, filed as U.S. application Ser. No. 17/397,114 filed on Aug. 9, 2021, and entitled "Ultrasonic Blade for Cutting a Metal", U.S. Publication No. 2022-0115715 published on Apr. 14, 2022, filed as U.S. application Ser. No. 17/479,299 filed on Sep. 20, 2021 and entitled "Electrolytes for Reduced Gassing".

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical system, the system comprising:
an electrochemical cell, comprising:
a first electrode comprising a base electrode material layer comprising a first active electrode species, wherein the first active electrode species comprises lithium metal;
a second electrode comprising a second active electrode species, wherein the second active electrode species comprises nickel, cobalt, and manganese, and wherein the second electrode comprises a binder comprising a fluorinated compound and conductive carbon;
a separator; and
an electrolyte, wherein the electrolyte comprises:
a first solvent comprising a fluorinated carbonate;
a second solvent comprising a carbonate, wherein a ratio of the fluorinated carbonate to the carbonate is greater than or equal to 5:95 and less than or equal to 95:1; and
a lithium salt,
wherein an anisotropic force is applied to the electrochemical cell, the anisotropic force comprising a component normal to a surface of the first electrode, and wherein the component normal defines a pressure of at least about 4.9 $N/cm^2$.

2. A method of operating an electrochemical system, the method comprising:
in an electrochemical cell, comprising:
a first electrode comprising a base electrode material layer comprising a first active electrode species, wherein the first active electrode species comprises lithium metal;
a second electrode comprising:
a second active electrode species, wherein the second active electrode species comprises lithium, nickel, cobalt, and manganese; wherein the second electrode comprises a binder comprising a fluorinated compound and conductive carbon; and
an electrolyte, wherein the electrolyte comprises:
a first solvent comprising a fluorinated carbonate, a second solvent comprising a carbonate, wherein a ratio of the fluorinated carbonate to the carbonate is greater than 1:1 and less than or equal to 10:1; and
a lithium salt,
performing the steps of:
charging the electrochemical cell at a charging rate over a first state of charge range having breadth of at least 2%,
discharging the electrochemical cell at a discharging rate over a second state of charge range having a breadth of at least 2%,
wherein the discharging rate is at least 2 times the charging rate.

3. An electrochemical system, the system comprising:
an electrochemical cell, comprising:
a first electrode comprising a base electrode material layer comprising a first active electrode species, wherein the first active electrode species comprises lithium metal, and where the first electrode comprises a protective layer adjacent to the base electrode material layer, wherein the protective layer comprises pores and has a thickness of less than 5 microns;
a second electrode comprising a second active electrode species, wherein the second active electrode species comprises lithium, nickel, cobalt, and manganese;
a separator; and
an electrolyte, wherein the electrolyte comprises:
a first solvent comprising a fluorinated carbonate;
a second solvent comprising a carbonate, and
a lithium salt,
wherein an anisotropic force is applied to the electrochemical cell,
the anisotropic force comprising a component normal to a surface of the first electrode, and wherein the component defines a pressure of at least about 4.9 $N/cm^2$.

4. The system of claim 1, further comprising a protective layer, and wherein the protective layer comprises a ceramic material.

5. The system of claim 1, further comprising a protective layer, and wherein the protective layer comprises a plurality of particles.

6. The system of claim 1, further comprising a protective layer, and wherein the protective layer comprises ionically conductive and ionically non-ionically conductive particles.

7. The system of claim 1, further comprising a protective layer, and wherein the protective layer comprises a compound comprising $Li_{22}$.

8. The system of claim 5, wherein at least a portion of the plurality of particles are fused to one another such that at least a portion of an original surface of the particles can no longer be discerned in the portion of the plurality of particles fused to one another.

9. The system of claim 8, wherein a polymeric material is present in at least a portion of spaces between the fused particles.

10. The system of claim 5, wherein at least a portion of the plurality of particles of the protective layer are embedded in the lithium of the first electrode.

11. The system of claim 1, further comprising a protective layer, and wherein the protective layer comprises a compound of formula (I): $Li_xM_yQ_wP_zS_uX_t$ (I) wherein: M is Fe Q is absent or selected from the group consisting of Cr, B, Sn, Si, Ta, Nb, V, P, Fe, Ga, Al, As, and combinations thereof, and wherein Q, when present, is different than M, X is absent or selected from the group consisting of halide and pseudohalide, where x is 8-22, y is 0.1-3, w is 0-3, z is 0.1-3, u is 7-20, and t is 0-8.

12. The system of claim 1, further comprising a protective layer, and wherein the protective layer comprises a compound of formula (B): $Li_{2x}S_{x+w+5z}M_yP_{2z}$ (I) wherein: M is selected from the group consisting of Lanthanides, Group 3, Group 4, Group 5, Group 6, Group 7, Group 8, Group 9, Group 12, Group 13, and Group 14 atoms, and combinations thereof; x is 8-16, y is 0.1-6, w is 0.1-15, and z is 0.1-3.

13. The system of claim 1, wherein the second active electrode species comprises a lithium intercalation compound having a nickel content of greater than or equal to 70 mol % relative to other transition metals of the second active electrode species.

14. The system of claim 1, wherein the lithium salt comprises $LiPF_6$.

15. The system of claim 1, wherein the lithium salt comprises LiBOB.

16. The system of claim 1, wherein the lithium salt comprises LiTOP.

17. The system of claim 1, further comprising a release layer adjacent to the first electrode and/or the second electrode.

18. The system of claim 1, wherein the anisotropic force is applied to the electrochemical cell during at least one period of time during charge and/or discharge of the electrochemical cell.

19. The system of claim 1, further comprising a solid electrolyte interphase layer disposed between the first electrode and the electrolyte, wherein the solid electrolyte interphase layer comprises an inorganic material comprising LiF and $Li_2CO_3$.

20. The system of claim 19, wherein a first ratio of fluorine atoms to oxygen atoms adjacent the electrolyte is higher than a second ratio of fluorine atoms to oxygen atoms adjacent the anode in the solid electrolyte interphase layer.

* * * * *